US012722366B2

(12) United States Patent
Feix et al.

(10) Patent No.: US 12,722,366 B2
(45) Date of Patent: Sep. 1, 2026

(54) MANIPULATING FABRIC ITEMS USING A ROLLER

(71) Applicant: CreateMe Technologies LLC

(72) Inventors: Thomas Feix, Beaverton, OR (US); Hossein Mousavi Hondori, Mountain View (CA); Gaston Justice MacMillan, El Cerrito, CA (US); Martin Frederick Bamberger, Beaverton, OR (US); Nicholas Chope, Portland, OR (US); Michael Corliss, Beaverton, OR (US); Sean Magnus Becker, San Francisco, CA (US); Michael William Tanguay, Camas, WA (US); Akhil Devarakonda, Freemont, CA (US)

(73) Assignee: CreateMe Technologies Inc., Newark, CA (US)

(*) Notice: Subject to any disclaimer, the term of this patent is extended or adjusted under 35 U.S.C. 154(b) by 191 days.

(21) Appl. No.: 18/482,991

(22) Filed: Oct. 9, 2023

(65) Prior Publication Data

US 2024/0116283 A1 Apr. 11, 2024

Related U.S. Application Data

(60) Provisional application No. 63/379,057, filed on Oct. 11, 2022.

(51) Int. Cl.

| | |
|---|---|
| ***B32B 37/00*** | (2006.01) |
| ***B32B 3/04*** | (2006.01) |
| ***B32B 5/02*** | (2006.01) |
| ***B32B 5/26*** | (2006.01) |
| ***B32B 37/12*** | (2006.01) |
| ***B32B 37/16*** | (2006.01) |
| ***B32B 38/00*** | (2006.01) |
| ***B32B 38/18*** | (2006.01) |

(52) U.S. Cl.

CPC ............ *B32B 37/0053* (2013.01); *B32B 3/04* (2013.01); *B32B 5/02* (2013.01); *B32B 5/26* (2013.01); *B32B 37/12* (2013.01); *B32B 37/16* (2013.01); *B32B 38/0012* (2013.01); *B32B 38/1808* (2013.01); *B32B 2038/0028* (2013.01); *B32B 2250/20* (2013.01); *B32B 2305/18* (2013.01); *B32B 2437/00* (2013.01)

(58) Field of Classification Search

CPC .............. B25J 15/0616; B32B 37/0053; B32B 2437/00; B32B 2305/18; B32B 38/1825; B32B 38/1858; B32B 38/1875; A41H 43/04

See application file for complete search history.

(56) References Cited

U.S. PATENT DOCUMENTS

2007/0187026 A1* 8/2007 Burgess ................ B29C 70/386 156/574

* cited by examiner

*Primary Examiner* — Carson Gross

(74) *Attorney, Agent, or Firm* — Moore Intellectual Property Law, PLLC

(57) ABSTRACT

Embodiments provide for the manipulation of fabric items using a roller. A fabric item is engaged by a roller. Rotation of the roller while traversing the roller across the fabric item progressively lifts the fabric item onto the roller. In an example, the fabric item is held on the roller by applying a vacuum via the roller. In an example the roller is used to deposit one portion of the fabric item onto another portion of the fabric item in a joining process. In an example, the roller is used to deposit the fabric item onto another fabric item in a joining process.

28 Claims, 30 Drawing Sheets

MANIPULATING FABRIC ITEMS USING A ROLLER

CROSS-REFERENCE TO RELATED APPLICATIONS

The present application claims the benefit of U.S. Provisional Patent Application No. 63/379,057 entitled "MANIPULATING FABRIC ITEMS USING A ROLLER," filed Oct. 11, 2022, which is expressly incorporated herein by reference in its entirety.

FIELD OF THE DISCLOSURE

Embodiments presented in this disclosure generally relate to apparatus, systems, and methods for manufacturing fabric articles, such as garments.

BACKGROUND

Despite technological advances and the introduction of automation in many types of manufacturing, the manufacturing of fabric articles, such as garments, remains very labor-intensive. Sewing machines were invented in the early nineteenth century and were made possible based on the development of the lock stitch sewing technique. Today, some hundred and fifty years later, this same technology remains the foundation of garment manufacturing. The modern process of producing large quantities of ready-to-wear apparel relies heavily on manual labor and remains inefficient relative to other industrial manufacturing processes. Garment manufacturing includes multiple steps including sizing, folding, fitting, cutting, sewing, and material handling. The unique and varied properties of individual fabrics, such as weight, thickness, strength, stretch, and drape, as well as the complex nature of certain tasks, complicates material handling and automated garment manufacturing.

In most small and large apparel manufacturing factories, most of the material handling and apparel manufacturing operations are conducted in a manual or semi-manual manner. The garment manufacturing process may start with laying out a web of fabric for 24 hours to relax the fabric and remove wrinkles. Then, one or more layers of fabric may be cut based on patterns and dimensions matching the desired garment. Then, the cut fabric pieces are transferred from workstation to workstation, where at each workstation, one, two, or more pieces of fabrics are manually folded, overlapped along the seams and fed into a sewing machine or serger machine (also referred to as an overlock machine). Given the variety of fabrics, threads, seam types, and stitch types found in a finished garment, a larger number of workstations with specialized tools and skilled operators is required for assembling a garment. This means the fabrics or unfinished garments spend much time in transit between workstations, which adversely affects the time required to complete a garment. Thus, traditional apparel manufacturing operations may include multiple sequential processes. Further, a time constant may be required between each operation to allow the fabric to relax, which further increases the time required to process a garment.

Despite advances in technology, machines still struggle with performing certain tasks that are easily handled by a trained worker with average hand-eye coordination skills. This is one reason the garment manufacturing industry is in a constant search of cheaper human labor rather than investing in advanced automated manufacturing systems. To increase production, a factory may add additional production lines in parallel, which does little to improve efficiency. Even in large factories, most work is performed in piecemeal fashion with limited coordination between various stations/steps, and movement of material between each station requires a great deal of manual product handling.

Accordingly, there is a need for an automated system for manufacturing garments to improve factory throughput and reduce reliance on manual labor.

SUMMARY

Embodiments presented in this disclosure generally relate to apparatus, systems, and methods for handling fabrics, such as textiles, such as sheet materials, such as leather, cloth, and the like, in the manufacture of articles. In one implementation, a method of joining a first fabric item to a second fabric item includes engaging the first fabric item with a roller. The first fabric item is located on a work surface. The method further includes attaching a portion of the first fabric item to a circumference of the roller by rotating the roller while traversing the roller across the first fabric item and using the roller to position the first fabric item against the second fabric item. The method further includes placing the portion of the first fabric item onto the second fabric item by rotating the roller while traversing the roller across the second fabric item.

In another implementation, a roller for picking up a fabric item includes a wheel. The wheel includes an axis of rotation and a circumference extending around the axis of rotation. The roller further includes a plurality of apertures in the circumference. The roller further includes a plurality of compartments within the wheel, each compartment adjacent to another compartment of the plurality of compartments in a direction about the axis of rotation, and each compartment associated with a corresponding portion of the circumference. The roller further includes a vacuum connector coupled to the wheel via a swivel, and fluidically coupled to each compartment.

In another implementation, a system for joining fabric items includes a table including a work surface, the work surface including perforations. The system further includes a robot including a roller. The roller includes a wheel including an axis of rotation and a circumference extending around the axis of rotation. The roller further includes a plurality of apertures in the circumference. The roller further includes a plurality of compartments within the wheel, each compartment adjacent to another compartment of the plurality of compartments in a direction about the axis of rotation, each compartment associated with a corresponding portion of the circumference. The roller further includes a vacuum connector coupled to the wheel via a swivel, and fluidically coupled to each compartment. The system further includes a vacuum system coupled to the perforations of the work surface and coupled to the apertures of the roller via the vacuum connector such that a vacuum applied to the perforations is controlled independently of a vacuum applied to the apertures. The system further includes a controller configured to control the vacuum system and the robot.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented in this disclosure generally relate to apparatus, systems, and methods for handling fabrics, such as textiles, such as sheet materials, such as leather, cloth, and the like, in the manufacture of articles. Some examples of such articles include, but are not limited to, garments (e.g. shirts, pants, socks, shoes, shorts, coats, jackets, skirts, dresses, underwear, hats, headbands, and the like), accessories (e.g. wallets, purses, and the like), and homewares (e.g. artwork, upholstery, towels, bed linens, blankets, mats, and the like).

Some fabrics (so-called "single-faced fabrics") include a "right side" designated to be on show in the finished article, and a "wrong side" designated to be hidden in the finished article. When such fabrics include a printed design, typically the print is applied to the right side. Additionally, when such fabrics are joined, typically the join is made right side to right side, then the joined fabrics are reversed (for example by turning inside-out) such that excess fabric at the join is hidden, and the right sides become facing outwards from each other. Some other fabrics (so-called "double-faced fabrics") are created with two right sides and no wrong sides. Such fabrics are constructed such that either of the two right sides can be designated to be on show in the finished article. Whenever the system and method descriptions of the present disclosure are applied to double-faced fabrics, the term "right side" is used to indicate a side designated to be on show in the finished article, and the term "wrong side" is used to indicate a side designated to be hidden in the finished article. Each system and method of the present disclosure includes the performance of manufacturing operations on fabric items that may be right side facing upwards or wrong side facing upwards. In some embodiments, a manufacturing operation may be performed on a fabric item that is oriented on the right side facing upwards. In some embodiments, a manufacturing operation may be performed on a fabric item that is oriented with the wrong side facing upwards.

Figure 1:
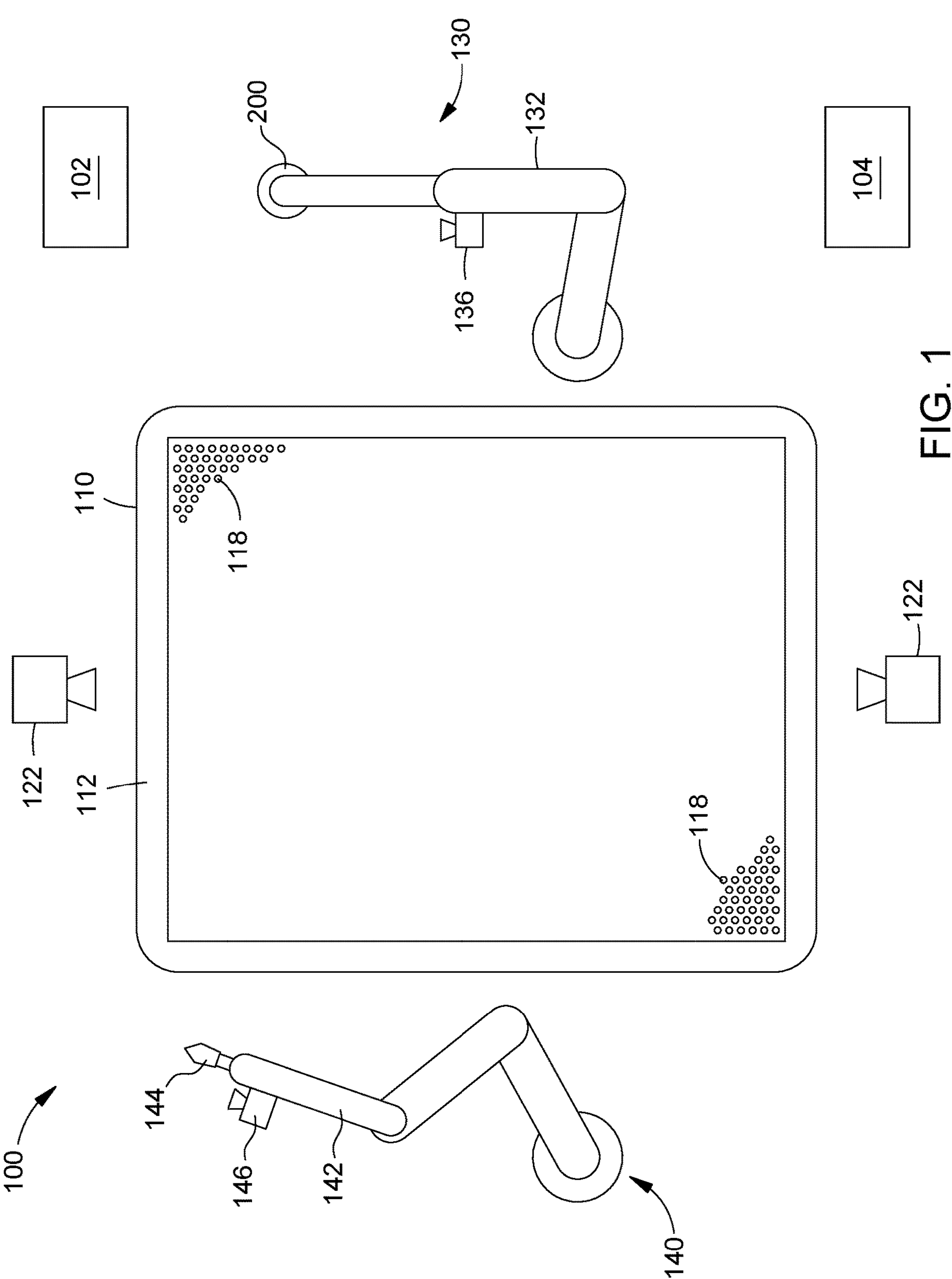
FIG. 1 schematically illustrates a system for joining fabric items.

FIG. 1 schematically illustrates a system 100 for joining a fabric item to another fabric item. In some embodiments, the system 100 includes a controller 102 for monitoring and controlling the operations of the system 100. The controller 102 directs the operation of one or more pieces of apparatus of the system 100. The controller 102 may include one or more software applications stored in memory and executed using one or more processors in a computing system.

The system 100 includes a table 110 with a work surface 112 on which operations are conducted on a fabric item. The work surface 112 is configured to selectively hold a fabric item. In the illustrated example, the work surface 112 includes perforations 118 coupled to a vacuum system 104. The controller 102 controls operation of the vacuum system 104.

The system 100 includes a robot 130 configured to manipulate fabric items. In some embodiments, operation of the robot 130 is controlled by the controller 102. In some embodiments, the robot 130 may be mounted on a gantry above the work surface 112. In some embodiments, the robot 130 may be freestanding. In some embodiments, the robot 130 includes an articulated arm 132 attached to a roller 200 that selectively holds and releases the fabric item. In some embodiments, the roller 200 includes pins, such as micro pins, that selectively hold or release the fabric item. In some embodiments, the roller 200 includes an electrostatic plate to selectively hold or release the fabric item. In some embodiments, the roller 200 is configured to apply a vacuum in order to selectively hold or release the fabric item. In some of such embodiments, the roller 200 is coupled to the vacuum system 104.

In some embodiments in which the roller 200 is coupled to the vacuum system 104, the roller 200, the work surface 112, and the vacuum system 104 are configured such that a vacuum applied through the perforations 118 of the work surface 112 is controlled independently of a vacuum applied through the roller 200. In an example, a vacuum may be applied through the perforations 118 of the work surface 112 while a vacuum is not applied through the roller 200. Similarly, a vacuum may be applied through the roller 200 while a vacuum is not applied through the perforations 118 of the work surface 112. In some embodiments, a vacuum is applied through the roller 200 and the perforations 118 at the same time. Additionally, a vacuum applied through the perforations 118 of the work surface 112 may be controlled to be at a different strength than a vacuum applied through the roller 200.

In some embodiments, the robot 130 includes a sensor 136 that is used to assist with positioning of the roller 200 with respect to a fabric item on the work surface 112. In an example, the sensor 136 includes a camera. For instance, the camera may capture an image of the fabric item and relay the image to the controller 102. The controller 102 may determine the position, orientation, stretch, and/or extent of the fabric item on the work surface 112. The controller 102 may direct the roller 200 to the fabric item according to the determined position, orientation, and/or extent of the fabric item on the work surface 112.

In some embodiments, the system 100 includes a robot 140 configured to apply an adhesive to a fabric item. In some embodiments, the robot 140 may be omitted. When the robot 140 is present in the system 100, in some embodiments, operation of the robot 140 is controlled by the controller 102. In some embodiments, the robot 140 may be mounted on a gantry above the work surface 112. In some embodiments, the robot 140 may be freestanding. In some embodiments, the robot 140 includes an articulated arm 142 attached to an adhesive applicator 144. The adhesive applicator 144 is positioned by the articulated arm 142 to distribute an adhesive onto a selected portion of a fabric item. In some embodiments, articulated arm 142 positions the adhesive applicator 144 to distribute the adhesive onto a fabric item located on the work surface 112. In some embodiments, articulated arm 142 positions the adhesive applicator 144 to distribute the adhesive onto a fabric item that is not located on the work surface 112. In some embodiments, articulated arm 142 positions the adhesive applicator 144 to distribute the adhesive onto a fabric item that is held by the roller 200.

In some embodiments, the robot 140 includes a sensor 146 that is used to assist with positioning of the adhesive applicator 144 with respect to a fabric item. In an example, the sensor 146 includes a camera. For instance, the camera may capture an image of the adhesive applicator 144 and the fabric item and relay the image to the controller 102. The controller 102 may determine the position and orientation of the adhesive applicator 144 with respect to the fabric item. The controller 102 may direct the articulated arm 142 to position the adhesive applicator 144 with respect to the fabric item.

In some embodiments, the system 100 includes one or more cameras 122. The one or more cameras 122 may be used to monitor operations being performed on a fabric item on the work surface 112. The controller 102 may use images captured by the one or more cameras 122 in controlling operation of any one or more of the work surface 112, the vacuum system 104, the robot 130, or the robot 140.

Figure 2B:
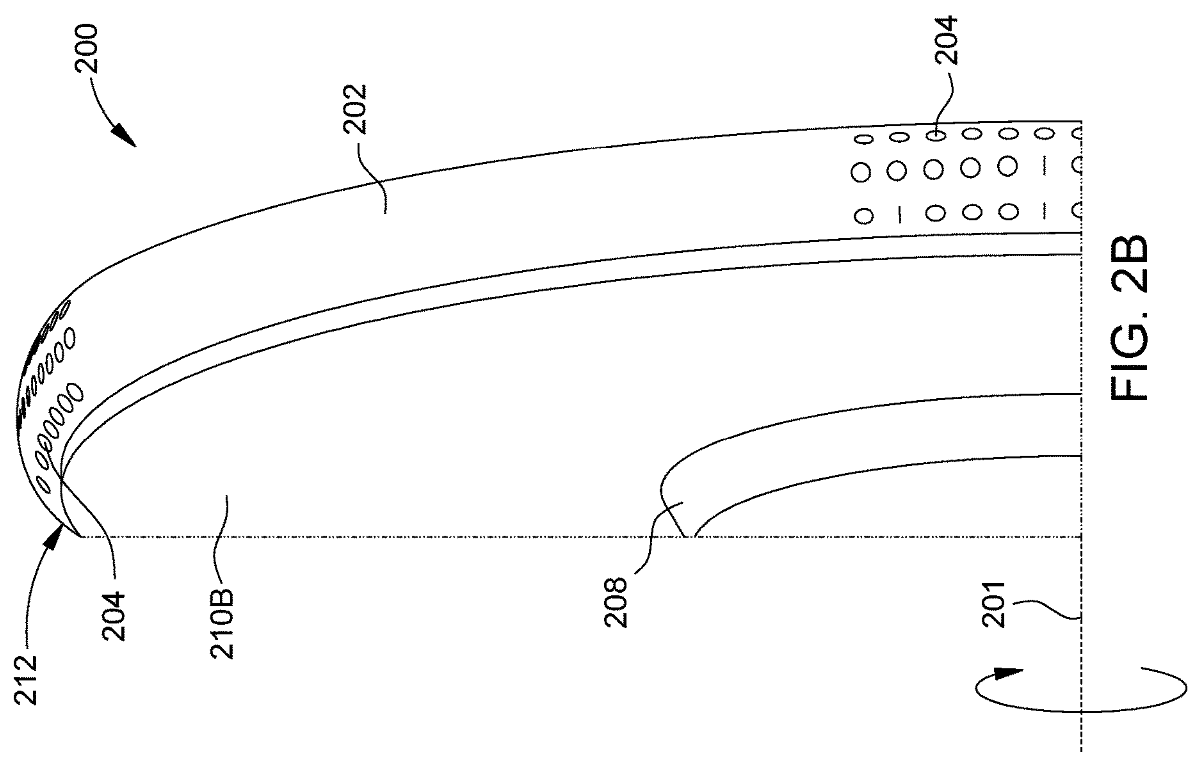
FIGS. 2A-2J schematically illustrate exemplary features of part of the system of FIG. 1.
Figure 2A:
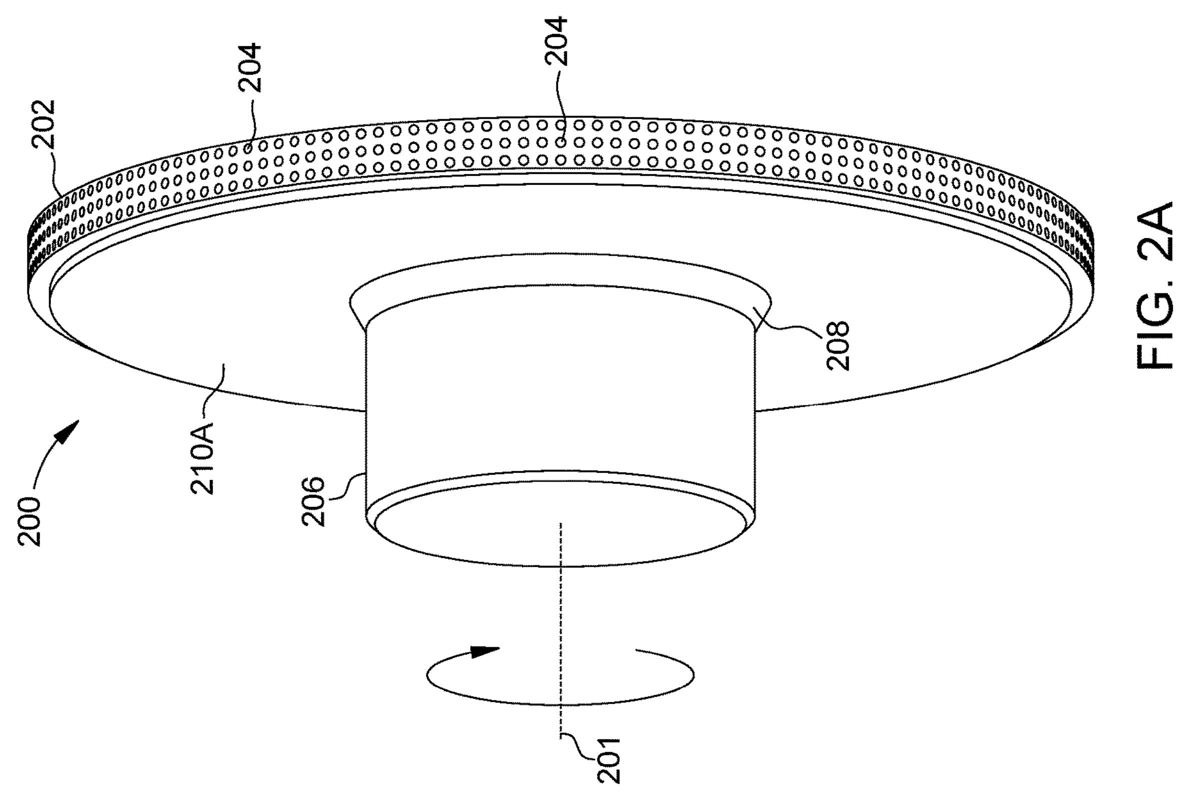

FIGS. 2A-2J schematically illustrate exemplary features of the roller 200. It is contemplated that the roller 200 may include any one or more features of a roller or wheel described and/or illustrated in the present disclosure. In FIG. 2A, the roller 200 is represented by wheel 210A. The wheel 210A includes an axis of rotation 201 and a circumference 202 extending around the axis of rotation 201. A vacuum tube (not shown) may be coupled to the wheel 210A via a vacuum connector 206. A swivel 208 enables rotation of the wheel 210A about the axis of rotation 201 without twisting the vacuum tube coupled to the vacuum connector 206.

Apertures 204 in the circumference 202 allow the passage of fluid, such as air, therethrough, such as when applying a vacuum or when blowing a fluid out of the wheel 210A. As illustrated, in some embodiments, at least some of the apertures 204 are in the form of circular holes. In some embodiments, at least some of the apertures 204 are in the form of non-circular holes, such as oval holes. In some embodiments, at least some of the apertures 204 are in the form of slots. In some embodiments, the apertures 204 extend around the entire circumference 202. In some embodiments, the apertures 204 do not extend around the entire circumference 202. For example, in some embodiments, one or more discrete portions of the circumference 202 may include the apertures 204, and one or more other discrete portions may not include the apertures 204.

In FIG. 2B, the roller 200 is represented by wheel 210B. FIG. 2B is an isometric view of a portion of wheel 210B. Wheel 210B is configured similarly to wheel 210A, except that the circumference 202 includes at least a section 212 that is rounded in a plane parallel to the axis of rotation 201. In some embodiments, the rounded section 212 extends around the entire circumference 202. As illustrated, in some embodiments, the rounded section 212 includes one or more apertures 204. In some embodiments, the rounded section 212 does not include one or more apertures 204.

Figures 2C, 2D:
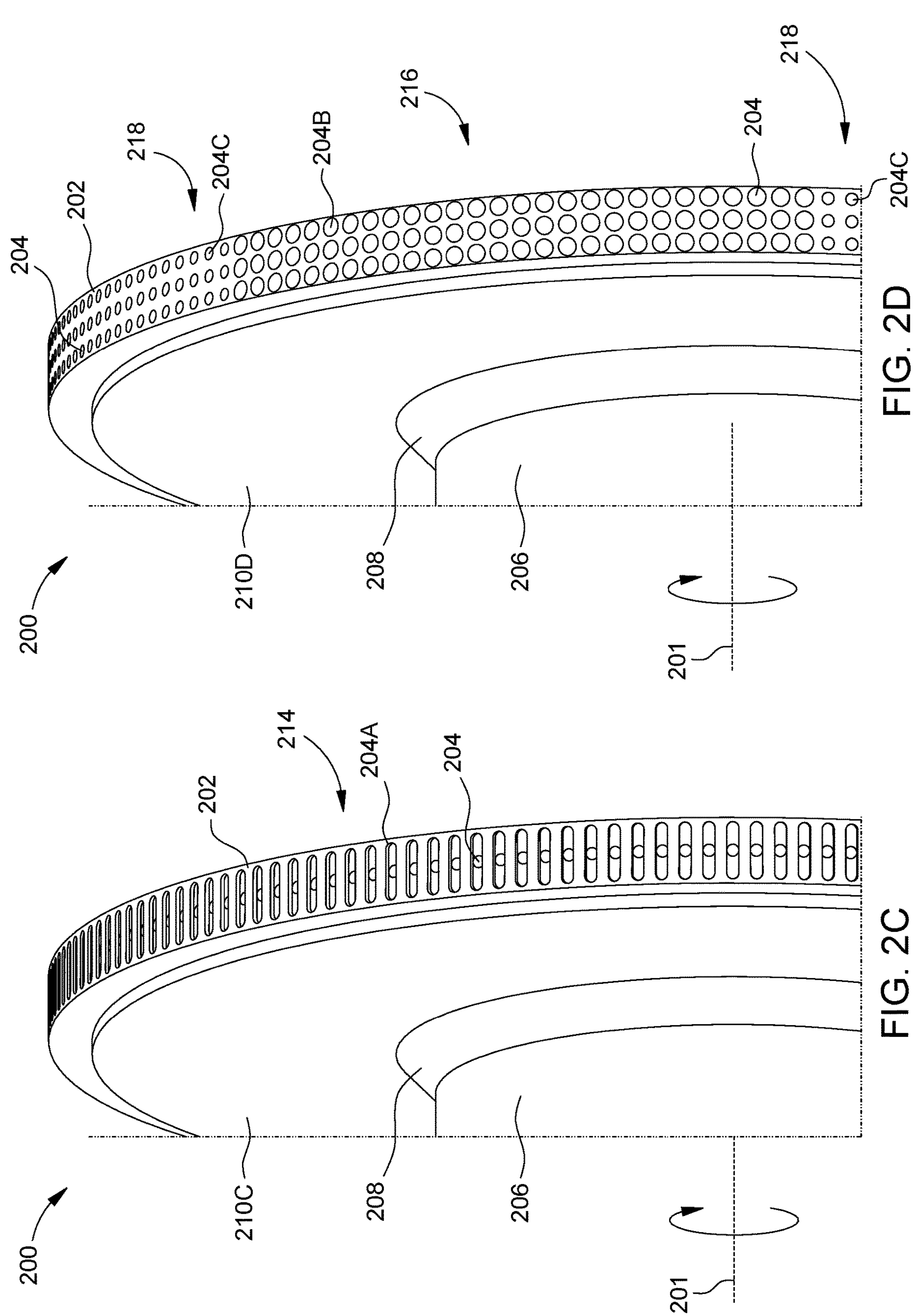

In FIG. 2C, the roller 200 is represented by wheel 210C. FIG. 2C is an isometric view of a portion of wheel 210C. Wheel 210C is configured similarly to wheel 210A, except that the circumference 202 includes at least a section 214 that includes slots 204A overlying the apertures 204. It is contemplated that the slots 204A facilitate an even application of a vacuum to a fabric item across a width of the circumference 202. In some embodiments, the section 214 including the slots 204A extends around the entire circumference 202. In some embodiments, the section 214 including the slots 204A does not extend around the entire circumference 202. For example, in some embodiments, one or more discrete portions of the circumference 202 may include a section 214 including the slots 204A.

In FIG. 2D, the roller 200 is represented by wheel 210D. FIG. 2D is an isometric view of a portion of wheel 210D. Wheel 210D is configured similarly to wheel 210A, except that the circumference 202 includes sections 216, 218 with differing configurations of the apertures 204. It is contemplated that when a vacuum is applied through the apertures 204, the differing configurations of apertures 204 provides for the magnitude of a suction force exerted at section 216 to be different from the magnitude of a suction force exerted at section 218. In some embodiments, the differing configurations of apertures 204 provide the sections 216, 218 with differing flow areas. For example, in some embodiments, the sections 216, 218 include different numbers of apertures 204. In some of such embodiments, the sections 216, 218 include different numbers of apertures 204 of the same size.

Additionally, or alternatively, in some embodiments, the differing configurations of apertures 204 provide the sections 216, 218 with differing flow areas per unit length of circumference 202. For example, in some embodiments, the sections 216, 218 include different numbers of apertures 204 per unit length of circumference 202. In some embodiments, the sections 216, 218 include different numbers of apertures 204 of the same size per unit length of circumference 202.

As illustrated, in some embodiments, the sections 216, 218 include apertures 204 of differing sizes. In section 216, the apertures 204 are represented by apertures 204B. In section 218, the apertures 204 are represented by apertures 204C. The apertures 204B are larger than the apertures 204C. In some embodiments, the number of apertures 204B in section 216 equals the number of apertures 204C in section 218. In some embodiments, the number of apertures 204B in section 216 is greater than the number of apertures 204C in section 218. In some embodiments, the number of apertures 204B in section 216 is less than the number of apertures 204C in section 218.

In some embodiments, the number of apertures 204B per unit length of circumference 202 in section 216 equals the number of apertures 204C per unit length of circumference 202 in section 218. In some embodiments, the number of apertures 204B per unit length of circumference 202 in section 216 is greater than the number of apertures 204C per unit length of circumference 202 in section 218. In some embodiments, the number of apertures 204B per unit length of circumference 202 in section 216 is less than the number of apertures 204C per unit length of circumference 202 in section 218.

Figure 2F:
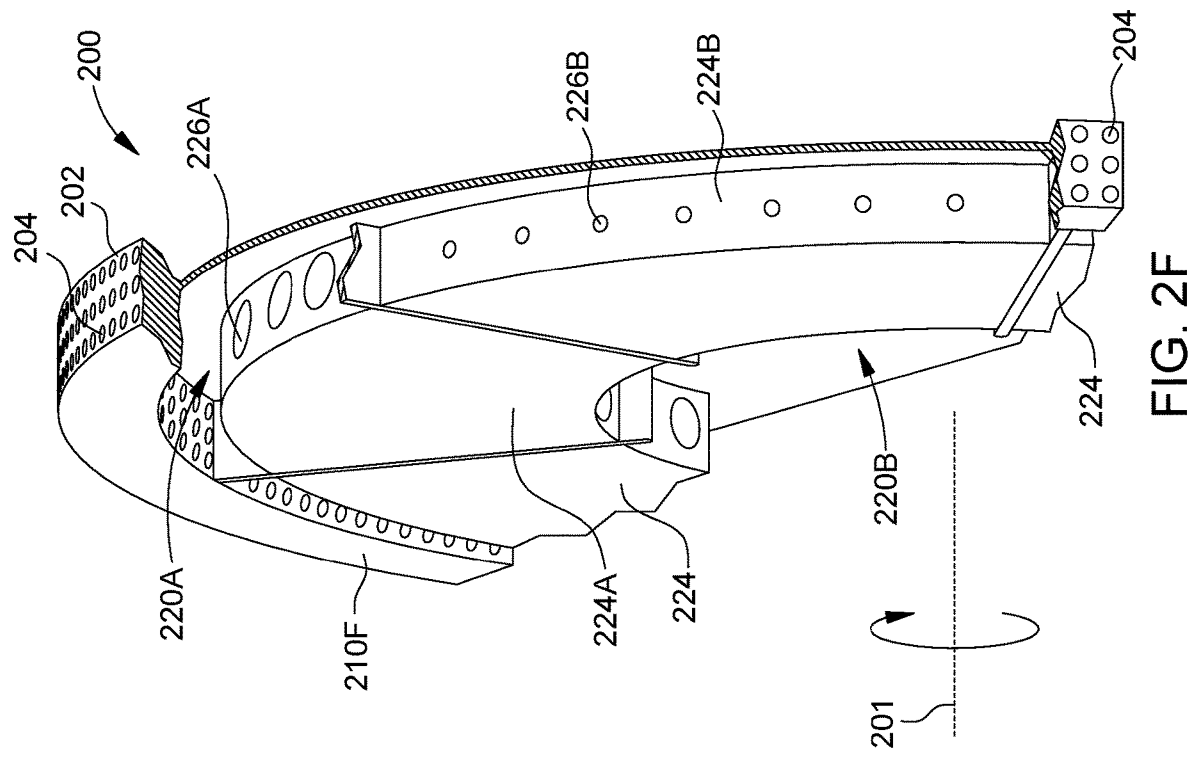
Figure 2E:
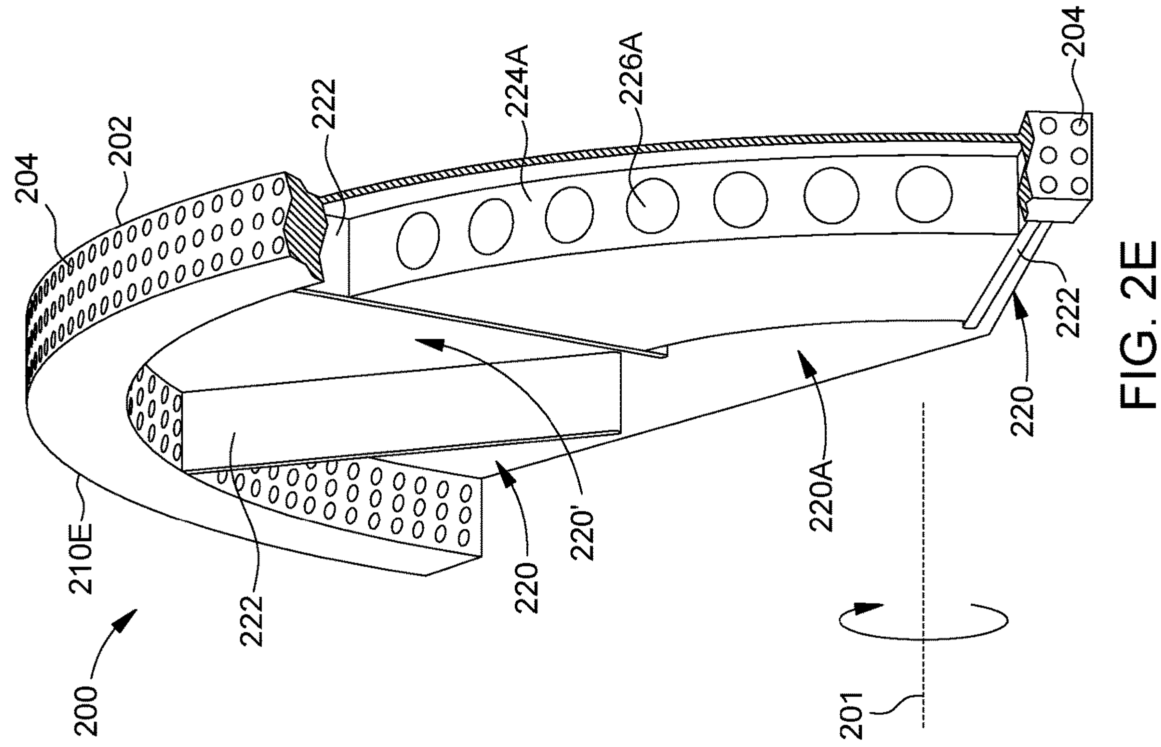

In FIG. 2E, the roller 200 is represented by wheel 210E. FIG. 2E is an isometric view of a portion of wheel 210E. Wheel 210E is configured similarly to wheel 210A, except that wheel 210E includes a provision to modify the magnitude of a suction force exerted at a portion of the circumference 202. The view in FIG. 2E is partially cut away to reveal compartments 220 within the wheel 210E. The compartments 220 are arranged adjacent to one another in a direction about the axis of rotation 201. Each compartment 220 is associated with a corresponding portion of the circumference 202.

The compartments 220 of each pair of rotationally adjacent compartments 220 are separated by a divider 222. Each divider 222 is oriented at an angle with respect to a rotationally adjacent divider 222. In some embodiments, the dividers 222 are positioned such that at least two compartments 220 are similarly sized. In some embodiments, the dividers 222 are positioned such that at least two compartments 220 are not similarly sized.

In the illustrated example, compartment 220' is shown without a corresponding insert therein, but compartment 220A is shown with a corresponding insert 224A therein. The insert 224A includes one or more passages 226A. The insert 224A constrains fluid flow within the compartment 220A to the one or more passages 226A. It is contemplated that when a vacuum is applied through the wheel 210E, the insert 224A causes the magnitude of fluid flow through the compartment 220A to differ from the magnitude of fluid flow through the compartment 220'. Consequently, the magnitude of a suction force exerted at the portion of the circumference 202 associated with compartment 220' is different from the magnitude of a suction force exerted at the portion of the circumference 202 associated with compartment 220A.

In FIG. 2F, the roller 200 is represented by wheel 210F. FIG. 2F is an isometric view of a portion of wheel 210F that is partially cut away to reveal the compartments 220 within the wheel 210F. Wheel 210F is configured similarly to wheel 210E, except that wheel 210F includes more than one configuration of insert 224. The compartment 220A contains the insert 224A, and the compartment 220B contains the insert 224B. The insert 224B includes one or more passages 226B. The insert 224B constrains fluid flow within the compartment 220A to the one or more passages 226A. As illustrated, in some embodiments, the passages 226B are smaller than the passages 226A of the insert 224A. Additionally, or alternatively, in some embodiments, the insert 224B may include a fewer number of passages 226B than the number of passages 226A of insert 224A.

As illustrated, in some embodiments, each compartment 220 of the wheel 210F contains an insert 224/224A/224B. In some embodiments, the wheel 210F includes at least one compartment 220A containing an insert 224A, at least one compartment 224B containing an insert 224B, and at least one compartment 220' that does not contain an insert.

Figure 2H:
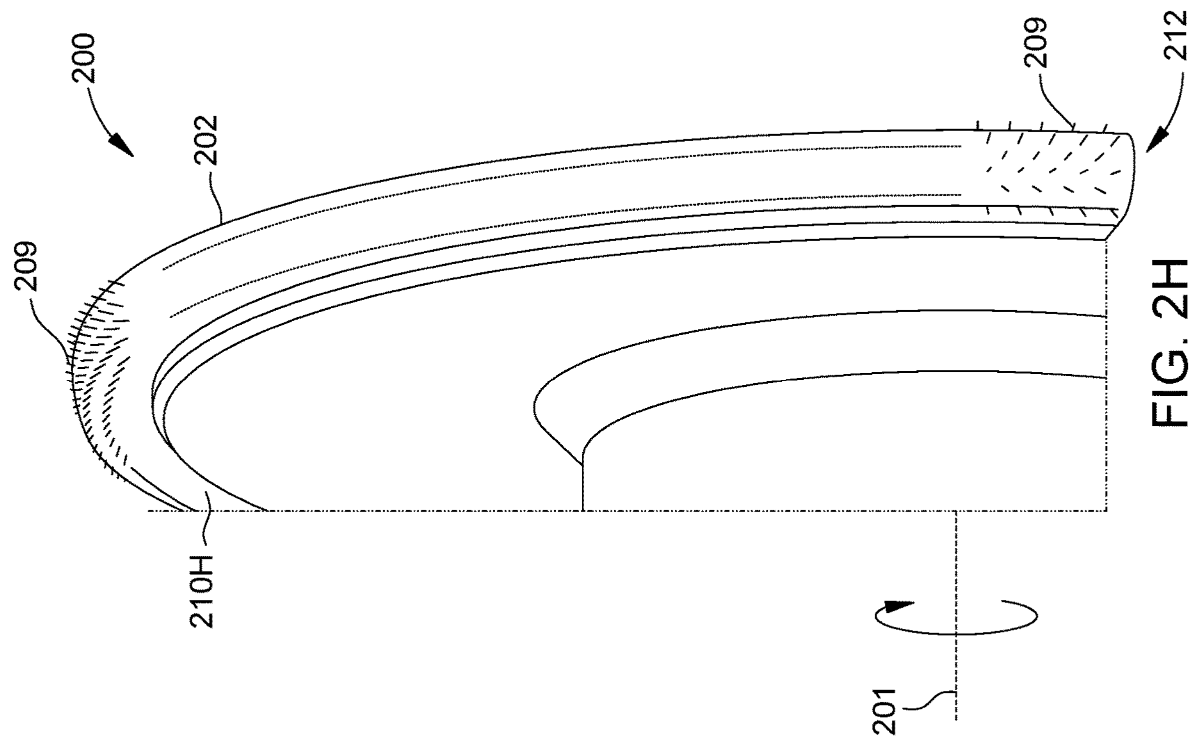
Figure 2G:
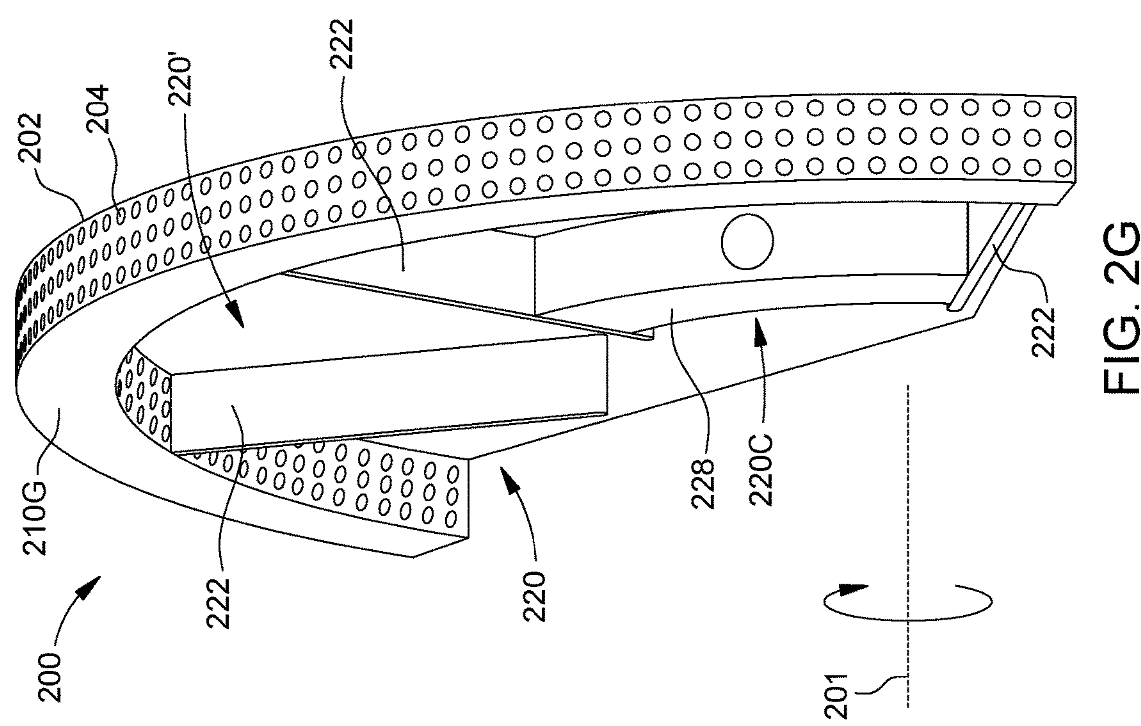

In FIG. 2G, the roller 200 is represented by wheel 210G. FIG. 2G is an isometric view of a portion of wheel 210G that is partially cut away to reveal the compartments 220 within the wheel 210G. Wheel 210G is configured similarly to wheel 210E, except that wheel 210G includes an insert in the form of a valve 228. In the illustrated example, compartment 220' is shown without a corresponding insert therein, but compartment 220C is shown with a corresponding valve 228 therein. The valve 228 is configured to regulate fluid flow within the compartment 220C. The compartment 220C is associated with a corresponding portion of the circumference 202. It is contemplated that when a vacuum is applied through the wheel 210E, the valve 228 can regulate fluid flow within the compartment 220C such that the magnitude of a suction force exerted at the portion of the circumference 202 associated with compartment 220C is adjusted accordingly. In some embodiments, operation of the valve 228 is controlled by the controller 102.

In FIG. 2H, the roller 200 is represented by wheel 210H. FIG. 2H is an isometric view of a portion of wheel 210H. Wheel 210H is configured similarly to wheel 210A, except that wheel 210H includes an alternative mechanism for holding a fabric item. The circumference 202 of the wheel 210H includes outwardly-projecting pins 209, such as micro pins. In some embodiments, the pins 209 extend perpendicularly to the surface of the circumference 202. In some embodiments, the pins 209 extend at an acute angle to the surface of the circumference 202. In some embodiments, each pin 209 of a first set of the pins 209 extends perpendicularly to the surface of the circumference 202, and each pin 209 of a second set of the pins 209 extends at an acute angle to the surface of the circumference 202.

As illustrated, in some embodiments, the circumference 202 includes at least one section 212 that is rounded in a plane parallel to the axis of rotation 201. In some embodiments, the rounded section 212 extends around the entire circumference 202. As illustrated, in some embodiments, the rounded section 212 includes one or more pins 209. In some embodiments, the rounded section 212 does not include one or more pins 209.

In some embodiments, the wheel 210H includes apertures 204 in the circumference 202 as well as pins 209. In an example, apertures 204 in the circumference 202 allow the passage of fluid, such as air, therethrough, such as when applying a vacuum or when blowing a fluid out of the wheel 210H. A fabric item may be held onto the wheel 210H by a combination of the pins 209 and a vacuum applied through the perforations 118. In some embodiments, the wheel 210H does not include apertures 204 in the circumference 202.

Figure 2I:
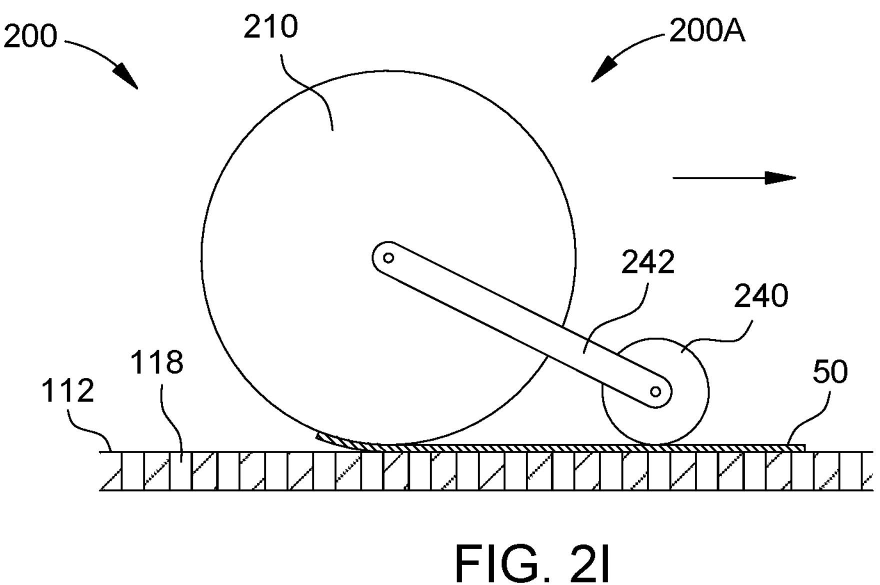

In FIG. 2I, the roller 200 is represented by roller assembly 200A. It is contemplated that roller assembly 200A may include any roller described and/or illustrated in the present disclosure. As illustrated, the roller assembly 200A includes a wheel 210. It is contemplated that the wheel 210 may include a feature of any one or more wheels of the present disclosure.

The wheel 210 is coupled to a leading wheel 240 by a bracket 242. When the roller assembly 200A is manipulated on a fabric item 50 on a work surface 112, the leading wheel 240 rests on the fabric item 50 ahead of the wheel 210. In some embodiments, the leading wheel 240 is pressed against the fabric item 50 at least in part by gravity. In some embodiments, the leading wheel 240 is pressed against the fabric item 50 at least in part by a suction force exerted via a vacuum applied through the perforations 118 in the work surface 112. In some embodiments, the leading wheel 240 is pressed against the fabric item 50 at least in part by an actuator (not shown) applying a force to the leading wheel 240 via the bracket 242. When the leading wheel 240 is pressed against the fabric item 50 ahead of the wheel 210 as the roller assembly 200A is traversed across the fabric item 50, the leading wheel 240 hinders wrinkling of the portion of the fabric item 50 about to be contacted by the wheel 210.

Figure 2J:
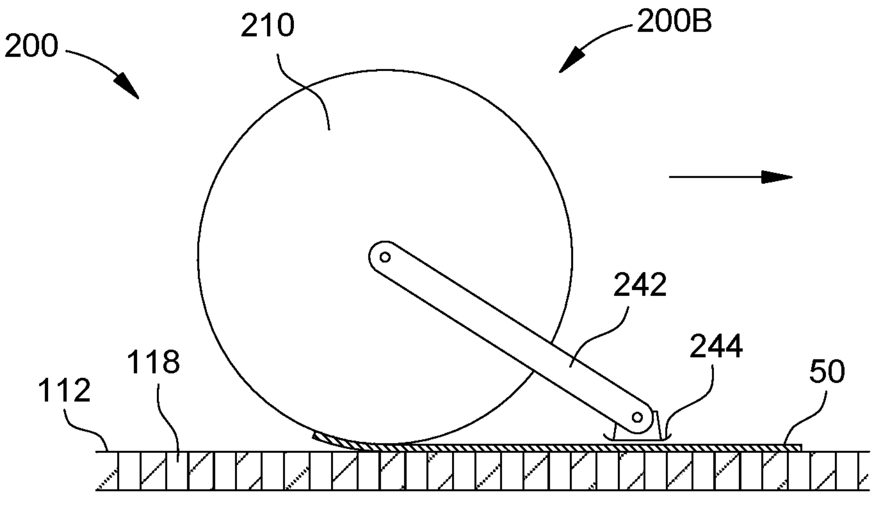

In FIG. 2J, the roller 200 is represented by roller assembly 200B. It is contemplated that roller assembly 200B may include any roller described and/or illustrated in the present disclosure. As illustrated, the roller assembly 200B includes a wheel 210. It is contemplated that the wheel 210 may include a feature of any one or more wheels of the present disclosure. The roller assembly 200B is similar to the roller assembly 200A, except that the leading wheel 240 is replaced by a slider 244. The slider 244 is configured to glide across the fabric item 50. In some embodiments, the slider 244 includes a polished surface that contacts the fabric item 50. In some embodiments, the slider 244 includes a surface coating of a low friction material, such as PTFE, that contacts the fabric item 50.

When the roller assembly 200B is manipulated on the fabric item 50 on the work surface 112, the slider 244 rests on the fabric item 50 ahead of the wheel 210. In some embodiments, the slider 244 is pressed against the fabric item 50 at least in part by gravity. In some embodiments, the slider 244 is pressed against the fabric item 50 at least in part by a suction force exerted via a vacuum applied through the perforations 118 in the work surface 112. In some embodiments, the slider 244 is pressed against the fabric item 50 at least in part by an actuator (not shown) applying a force to the slider 244 via the bracket 242. When the slider 244 is pressed against the fabric item 50 ahead of the wheel 210 as the roller assembly 200B is traversed across the fabric item 50, the slider 244 hinders wrinkling of the portion of the fabric item 50 about to be contacted by the wheel 210.

Figure 3:
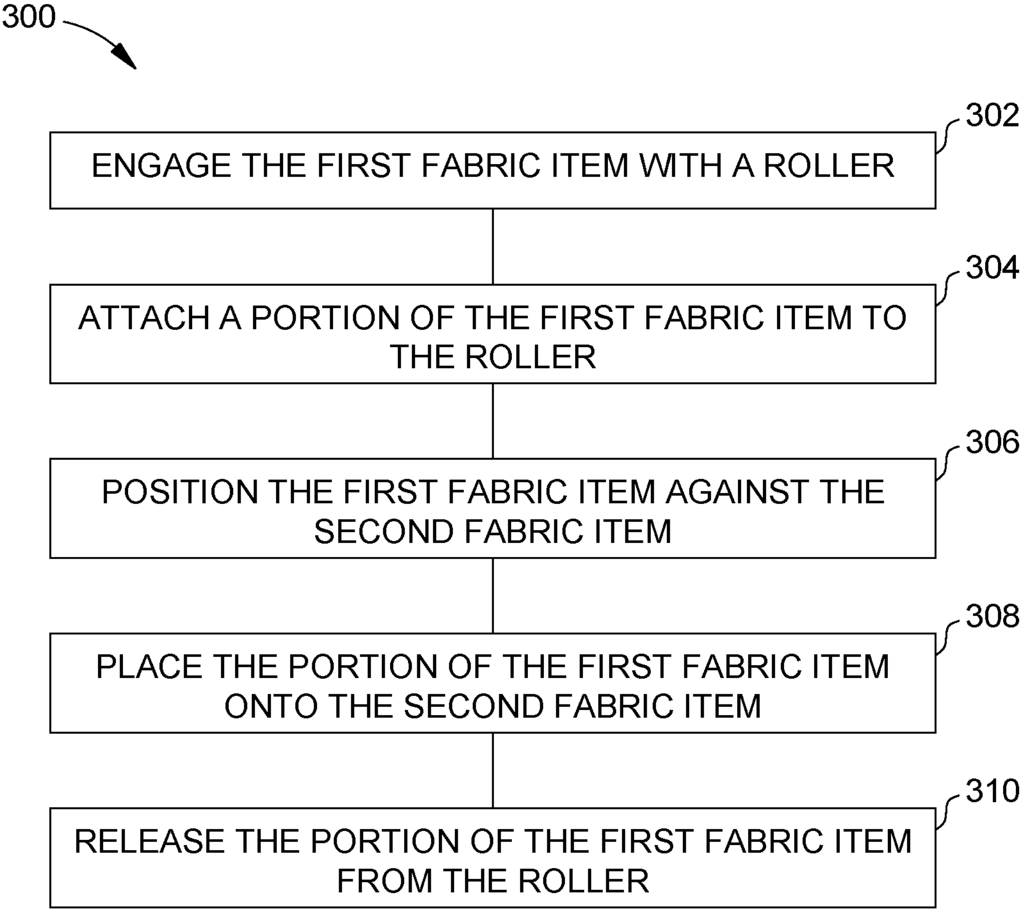
FIG. 3 provides a method of joining a first fabric item to a second fabric item.

FIG. 3 provides a method 300 of joining a first fabric item to a second fabric item, and FIGS. 4A-4F schematically illustrate the method 300. It is contemplated that any activity of any operation of the method 300 may be controlled at least in part by the controller 102.

Figure 4A:
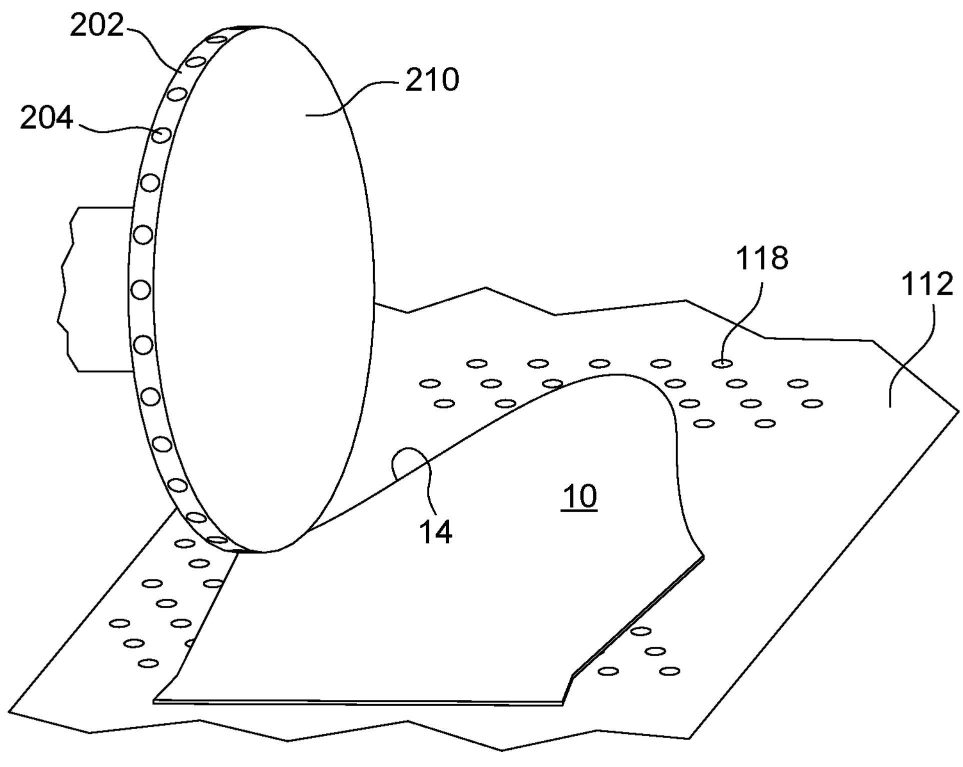
FIGS. 4A-4F schematically illustrate the method of FIG. 3.

At operation 302, the first fabric item is engaged by a roller, such as roller 200, roller assembly 200A, or roller assembly 200B. In the example shown in FIG. 4A, the first fabric item 10 is laying on the work surface 112. In some embodiments, the first fabric item 10 is held on the work surface 112 by a vacuum applied through the perforations 118. The roller is represented by the wheel 210. The first fabric item 10 is shown being contacted by the wheel 210. As described above, it is contemplated that the wheel 210 may include a feature of any one or more wheels of the present disclosure. The contact between the wheel 210 and the first fabric item 10 is at the circumference 202 of the wheel 210. As shown in the example of FIG. 4A, in some embodiments, the wheel 210 contacts the first fabric item 10 at a location proximal to an edge 14 of the first fabric item 10. In some embodiments, the wheel 210 contacts the first fabric item 10 at a location distal from any edge of the first fabric item.

Figure 4B:
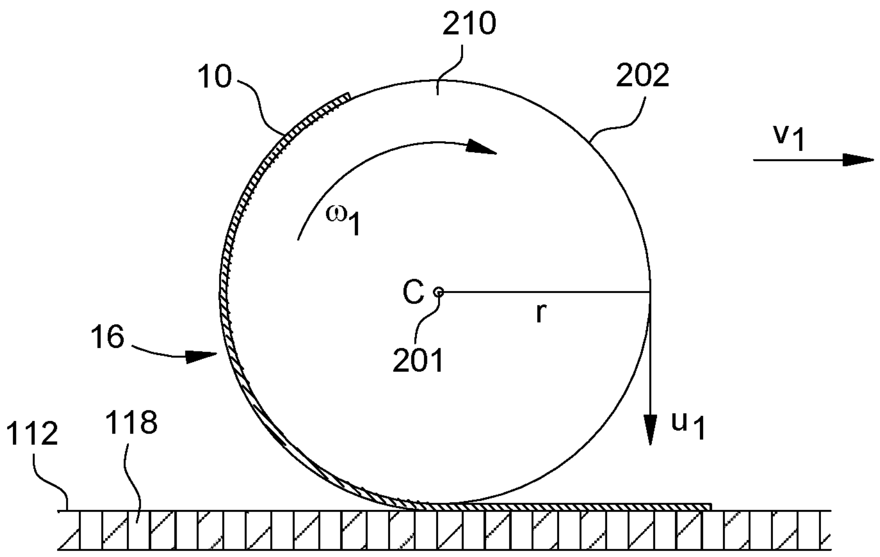

At operation 304, a portion of the first fabric item 10 is attached to the roller. FIG. 4B schematically illustrates the attaching of the portion 16 of the first fabric item 10 to the wheel 210. The wheel 210 is traversed across the first fabric item 10 while the circumference 202 of the wheel 210 remains in contact with the first fabric item 10. The wheel 210 is rotated about the axis of rotation 201 while the wheel 210 is traversed across the first fabric item 10. In an example, a vacuum applied through the apertures (204, FIG. 4A) in the circumference 202 of the wheel 210 holds the portion 16 of the first fabric item 10 onto the wheel 210. It is contemplated that the vacuum applied through the apertures 204 in the circumference 202 of the wheel 210 and/or the vacuum applied through the perforations 118 of the work surface 112 may be regulated such that the portion 16 of the first fabric item 10 is lifted off the work surface 112 and is held on the wheel 210. It is further contemplated that such regulation of the relative magnitude of the vacuums being applied may be performed by the controller 102. In another example, the pins 209 (FIG. 2H) on the circumference 202 of the wheel 210 holds the portion 16 of the first fabric item 10 onto the wheel 210. Rotation of the wheel 210 while applying the vacuum via the apertures 204 and traversing the wheel 210 across the first fabric item 10 lifts the portion 16 off the work surface 112.

In the example shown in FIG. 4B, the wheel 210 is circular with a center C at the axis of rotation 201. The circumference 202 is at a radius r from the center C. The wheel 210 is rotating at an angular velocity of $\omega_1$ about the center C, and the circumference 202 rotates at a linear speed of $u_1$, which equals the product of angular velocity $\omega_1$ and radius r. The wheel 210 is traversed across the first fabric item 10 at a linear speed of $v_1$, while rotating about the center C. In some embodiments, the linear speed $v_1$ at which the wheel 210 is traversed across the first fabric item 10 equals the linear speed of rotation $u_1$ of the circumference 202. In some embodiments, the linear speed $v_1$ at which the wheel 210 is traversed across the first fabric item 10 is greater than the linear speed of rotation $u_1$ of the circumference 202. In some embodiments, the linear speed $v_1$ at which the wheel 210 is traversed across the first fabric item 10 is less than the linear speed of rotation $u_1$ of the circumference 202.

In embodiments in which the linear speed $v_1$ at which the wheel 210 is traversed across the first fabric item 10 is less than the linear speed of rotation $u_1$ of the circumference 202, the portion 16 of the first fabric item 10 becomes stretched. In some examples, the portion 16 of the first fabric item 10 becomes stretched prior to, and during, attachment to the circumference 202 of the wheel 210. In some examples, the portion 16 of the first fabric item 10 remains stretched while attached to the circumference 202 of the wheel 210. In some examples, the portion 16 of the first fabric item 10 becomes at least partially relaxed while attached to the circumference 202 of the wheel 210.

Figure 4C:
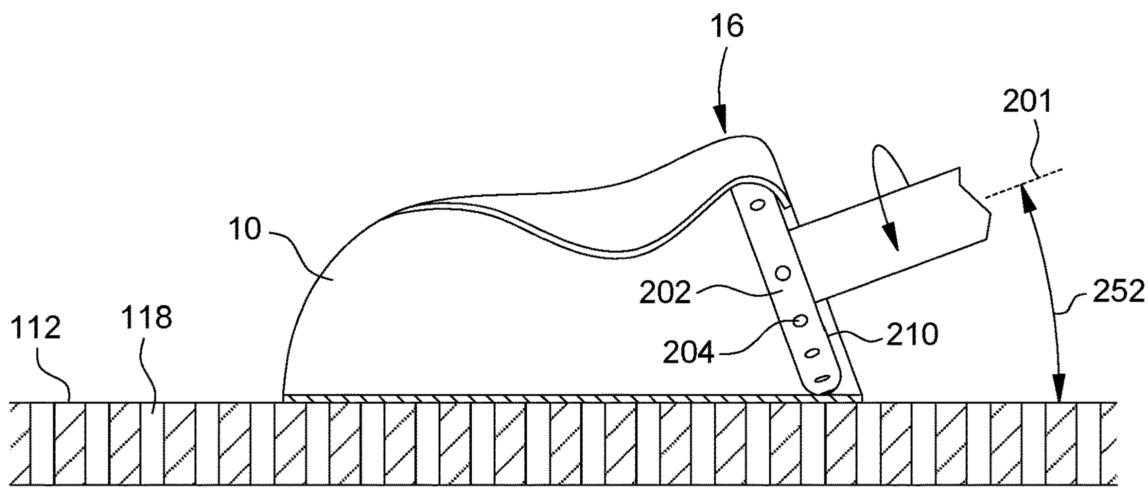

FIG. 4C schematically illustrates an additional or alternative aspect of attachment of the portion 16 of the first fabric item 10 to the wheel 210 during operation 304 in some embodiments. The axis of rotation 201 of the wheel 210 may be tilted at an acute angle 252 with respect to the work surface 112 while traversing the wheel 210 across the first fabric item 10. In some embodiments, the path followed by wheel 210 includes a curved section. In some of such embodiments, tiling the axis of rotation 201 of the wheel 210 at the acute angle 252 with respect to the work surface 112 while traversing the wheel 210 along the curved section can facilitate the wheel 210 picking up the portion 16 of the first fabric item 10 while mitigating wrinkling of the portion 16. In some of such embodiments, the tilting of the axis of rotation 201 of the wheel 210 may be facilitated by the circumference 202 of the wheel 210 including the section 212 (FIG. 2B) that is rounded in a plane parallel to the axis of rotation 201.

In some embodiments, the axis of rotation 201 of the wheel 210 is not tilted at the acute angle 252 with respect to the work surface 112 while traversing the wheel 210 across the first fabric item 10. In some embodiments, the axis of rotation 201 of the wheel 210 is not tilted at the acute angle 252 with respect to the work surface 112 while traversing the wheel 210 across a first section of the first fabric item 10, but the axis of rotation 201 of the wheel 210 is tilted at the acute angle 252 with respect to the work surface 112 while traversing the wheel 210 across a second section of the first fabric item 10.

Figure 4D:
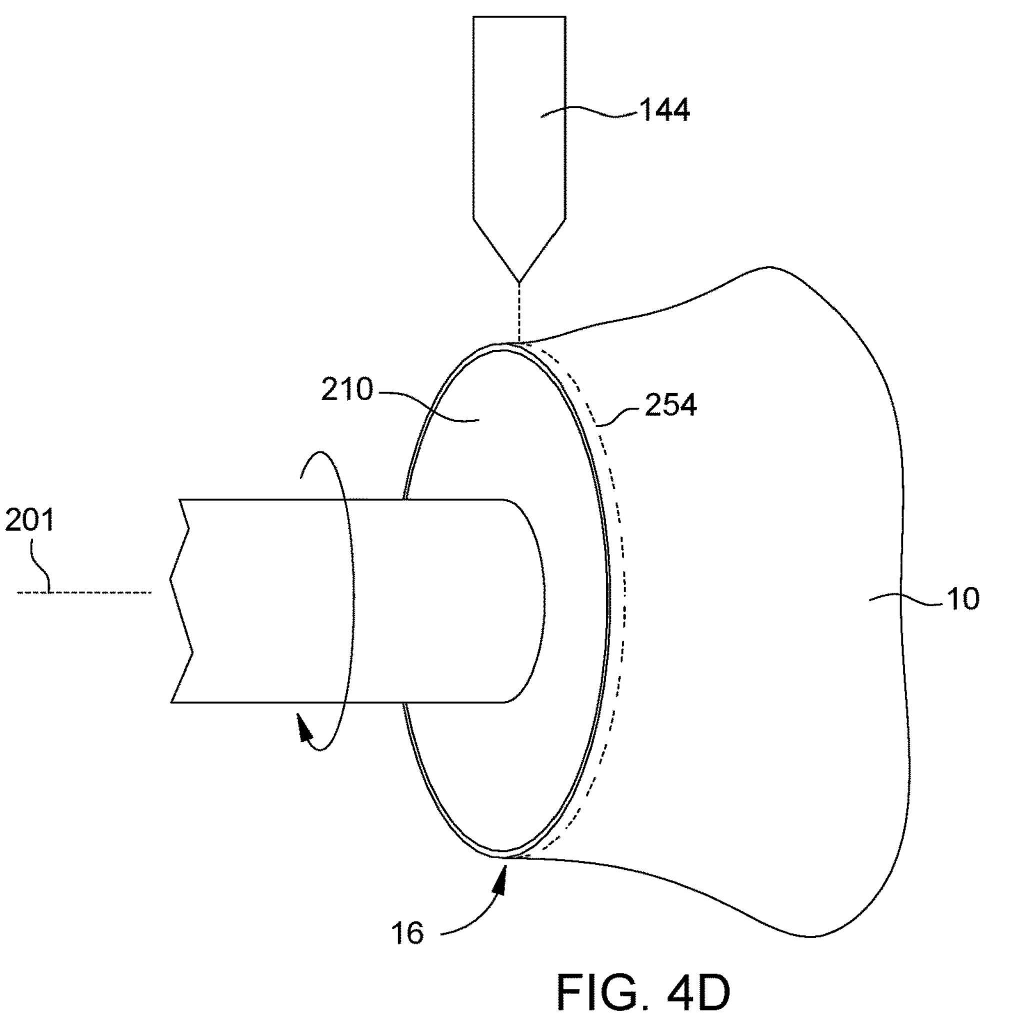
Figure 4E:
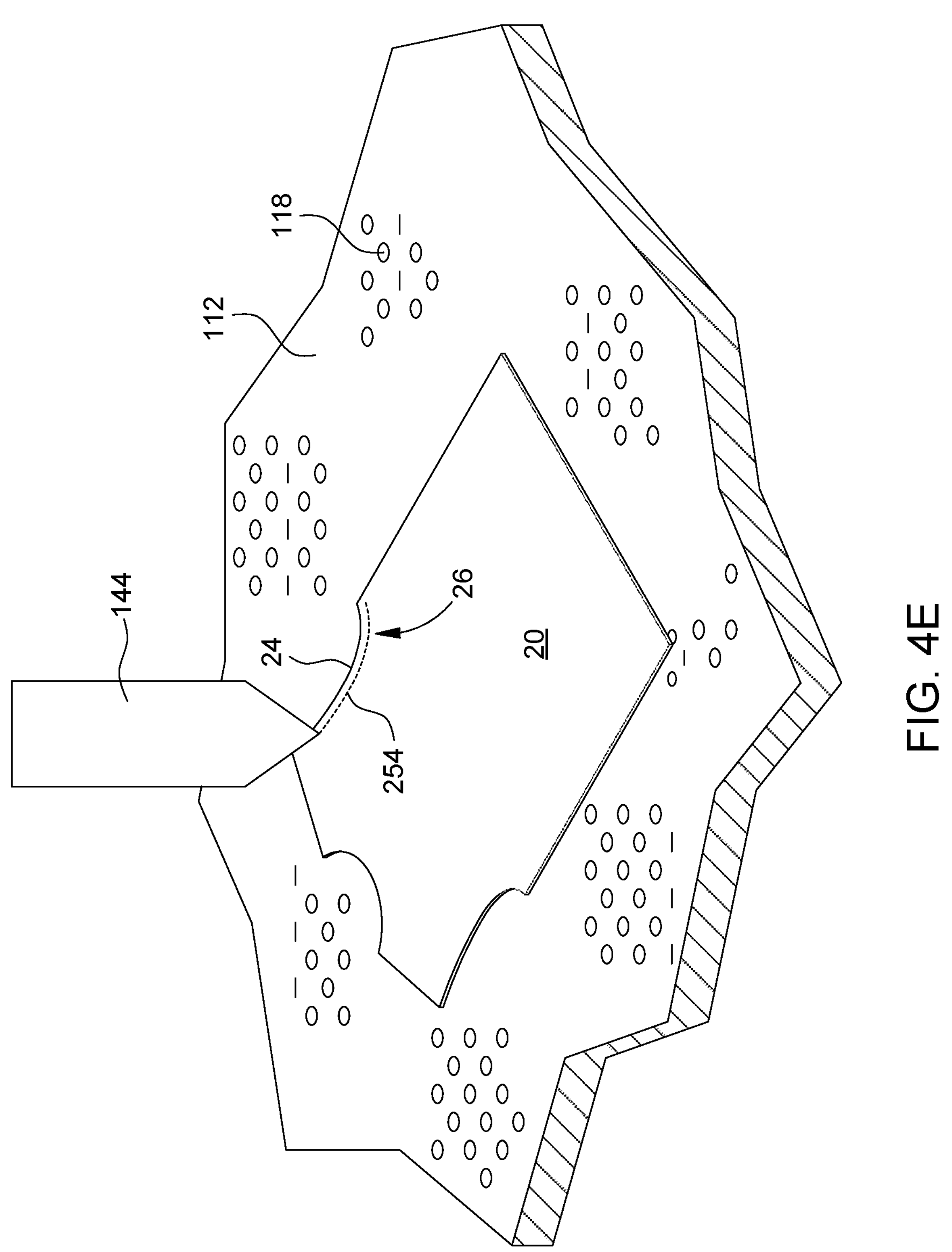

In some embodiments, the method 300 includes an operation involving applying an adhesive to at least one of the first fabric item 10 or the second fabric item (20, FIG. 4E). FIG. 4D schematically illustrates an adhesive applicator 144 applying adhesive 254 to the first fabric item 10, and FIG. 4E schematically illustrates the adhesive applicator 144 applying adhesive 254 to the second fabric item 20.

In some embodiments, the adhesive 254 is applied in the form of a liquid deposited onto the respective first fabric item 10 or second fabric item 20. In some embodiments, the adhesive 254 permeates at least partially into the fabric of the respective first fabric item 10 or second fabric item 20. In some embodiments, the adhesive 254 at least partially remains on a surface of the fabric of the respective first fabric item 10 or second fabric item 20.

In some embodiments, the adhesive 254 is deposited onto the respective first fabric item 10 or second fabric item 20 in one or more of a continuous line, a non-continuous line, one or more droplets, a single line, or multiple lines. In some embodiments, lines or droplets may be deposited onto the respective first fabric item 10 or second fabric item 20 according to one or more of uniform shape, uniform size, uniform separation between adjacent droplets, varying shape, varying size, or varying separation between adjacent droplets. In some embodiments, the adhesive 254 is deposited onto the respective first fabric item 10 or second fabric item 20 in a pattern tailored according to any one or more of a desired seam size, a desired seam strength, a desired accommodation of stretch of the first fabric item 10, or a desired accommodation of stretch of the second fabric item 20.

In some embodiments, operation of the adhesive applicator 144 is controlled by the controller 102. In an example, a sensor (such as the sensor 146, FIG. 1) associated with the adhesive applicator 144 detects a feature of the respective first fabric item 10 or second fabric item 20, such as a printed design or a fiducial on or in the respective first fabric item 10 or second fabric item 20. In another example, a sensor associated with the adhesive applicator 144 detects a characteristic feature of the roller (such as the wheel 210) to which the first fabric item 10 is attached. In another example, a sensor associated with the adhesive applicator 144 detects a characteristic feature of the work surface 112 upon which the second fabric item 20 is laying. In another example, a sensor associated with the adhesive applicator 144 detects a characteristic feature of a structure (such as a frame) to which the second fabric item 20 is mounted. For instance, the detected characteristic feature may include any one or more of a shaped edge, an RFID tag, a printed design, or an embossed design. Additionally, the printed or embossed design may include any one or more of a code, such as a bar code or a QR code. In some embodiments, the sensor includes at least one of: a camera, a barcode reader, a QR code reader, an RFID tag reader, a proximity sensor, or any combination thereof. The controller 102 uses information of the detected feature to direct the adhesive applicator 144 to apply the adhesive 254 at a specific location of the respective first fabric item 10 or second fabric item 20.

FIG. 4D schematically illustrates the adhesive applicator 144 applying adhesive 254 to the portion 16 of the first fabric item 10 after attaching the portion 16 to the circumference 202 of the wheel 210. As illustrated, in some embodiments, the wheel 210 is rotated about the axis of rotation 201 while the adhesive 254 is being applied. In some embodiments, the wheel 210 is rotated about the axis of rotation 201 while traversing across the first fabric item 10 on the work surface 112 while the adhesive 254 is being applied. As illustrated, in some embodiments, the wheel 210 is raised off the work surface 112, and then is rotated about the axis of rotation 201 while the adhesive 254 is being applied. In some embodiments, the method 300 does not include an operation involving the adhesive applicator 144 applying adhesive 254 to the portion 16 of the first fabric item 10.

FIG. 4E schematically illustrates the adhesive applicator 144 applying adhesive 254 to the second fabric item 20. As illustrated, in some embodiments, the adhesive applicator 144 applies adhesive 254 to a portion 26 proximal to an edge 24 of the second fabric item 20. In some embodiments, the adhesive applicator 144 applies adhesive 254 to a portion distal from any edge of the second fabric item 20. In some embodiments, the method 300 does not include an operation involving the adhesive applicator 144 applying adhesive 254 to the second fabric item 20.

Continuing with the method 300 of FIG. 3, at operation 306, the first fabric item 10 is positioned against the second fabric item 20. In some embodiments, the roller (such as the wheel 210) is used to position the first fabric item 10 against the second fabric item 20.

Figure 4F:
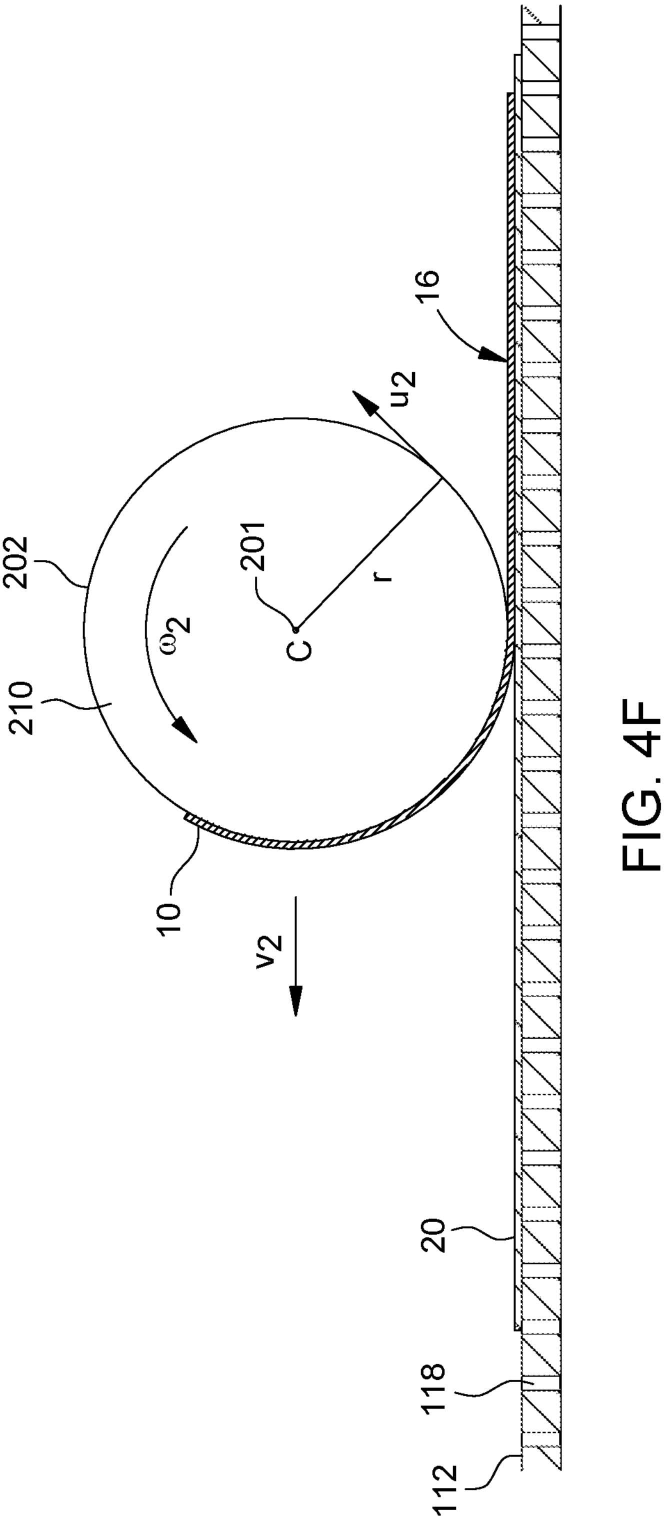

At operation 308, the portion 16 of the first fabric item 10 is placed onto the second fabric item 20. In some embodiments, the portion 16 of the first fabric item 10 is placed onto the second fabric item 20 when the first fabric item 10 is positioned against the second fabric item 20 at operation 306. In some embodiments, as schematically illustrated in FIG. 4F, the portion 16 of the first fabric item 10 is placed onto the second fabric item 20 after the first fabric item 10 is positioned against the second fabric item 20 at operation 306. In some embodiments, the portion 16 of the first fabric item 10 is placed onto the second fabric item 20 by rotating the roller while traversing the roller across the second fabric item 20. In FIG. 4F, the roller is represented by the wheel 210.

In some embodiments, the roller is traversed along a path proximal to an edge (such as the edge 24, FIG. 4E) of the second fabric item 20. In some embodiments, the path followed by the roller includes a curved section. In some of such embodiments, (such as when the roller is represented by the wheel 210), the axis of rotation 201 of the wheel 210 is tilted at an acute angle 252 with respect to the work surface 112 while traversing the wheel 210 along the curved section.

As illustrated in FIG. 4F, the wheel 210 is rotating at an angular velocity of $\omega_2$ about the center C, and the circumference 202 rotates at a linear speed of $u_2$, which equals the product of angular velocity $\omega_2$ and radius r. The wheel 210 is traversed across the second fabric item 20 at a linear speed of $v_2$, while rotating about the center C. In some embodiments, the linear speed $v_2$ at which the wheel 210 is traversed across the second fabric item 20 equals the linear speed of rotation $u_2$ of the circumference 202. In some embodiments, the linear speed $v_2$ at which the wheel 210 is traversed across the second fabric item 20 is greater than the linear speed of rotation $u_2$ of the circumference 202. In some embodiments, the linear speed $v_2$ at which the wheel 210 is traversed across the second fabric item 20 is less than the linear speed of rotation $u_2$ of the circumference 202.

In some embodiments, an amount by which the portion 16 of the first fabric item 10 is stretched when placing the portion 16 onto the second fabric item 20 may be adjusted by selecting and/or tuning the relative magnitudes of the linear speed $v_2$ at which the wheel 210 is traversed and the linear speed of rotation $u_2$ of the circumference 202. In an example, the portion 16 remains stretched while attached to the circumference 202 of the wheel 210, but becomes relaxed when placed on the second fabric item 20. For instance, the portion 16 may become relaxed if the linear speed $v_2$ at which the wheel 210 is traversed across the second fabric item 20 is less than the linear speed of rotation $u_2$ of the circumference 202.

In another example, the amount by which the portion 16 of the first fabric item 10 is stretched while being attached to the circumference 202 of the wheel 210 is maintained when the portion 16 is placed on the second fabric item 20. For instance, the amount by which the portion 16 of the first fabric item 10 is stretched may be maintained if the linear speed $v_2$ at which the wheel 210 is traversed across the second fabric item 20 equals the linear speed of rotation $u_2$ of the circumference 202.

In another example, the portion 16 of the first fabric item 10 is not stretched while being held on the circumference 202 of the wheel 210, but becomes stretched when being placed on the second fabric item 20. For instance, the stretching of the portion 16 of the first fabric item 10 may be achieved if the linear speed $v_2$ at which the wheel 210 is traversed across the second fabric item 20 is greater than the linear speed of rotation $u_2$ of the circumference 202.

In some embodiments, the portion 16 of the first fabric item 10 is stretched while being held on the circumference 202 of the wheel 210, but is not stretched when being placed on the second fabric item 20. In some embodiments, the portion 16 of the first fabric item 10 is stretched while being held on the circumference 202 of the wheel 210, and remains stretched when being placed on the second fabric item 20. The amount by which the portion 16 of the first fabric item 10 remains stretched when being placed on the second fabric item 20 may be greater than, equal to, or less than the amount by which the portion 16 of the first fabric item 10 is stretched while being held on the circumference 202 of the wheel 210.

In some embodiments, the portion 16 of the first fabric item 10 is not stretched while being held on the circumference 202 of the wheel 210, and is not stretched when being placed on the second fabric item 20. In some embodiments, the portion 16 of the first fabric item 10 is not stretched while being held on the circumference 202 of the wheel 210, but becomes stretched when being placed on the second fabric item 20.

In some embodiments, at least a portion (such as the portion 26, FIG. 4E) of the second fabric item 20 is held in a pre-stretched form when the portion 16 of the first fabric item 10 is placed onto the second fabric item 20. In some embodiments, at least a portion (such as the portion 26, FIG. 4E) of the second fabric item 20 that is held in a pre-stretched form becomes relaxed when the portion 16 of the first fabric item 10 is placed onto the second fabric item 20. In some embodiments, the portion of the second fabric item 20 that is held in a pre-stretched form remains stretched when the portion 16 of the first fabric item 10 is placed onto the second fabric item 20. In some embodiments, the second fabric item 20 is not held in a pre-stretched form when the portion 16 of the first fabric item 10 is placed onto the second fabric item 20.

In some embodiments, at least a portion (such as the portion 26, FIG. 4E) of the second fabric item 20 becomes stretched while the portion 16 of the first fabric item 10 is being placed onto the second fabric item 20. In some embodiments, the second fabric item 20 does not become stretched while the portion 16 of the first fabric item 10 is being placed onto the second fabric item 20.

At operation 310 (FIG. 3), the portion 16 of the first fabric item 10 is released from the roller. In some embodiments, the portion 16 of the first fabric item 10 becomes relaxed when released from the roller. FIG. 4F schematically illustrates the portion 16 being released from the wheel 210. In some embodiments, the portion 16 is released from the wheel 210 at least in part by reducing the magnitude of the vacuum applied on the portion 16 through the apertures 204 in the circumference 202 of the wheel 210. In some embodiments, the portion 16 is released from the wheel 210 at least in part by applying a vacuum on the first fabric item 10 through the perforations 118 of the work surface 112 and through the weave of the second fabric item 20. In some embodiments, the portion 16 is released from the wheel 210 at least in part by tailoring a tackiness of the adhesive 254 (FIGS. 4D, 4E) to provide a force to hold the portion 16 onto the second fabric item 20.

In some embodiments, operation 310 is omitted. In an example, rotating the roller while traversing the roller across the second fabric item 20 results in the second fabric item 20 being picked up by the roller. The second fabric item 20 becomes disposed on the first fabric item 10 on the roller.

In some embodiments, the method 300 includes an operation involving curing the adhesive 254 used to attach the first fabric item 10 to the second fabric item 20. Curing the adhesive bonds the first fabric item 10 to the second fabric item 20. In some embodiments, the adhesive 254 is configured to be cured by applying a treatment to the adhesive 254. In some embodiments, the treatment includes at least one of: pressure, heat, moisture, exposure to UV light, exposure to ambient conditions, waiting for a predetermined duration of time, or any combination thereof. In some embodiments, curing the adhesive 254 includes simultaneously applying a combination of any two or more treatments. In some embodiments, curing the adhesive 254 includes sequentially applying a combination of any two or more treatments.

In an example in which the adhesive is cured by applying pressure, the roller (such as wheel 210) is manipulated to squeeze together the first fabric item 10 and the second fabric item 20. In some embodiments, the pressure is applied by the roller during operation 306 when positioning the first fabric item 10 against the second fabric item 20. In some embodiments, the pressure is applied by the roller during operation 308 when placing the portion 16 of the first fabric item 10 onto the second fabric item 20. In some embodiments, the pressure is applied by the roller after operation 310 once the portion 16 of the first fabric item 10 has been released from the roller. For instance, the roller may be manipulated to press against the portion 16 of the first fabric item 10 that had been released from the roller. In some embodiments, the pressure is applied by the roller during at least one of operation 306 or operation 308, and further pressure is applied by the roller after operation 310.

In an example in which the adhesive is cured by applying heat, the heat is applied by the roller (such as wheel 210). For instance, the roller may include a heating element embedded in an outer circumference (such as the circumference 202). Additionally, or alternatively, the heat is applied by the surface (such as work surface 112) upon which the second fabric item 20 is located. For instance, the work surface 112 may include a heating element. In some embodiments, the heat is applied by the roller during operation 306. In some embodiments, the heat is applied by the roller during operation 308. In some embodiments, the heat is applied by the roller after operation 310. For instance, the roller may be manipulated to contact, and apply heat to, the portion 16 of the first fabric item 10 that had been released from the roller in operation 310.

Additionally, or alternatively, the heat may be applied by the surface upon which the second fabric item 20 is located during at least one of operation 306 or operation 308. Additionally, or alternatively, the heat may be applied by the surface upon which the second fabric item 20 is located during or after operation 310. In some embodiments, the heat is applied by at least one of the roller or the surface upon which the second fabric item 20 is located during at least one of operation 306 or operation 308, and further heat is applied during or after operation 310.

Figure 4G:
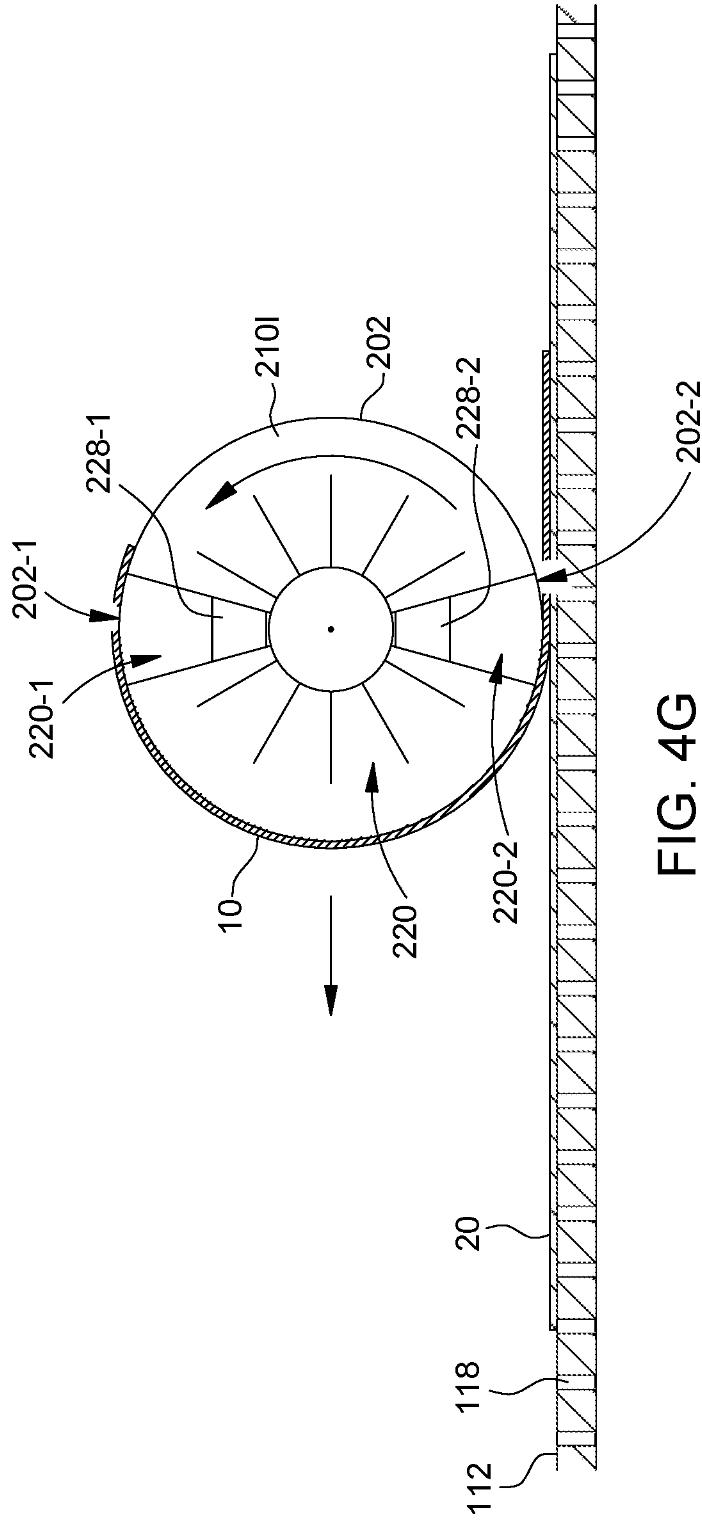
Figure 4H:
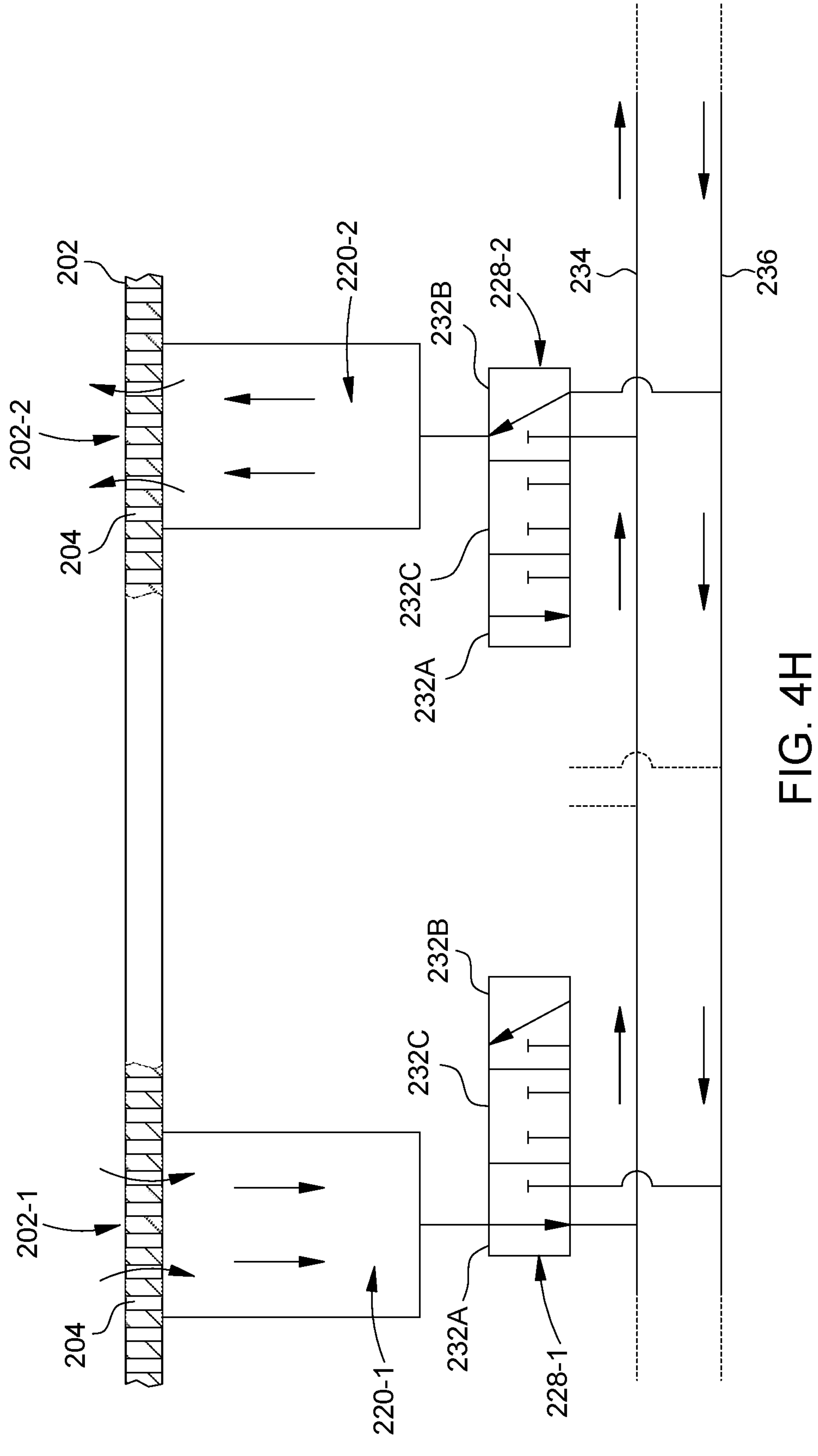

In another example in which the adhesive is cured by applying heat, the heat is applied by a heating medium, such as hot air or steam. For instance, the roller may be adapted to supply the heating medium. An example of such adaptation is schematically illustrated in FIGS. 4G and 4H. FIG. 4G shows a roller, represented by wheel 210I. Wheel 210I includes internal compartments 220, such as described above with respect to FIGS. 2E-2G. It is contemplated that the wheel 210 may include a feature of any one or more wheels of the present disclosure.

The wheel 210I is shown placing the first fabric item 10 onto the second fabric item 20. The wheel 210I is being rotated while it is being traversed across the second fabric item 20. Compartment 220-1 is associated with a section 202-1 of the circumference 202 where the first fabric item 10 is being held on the circumference 202 while the wheel 210I continues to rotate and traverse across the second fabric item 20. A valve 228-1 associated with the compartment 220-1 is configured to fluidically couple the compartment 220-1 to a vacuum source (such as the vacuum system 104) such that the vacuum is applied through the compartment 220-1 and the section 202-1 of the circumference 202. The vacuum holds the first fabric item 10 onto the section 202-1 of the circumference 202.

Compartment 220-2 is associated with a section 202-2 of the circumference 202 where the first fabric item 10 is being brought into contact with the second fabric item 20, and the first fabric item 10 is being released from the wheel 210I. A valve 228-2 associated with the compartment 220-2 is configured to fluidically couple the compartment 220-2 to a source of hot air or steam such that the hot air or steam flows through the compartment 220-2 and out of the section 202-2 of the circumference 202. The hot air or steam contacts the first fabric item 10 and the second fabric item 20 to cure the adhesive.

FIG. 4H schematically diagrams a portion of the valving in the wheel 210I of FIG. 4G. The wheel 210I includes a vacuum manifold 234 and a heating manifold 236. In some embodiments, the vacuum manifold 234 is coupled to the vacuum system 104. In embodiments in which the heating is provided by hot air, the heating manifold 236 is a hot air manifold. In embodiments in which the heating is provided by steam, the heating manifold 236 is a steam manifold. It is contemplated that the heating manifold 236 is coupled to a source of the corresponding fluid—hot air or steam.

Each valve 228-1, 228-2 regulates fluidic connections between the corresponding compartment 220-1, 220-2, respectively, and each manifold 234, 236. In the illustrated embodiment, each valve 228-1, 228-2 includes three positions. In the first position 232A, the corresponding compartment 220-1, 220-2 is fluidically coupled with the vacuum manifold 234, but is not fluidically coupled with the heating manifold 236. In the second position 232B, the corresponding compartment 220-1, 220-2 is not fluidically coupled with the vacuum manifold 234 but is fluidically coupled with the heating manifold 236. In the third position 232C, the corresponding compartment 220-1, 220-2 is not fluidically coupled with the vacuum manifold 234 and is not fluidically coupled with the heating manifold 236.

The valve 228-1 is in the first position 232A. A vacuum applied via the vacuum manifold 234 draws air through the apertures 204 in the section 202-1 of the circumference 202 into the compartment 220-1. The valve 228-2 is in the second position 232B. The heating medium (hot air or steam) is supplied via the heating manifold 236 to the compartment 220-2 and is emitted through the apertures 204 in the section 202-2 of the circumference 202. In some embodiments, operation of the valves 228-1, 228-2 is controlled by the controller 102.

In some embodiments, the valves 228-1, 228-2 include fewer than three positions. For example, the valves 228-1, 228-2 may not include the third position, and toggle only between the first position 232A and the second position 232B. In some embodiments, each valve 228-1, 228-2 is represented by a separate pair of individual valves. In each pair of individual valves, one valve regulates the fluidic coupling with the vacuum manifold 234 and the other individual valve regulates the fluidic coupling with the heating manifold 236.

In another example in which the adhesive is cured by applying heat, the heat is applied by the heating medium (such as hot air or steam) via the surface (such as work surface 112) upon which the second fabric item 20 is located. For instance, the hot air or steam may be emitted via the perforations 118 in the work surface 112. In some embodiments, the heating medium is applied via at least one of the roller or the surface upon which the second fabric item 20 is located during at least one of operation 306 or operation 308. Additionally, or alternatively, the heating medium is applied via at least one of the roller or the surface upon which the second fabric item 20 is located during or after operation 310. In some embodiments, the heating medium is applied via at least one of the roller or the surface upon which the second fabric item 20 is located during at least one of operation 306 or operation 308, and further heat is applied during or after operation 310.

In an example in which the adhesive is cured by applying moisture, the moisture is applied by the roller (such as wheel 210). For instance, the roller may be adapted to supply the moisture. The roller may be configured similarly to the wheel 210I, described above, such that the moisture is supplied via the heating manifold 236. Operation of the roller to apply the moisture may be similar to the operation, described above, of the wheel 210I in applying the heating medium. Additionally, or alternatively, the moisture may be applied by the surface (such as work surface 112) upon which the second fabric item 20 is located. For instance, the moisture may be emitted via the perforations 118 in the work surface 112. In some embodiments, the moisture is applied via at least one of the roller or the surface upon which the second fabric item 20 is located during at least one of operation 306 or operation 308. Additionally, or alternatively, the moisture is applied via at least one of the roller or the surface upon which the second fabric item 20 is located during or after operation 310. In some embodiments, the moisture is applied via at least one of the roller or the surface upon which the second fabric item 20 is located during at least one of operation 306 or operation 308, and further moisture is applied during or after operation 310.

In some embodiments, a single action may perform the application of a combination of treatments. For example, the adhesive 254 may be cured by the application of a combination of heat and moisture, which can be performed by applying steam. In some embodiments, a combination of treatments may be applied by the same apparatus. For example, the roller may be used to apply heat and pressure. In some embodiments, a combination of treatments may be applied by different apparatus. For example, the roller may be used to apply pressure, whereas heat and/or moisture may be applied via the surface upon which the second fabric item 20 is located.

In some embodiments, the method 300 joins the right side of the first fabric item 10 to the right side of the second fabric item 20. In some embodiments, the method 300 joins the right side of the first fabric item 10 to the wrong side of the second fabric item 20. In some embodiments, the method 300 joins the wrong side of the first fabric item 10 to the right side of the second fabric item 20. In some embodiments, the method 300 joins the wrong side of the first fabric item 10 to the wrong side of the second fabric item 20.

In some embodiments, the method 300 joins the first fabric item 10 to the second fabric item 20 and creates a butterfly seam. In some embodiments, the method 300 joins the first fabric item 10 to the second fabric item 20 and creates an overlap seam.

FIGS. 5A-5E, 6A-6D, 7A-7E, and 8A-8C schematically illustrate further exemplary applications of the method 300. It is contemplated that any individual activity of any operation illustrated by any one of FIG. 5A-5E, 6A-6D, 7A-7E, or 8A-8C, or described with respect to any one of FIG. 5A-5E, 6A-6D, 7A-7E, or 8A-8C, may be controlled at least in part by the controller 102. Additionally, it is contemplated that the activities shown and/or described with respect to any one of FIG. 5A-5E, 6A-6D, 7A-7E, or 8A-8C may further include one or more activities associated with one or more operations described above with respect to the method 300.

Figure 5B:
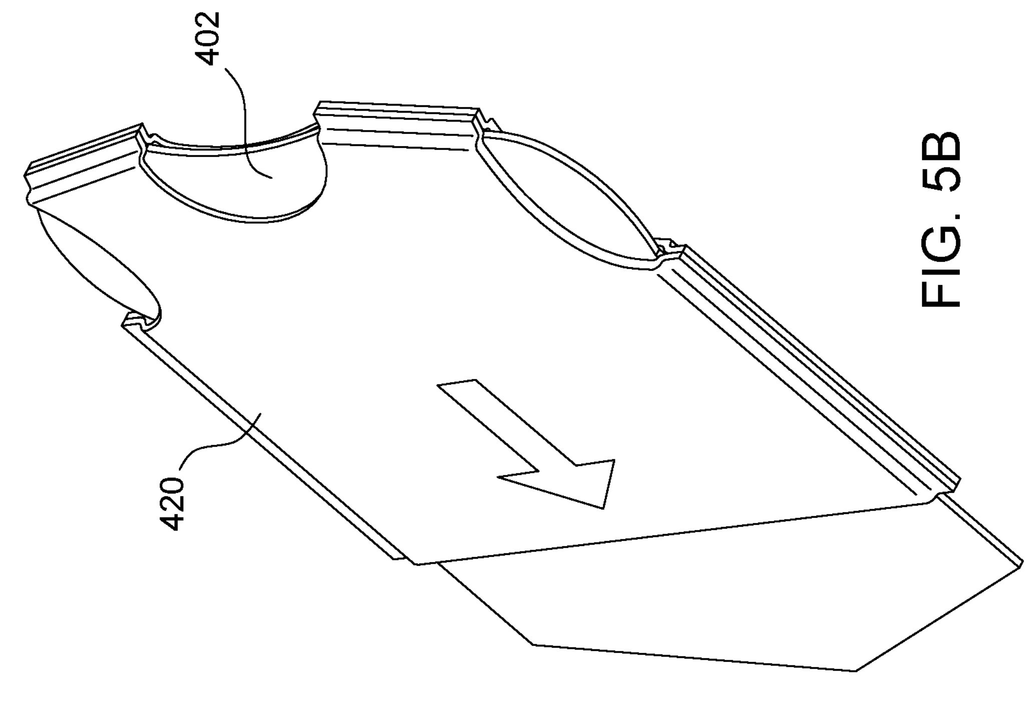
FIGS. 5A-5E schematically illustrate further exemplary applications of the method of FIG. 3.
Figure 5A:
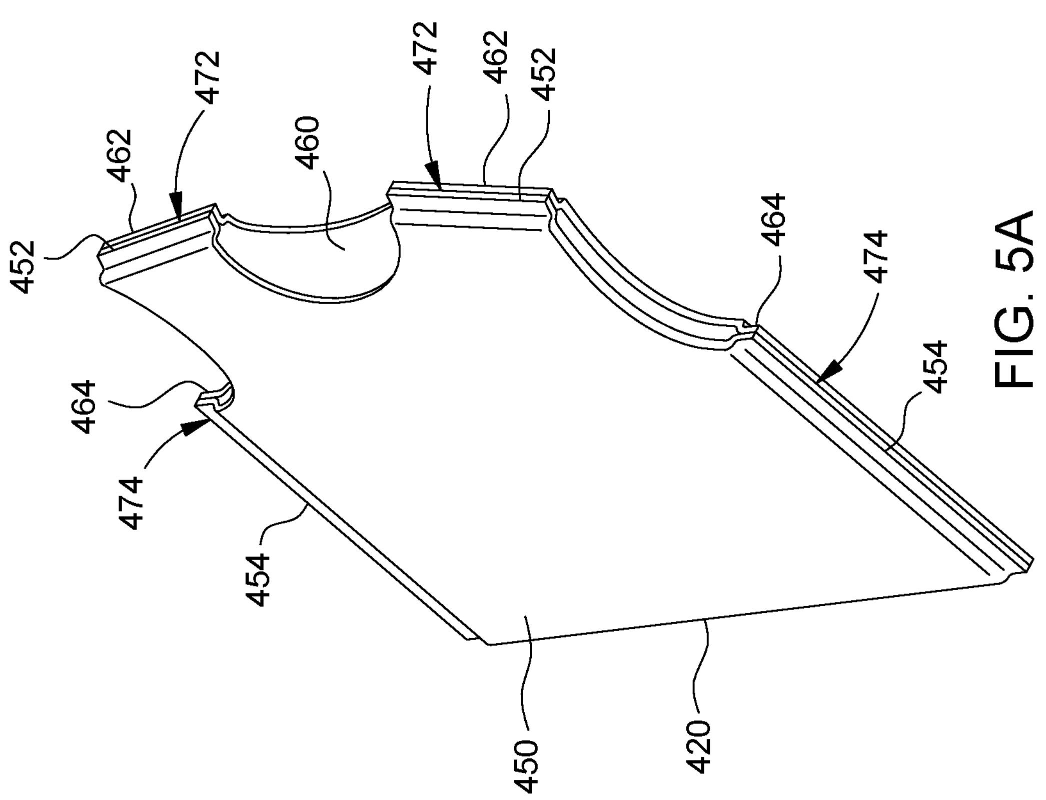

In FIGS. 5A-5E, the first fabric item 10 is represented by first fabric item 410, and the second fabric item 20 is represented by second fabric item 420. As illustrated in FIG. 5A, the second fabric item 420 includes first component 450 and the second component 460. The first component 450 and the second component 460 are joined together. The joins at corresponding top edges 452, 462 of the first component 450 and the second component 460, respectively, form top seams 472. The joins at corresponding side edges 454, 464 of the first component 450 and the second component 460, respectively, form side seams 474. As illustrated, in some embodiments, the top seams 472 and the side seams 474 are butterfly seams. In some embodiments, the top seams 472 and/or the side seams 474 may include one or more other styles of seam, such as an overlap seam.

Figures 5C, 5D, 5E:
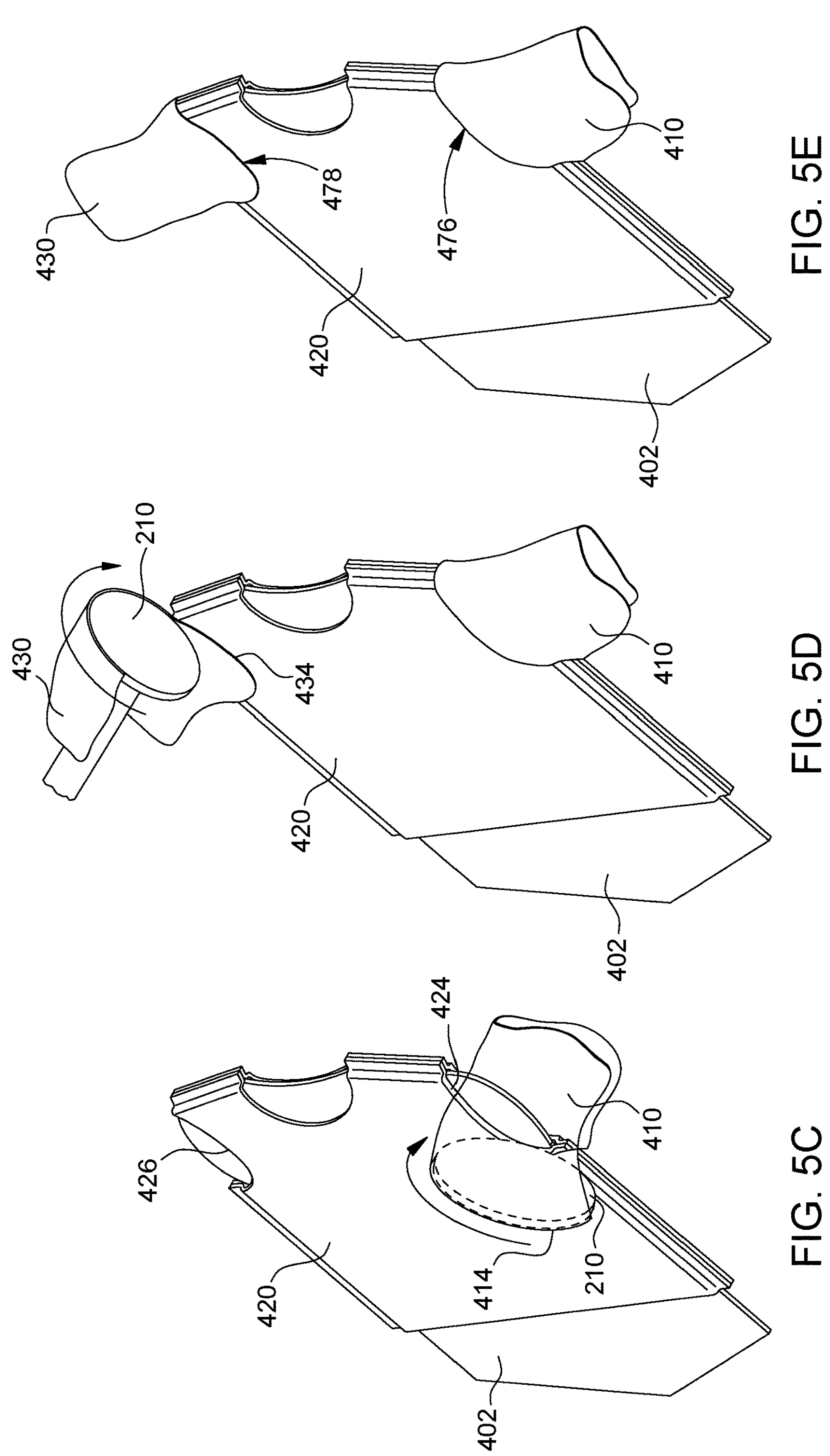

In FIG. 5B, the second fabric item 420 is placed over a frame 402. The frame 402 provides support to the second fabric item 420 for the joining of the second fabric item 420 with the first fabric item 410 (FIGS. 5C-5E). In some embodiments, the second fabric item 420 is stretched when placed over the frame 402.

In FIG. 5C, the first fabric item 410 is placed onto the second fabric item 420. The first fabric item 410 is positioned on the second fabric item 420 such that an edge 414 of the first fabric item 410 is placed proximal to an edge 424 of the second fabric item 420. The first fabric item 410 is oriented to extend away from the second fabric item 420 from the edge 424. The first fabric item 410 is shown attached to a roller, represented as wheel 210. In some embodiments, the first fabric item 410 will have become attached to the wheel 210 by any of the activities or operations described above with respect to the method 300.

In some embodiments, the adhesive 254 (FIGS. 4D, 4E) is applied to at least one of the first fabric item 410 or the second fabric item 420, such as by a method described above with respect to the method 300, prior to placing the first fabric item 410 onto the second fabric item 420. The first fabric item 410 is placed onto the second fabric item 420 by rotating the wheel 210 while traversing the wheel across the second fabric item 420. The first fabric item 410 is released from the wheel 210 while the wheel 210 rotates and traverses across the second fabric item 420.

FIG. 5D shows the first fabric item 410 joined to the second fabric item 420 as a result of the foregoing operations. As illustrated, in some embodiments, a third fabric item 430 is placed onto the second fabric item 420. In the illustrated example, the third fabric item 430 is positioned on the second fabric item 420 such that an edge 434 of the third fabric item 430 is placed proximal to the edge 426 (labeled in FIG. 5C) of the second fabric item 420. The third fabric item 430 is oriented to extend away from the second fabric item 420 from the edge 426. The third fabric item 430 is shown attached to a roller, represented as wheel 210. In some embodiments, the third fabric item 430 will have become attached to the wheel 210 by any of the activities or operations described above with respect to the method 300.

In some embodiments, the adhesive 254 (FIGS. 4D, 4E) is applied to at least one of the third fabric item 430 or the second fabric item 420, such as by a method described above with respect to the method 300, prior to placing the third fabric item 430 onto the second fabric item 420. The third fabric item 430 is placed on the second fabric item 420 in a similar way as described above with respect to the first fabric item 410. The third fabric item 430 is released from the wheel 210 while the wheel 210 rotates and traverses across the second fabric item 420.

FIG. 5E shows the first fabric item 410 and the third fabric item 430 joined to the second fabric item 420 as a result of the foregoing operations. The seam 476 created by joining the first fabric item 410 to the second fabric item 420 is an overlap seam. The seam 478 created by joining the third fabric item 430 to the second fabric item 420 is an overlap seam.

In some embodiments, the foregoing operations include curing the adhesive, such as described above with respect to the method 300. Curing the adhesive bonds the first fabric item 410 to the second fabric item 420 and bonds the third fabric item 430 to the second fabric item 420.

In the illustrated example, the second fabric item 420 is oriented with the wrong side facing outwards, and the first fabric item 410 and the third fabric item 430 are joined to the wrong side of the second fabric item 420. In some embodiments, the second fabric item 420 is oriented with the right side facing outwards, and the first fabric item 410 and the third fabric item 430 are joined to the right side of the second fabric item 420. In the illustrated example, the first fabric item 410 and the third fabric item 430 are oriented with the wrong sides facing outwards. In some embodiments, the first fabric item 410 and the third fabric item 430 are oriented with the right sides facing outwards.

In the illustrated example, the right sides of the first fabric item 410 and the third fabric item 430 are joined to the wrong side of the second fabric item 420. In some embodiments, the right sides of the first fabric item 410 and the third fabric item 430 are joined to the right side of the second fabric item 420. In some embodiments, the wrong sides of the first fabric item 410 and the third fabric item 430 are joined to the right side of the second fabric item 420. In some embodiments, the wrong sides of the first fabric item

410 and the third fabric item 430 are joined to the wrong side of the second fabric item 420.

Figure 6A:
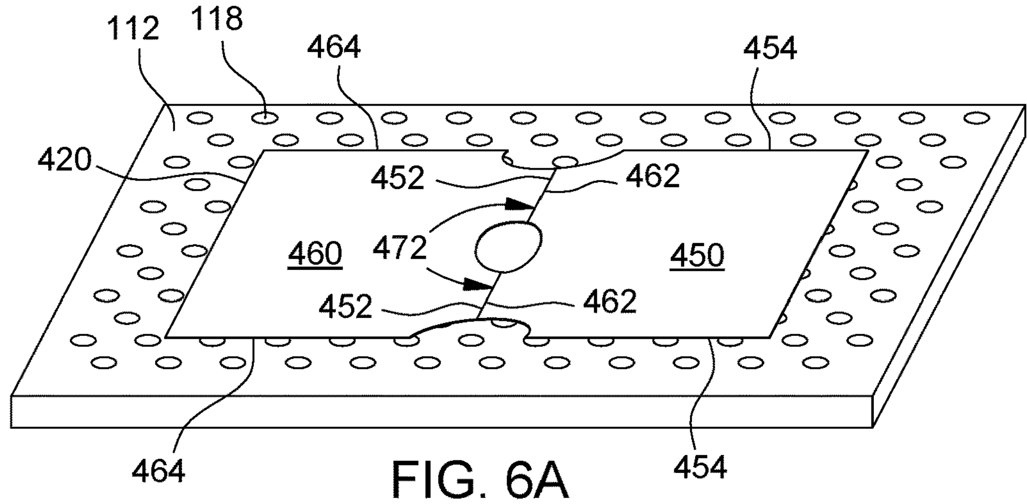
FIGS. 6A-6D schematically illustrate further exemplary applications of the method of FIG. 3.

In FIGS. 6A-6D, the first fabric item 10 is represented by first fabric item 410, and the second fabric item 20 is represented by second fabric item 420. As illustrated in FIG. 6A, the second fabric item 420 includes the first component 450 and the second component 460. The first component 450 and the second component 460 are joined together. The joins at corresponding top edges 452, 462 of the first component 450 and the second component 460, respectively, form top seams 472. As illustrated, in some embodiments, the top seams 472 are butterfly seams. In some embodiments, the top seams 472 may include one or more other styles of seam, such as an overlap seam. In the illustrated example, the side edges 454, 464 of the first component 450 and the second component 460, respectively, are not joined.

Figure 6B:
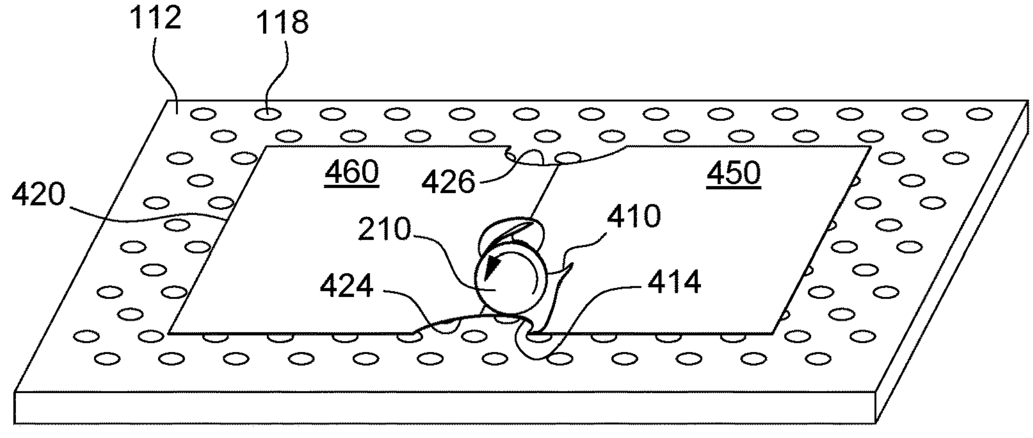

In FIG. 6B, the second fabric item 420 is shown placed on a work surface 112. In some embodiments, the second fabric item 420 is held on the work surface 112 by a vacuum applied through the perforations 118. The second fabric item 420 is spread open such that one side of each of the first component 450 and the second component 460 of the second fabric item 420 faces the work surface 112, and the other side of each of the first component 450 and the second component 460 of the second fabric item 420 faces upwards.

The first fabric item 410 is placed onto the second fabric item 420. The first fabric item 410 is positioned on the second fabric item 420 such that the edge 414 of the first fabric item 410 is placed proximal to the edge 424 of the second fabric item 420. The first fabric item 410 is oriented to extend from the edge 424 of the second fabric item 420 towards the opposite edge 426 of the second fabric item 420. The first fabric item 410 is shown attached to a roller, represented as wheel 210. In some embodiments, the first fabric item 410 will have become attached to the wheel 210 by any of the activities or operations described above with respect to the method 300.

In some embodiments, the adhesive 254 (FIGS. 4D, 4E) is applied to at least one of the first fabric item 410 or the second fabric item 420, such as by a method described above with respect to the method 300, prior to placing the first fabric item 410 onto the second fabric item 420. The first fabric item 410 is placed onto the second fabric item 420 by rotating the wheel 210 while traversing the wheel across the second fabric item 420. The first fabric item 410 is released from the wheel 210 while the wheel 210 rotates and traverses across the second fabric item 420.

Figure 6C:
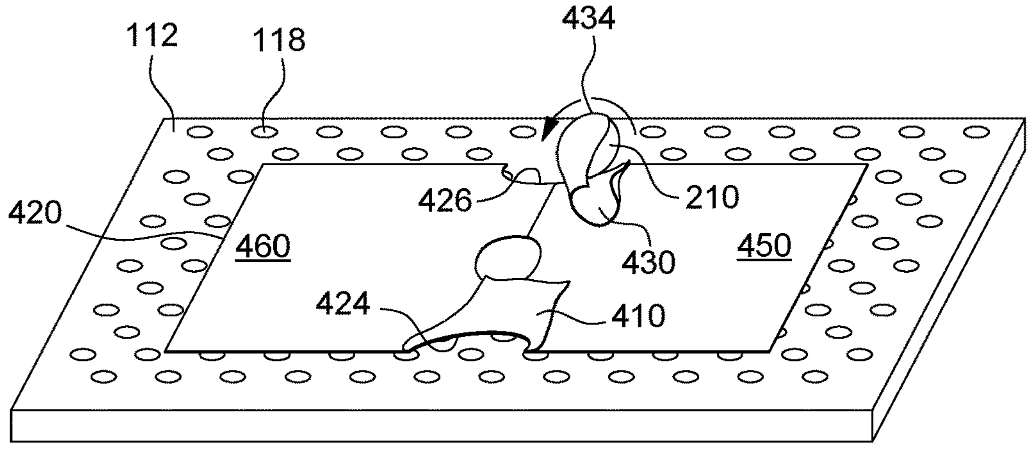

FIG. 6C shows the first fabric item 410 joined to the second fabric item 420 as a result of the foregoing operations. As illustrated, in some embodiments, a third fabric item 430 is placed onto the second fabric item 420. In the illustrated example, the third fabric item 430 is positioned on the second fabric item 420 such that an edge 434 of the third fabric item 430 is placed proximal to the edge 426 of the second fabric item 420. The third fabric item 430 is oriented to extend from the edge 426 of the second fabric item 420 towards the opposite edge 424 of the second fabric item 420. The third fabric item 430 is shown attached to a roller, represented as wheel 210. In some embodiments, the third fabric item 430 will have become attached to the wheel 210 by any of the activities or operations described above with respect to the method 300.

In some embodiments, the adhesive 254 (FIGS. 4D, 4E) is applied to at least one of the third fabric item 430 or the second fabric item 420, such as by a method described above with respect to the method 300, prior to placing the third fabric item 430 onto the second fabric item 420. The third fabric item 430 is placed on the second fabric item 420 in a similar way as described above with respect to the first fabric item 410. The third fabric item 430 is released from the wheel 210 while the wheel 210 rotates and traverses across the second fabric item 420.

As illustrated, in some embodiments, the first fabric item 410 and the third fabric item 430 are placed on the second fabric item 420 sequentially. In other embodiments, the first fabric item 410 and the third fabric item 430 are placed on the second fabric item 420 at least partially simultaneously.

Figure 6D:
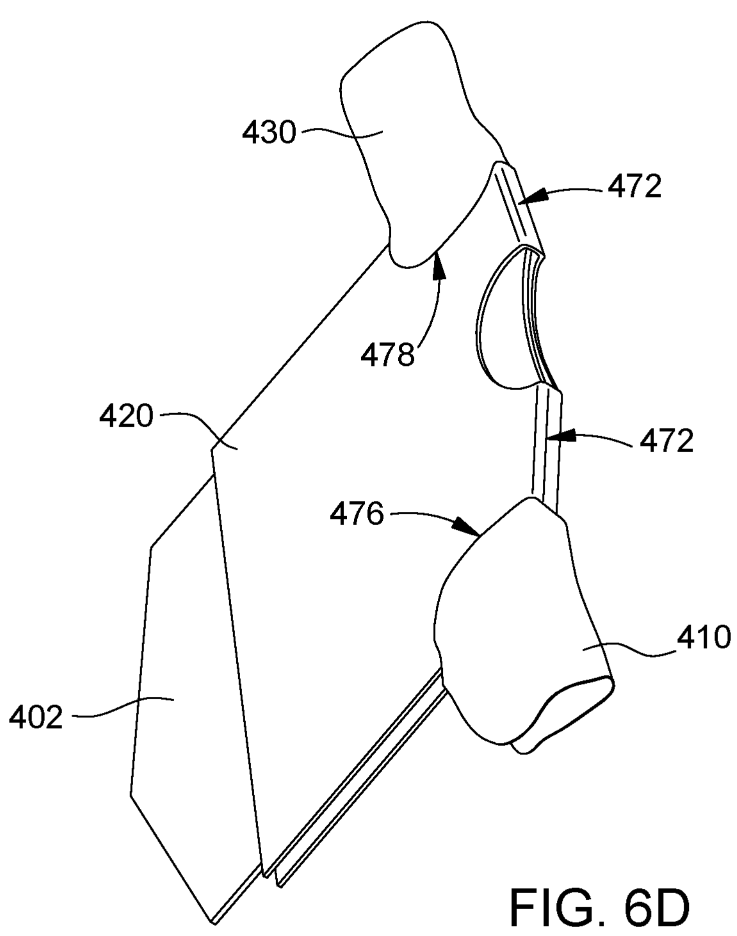

FIG. 6D shows the first fabric item 410 and the third fabric item 430 joined to the second fabric item 420 as a result of the foregoing operations. The second fabric item 420 is depicted on the frame 402 in order to highlight the outcome of the joining operations. The first fabric item 410 is shown re-oriented to extend away from the second fabric item 420 from the edge 424. The third fabric item 430 is shown re-oriented to extend away from the second fabric item 420 from the edge 426. The seam 476 created by joining the first fabric item 410 to the second fabric item 420 is a butterfly seam. The seam 478 created by joining the third fabric item 430 to the second fabric item 420 is a butterfly seam.

In some embodiments, the foregoing operations include curing the adhesive, such as described above with respect to the method 300. Curing the adhesive bonds the first fabric item 410 to the second fabric item 420 and bonds the third fabric item 430 to the second fabric item 420.

In the illustrated example, the second fabric item 420 is oriented with the right side facing outwards, and the first fabric item 410 and the third fabric item 430 are joined to the right side of the second fabric item 420. In some embodiments, the second fabric item 420 is oriented with the wrong side facing outwards, and the first fabric item 410 and the third fabric item 430 are joined to the wrong side of the second fabric item 420. In the illustrated example, the first fabric item 410 and the third fabric item 430 are oriented with the wrong sides facing outwards during the joining process depicted in FIGS. 6B and 6C. In some embodiments, the first fabric item 410 and the third fabric item 430 are oriented with the right sides facing outwards during the joining process. In the illustrated example, the first fabric item 410 and the third fabric item 430 are oriented with the right sides facing outwards in FIG. 6D after re-orientation. In some embodiments, the first fabric item 410 and the third fabric item 430 are oriented with the wrong sides facing outwards after re-orientation.

In the illustrated example, the right sides of the first fabric item 410 and the third fabric item 430 are joined to the right side of the second fabric item 420. In some embodiments, the wrong sides of the first fabric item 410 and the third fabric item 430 are joined to the right side of the second fabric item 420. In some embodiments, the right sides of the first fabric item 410 and the third fabric item 430 are joined to the wrong side of the second fabric item 420. In some embodiments, the wrong sides of the first fabric item 410 and the third fabric item 430 are joined to the wrong side of the second fabric item 420.

Figure 7A:
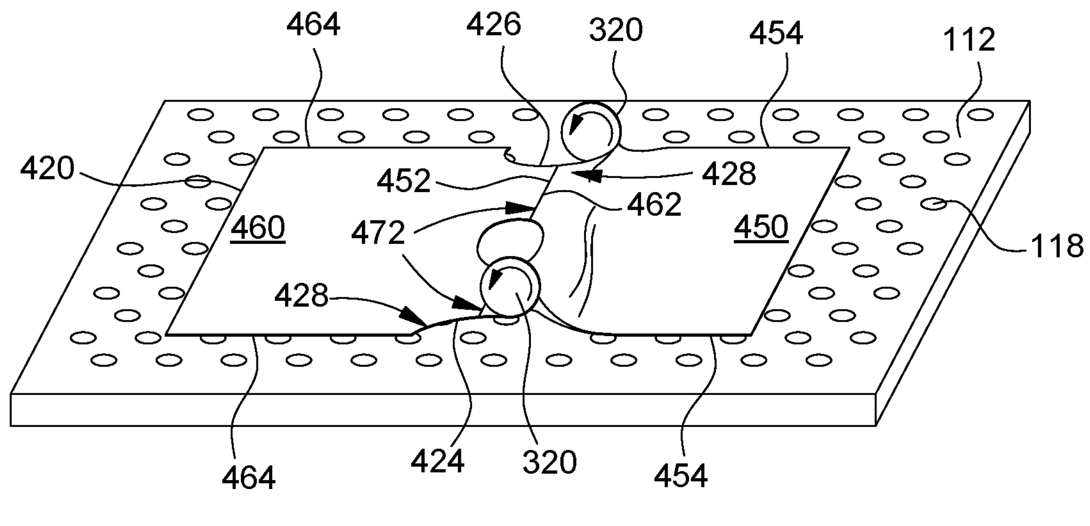
FIGS. 7A-7E schematically illustrate further exemplary applications of the method of FIG. 3.

In FIGS. 7A-7E, the first fabric item 10 is represented by first fabric item 410, and the second fabric item 20 is represented by second fabric item 420. As illustrated in FIG. 7A, the second fabric item 420 includes the first component 450 and the second component 460. The first component 450 and the second component 460 are joined together. The joins at corresponding top edges 452, 462 of the first component 450 and the second component 460, respectively, form top seams 472. As illustrated, in some embodiments, the top seams 472 are butterfly seams. In some embodiments, the top seams 472 may include one or more other styles of seam, such as an overlap seam. In the illustrated example, the side edges 454, 464 of the first component 450 and the second component 460, respectively, are not joined.

In FIG. 7A, the second fabric item 420 is shown placed on a work surface 112. In some embodiments, the second fabric item 420 is held on the work surface 112 by a vacuum applied through the perforations 118. The second fabric item 420 is spread open such that one side of each of the first component 450 and the second component 460 of the second fabric item 420 faces the work surface 112, and the other side of each of the first component 450 and the second component 460 of the second fabric item 420 faces upwards.

The second fabric item 420 is shown being lifted off the work surface 112 by holding rollers 320. It is contemplated that the holding rollers 320 can be configured similarly to any of rollers 200, such as wheel 210. As illustrated, in some embodiments, the holding rollers 320 are separate rollers. In some embodiments, the holding rollers 320 are operatively coupled together. In some embodiments, the holding rollers 320 are part of the same roller. The holding rollers 320 contact and pick up the second fabric item 420 at portions 428 close to the edges 424 and 426. It is contemplated that the holding rollers 320 simultaneously pick up the second fabric item 420, and in a fashion the same as, or similar to, the operations described above with respect to the method 300. In some embodiments, operation of the holding rollers 320 is controlled at least in part by the controller 102.

Figure 7C:
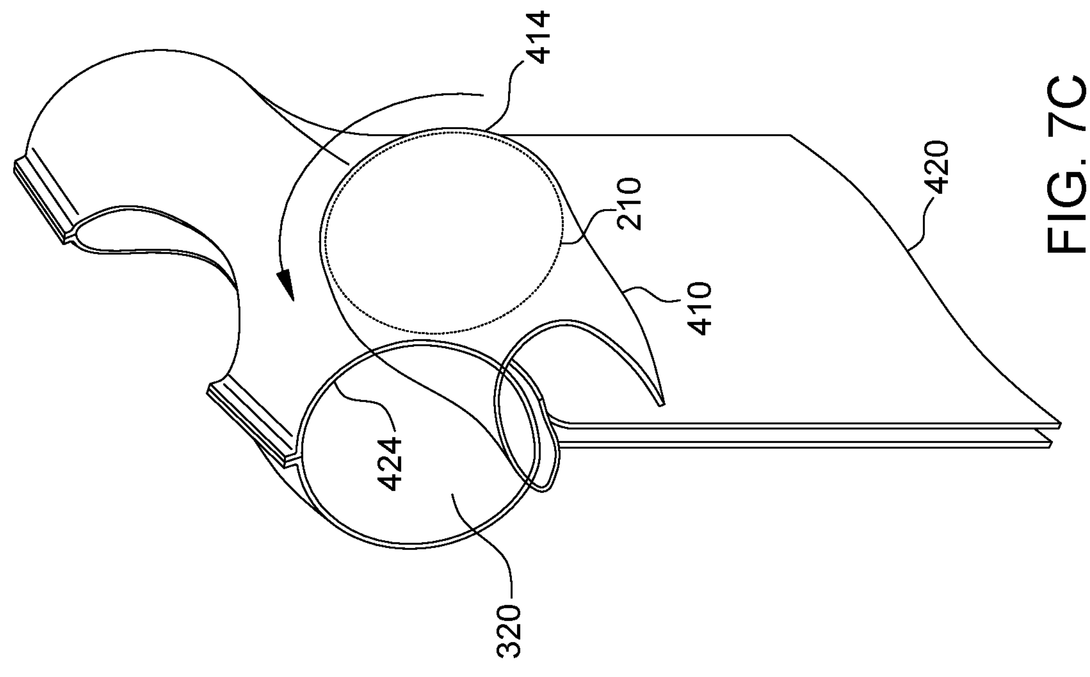
Figure 7B:
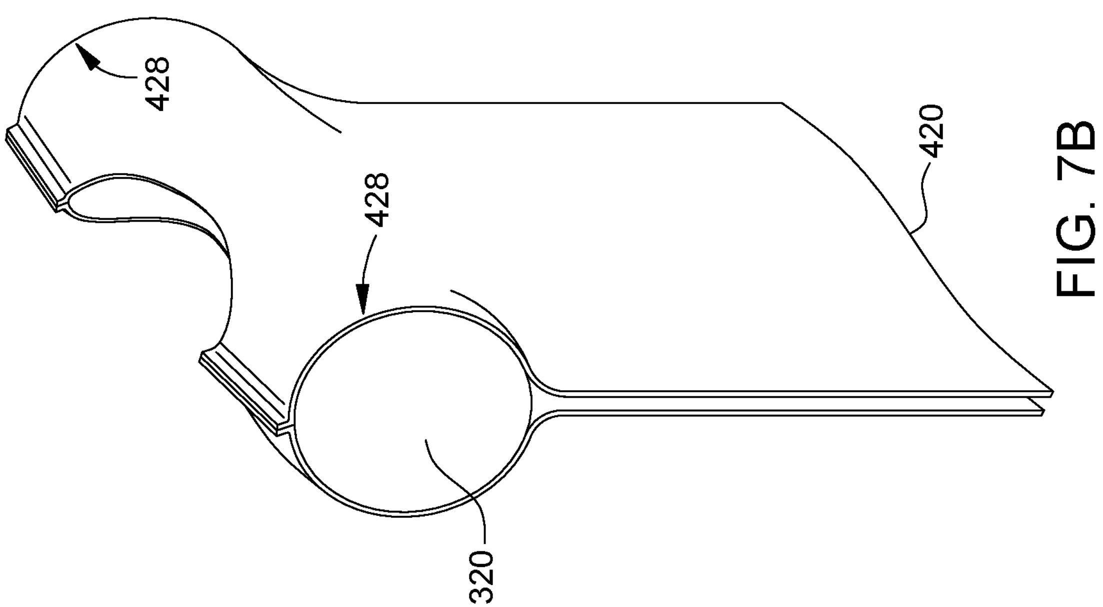

FIG. 7B shows the second fabric item 420 being held by the holding rollers 320, only one holding roller 320 being visible. In some embodiments, the portions 428 of the second fabric item 420 that are held by the holding rollers 320 are maintained taut around each corresponding holding roller 320.

In FIG. 7C, the first fabric item 410 is placed onto the second fabric item 420. The first fabric item 410 is positioned on the second fabric item 420 such that an edge 414 of the first fabric item 410 is placed proximal to the edge 424 of the second fabric item 420. The first fabric item 410 is oriented to extend away from the second fabric item 420 from the edge 424. The first fabric item 410 is shown attached to a roller, represented as wheel 210. In some embodiments, the first fabric item 410 will have become attached to the wheel 210 by any of the activities or operations described above with respect to the method 300.

In some embodiments, the adhesive 254 (FIGS. 4D, 4E) is applied to at least one of the first fabric item 410 or the second fabric item 420, such as by a method described above with respect to the method 300, prior to placing the first fabric item 410 onto the second fabric item 420. The first fabric item 410 is placed onto the second fabric item 420 by rotating the wheel 210 while traversing the wheel across the second fabric item 420. The second fabric item 420 remains attached to the holding roller 320 shown in the Figure at or near to the edge 424 while the wheel 210 is rotated and traversed across the second fabric item 420 to place the first fabric item 410 onto the second fabric item 420. The first fabric item 410 is released from the wheel 210 while the wheel 210 rotates and traverses across the second fabric item 420.

Figure 7E:
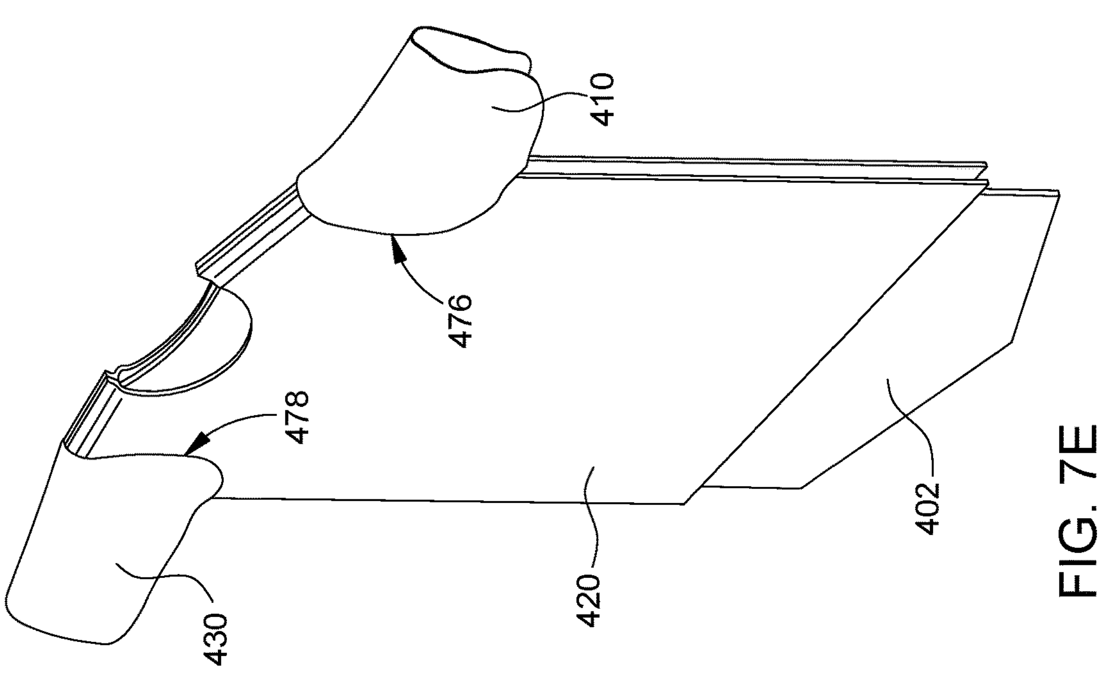
Figure 7D:
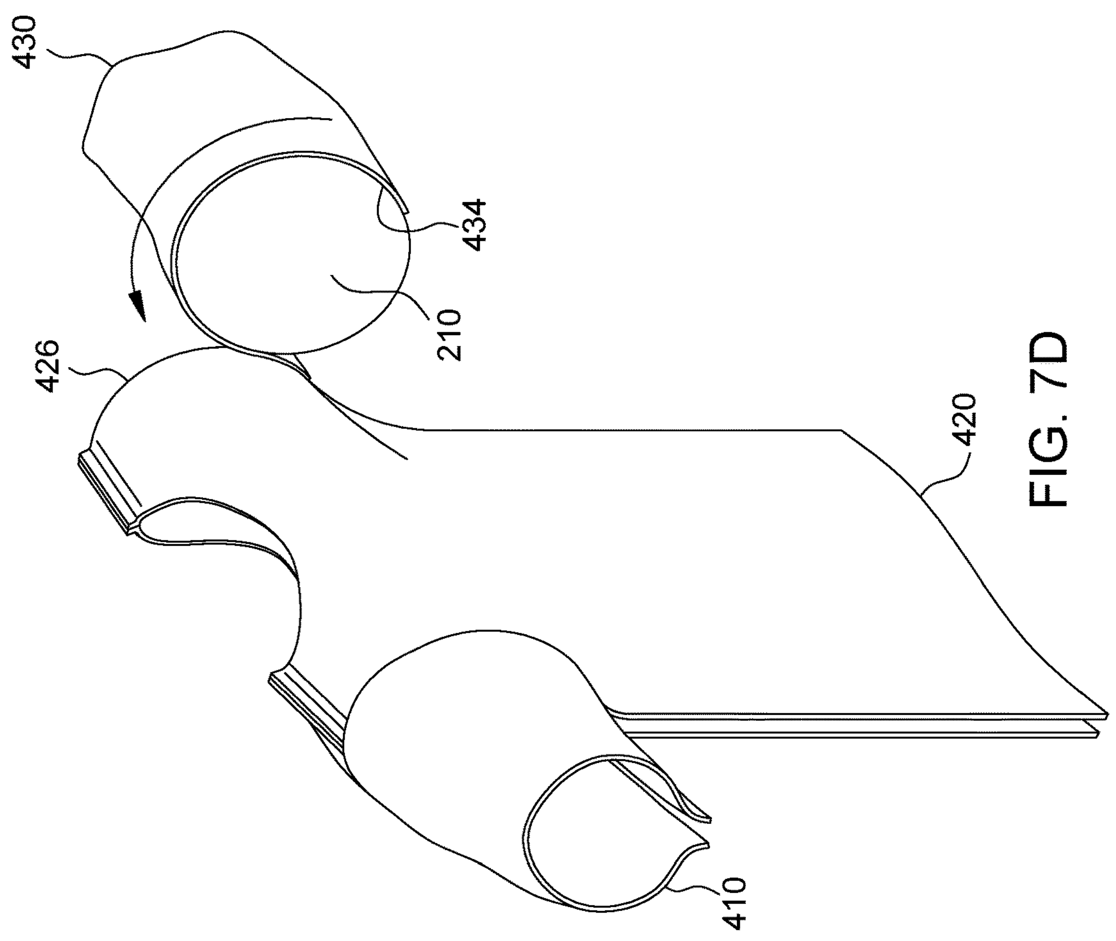

FIG. 7D shows the first fabric item 410 joined to the second fabric item 420 as a result of the foregoing operations. As illustrated, in some embodiments, a third fabric item 430 is placed onto the second fabric item 420. In the illustrated example, the third fabric item 430 is positioned on the second fabric item 420 such that an edge 434 of the third fabric item 430 is placed proximal to the edge 426 of the second fabric item 420. The third fabric item 430 is oriented to extend away from the second fabric item 420 from the edge 426. The third fabric item 430 is shown attached to a roller, represented as wheel 210. In some embodiments, the third fabric item 430 will have become attached to the wheel 210 by any of the activities or operations described above with respect to the method 300.

In some embodiments, the adhesive 254 (FIGS. 4D, 4E) is applied to at least one of the third fabric item 430 or the second fabric item 420, such as by a method described above with respect to the method 300, prior to placing the third fabric item 430 onto the second fabric item 420. The third fabric item 430 is placed on the second fabric item 420 in a similar way as described above with respect to the first fabric item 410. The second fabric item 420 remains attached to the holding roller 320 (not shown in the Figure) at or near to the edge 426 while the wheel 210 is rotated and traversed across the second fabric item 420 to place the third fabric item 430 onto the second fabric item 420. The third fabric item 430 is released from the wheel 210 while the wheel 210 rotates and traverses across the second fabric item 420.

As illustrated, in some embodiments, the first fabric item 410 and the third fabric item 430 are placed on the second fabric item 420 sequentially. In other embodiments, the first fabric item 410 and the third fabric item 430 are placed on the second fabric item 420 at least partially simultaneously.

FIG. 7E shows the first fabric item 410 and the third fabric item 430 joined to the second fabric item 420 as a result of the foregoing operations. The second fabric item 420 is depicted on the frame 402. The first fabric item 410 is shown oriented to extend away from the second fabric item 420 from the edge 424. The third fabric item 430 is shown oriented to extend away from the second fabric item 420 from the edge 426. The seam 476 created by joining the first fabric item 410 to the second fabric item 420 is an overlap seam. The seam 478 created by joining the third fabric item 430 to the second fabric item 420 is an overlap seam.

In some embodiments, the foregoing operations include curing the adhesive, such as described above with respect to the method 300. Curing the adhesive bonds the first fabric item 410 to the second fabric item 420 and bonds the third fabric item 430 to the second fabric item 420.

In the illustrated example, the second fabric item 420 is oriented with the wrong side facing outwards, and the first fabric item 410 and the third fabric item 430 are joined to the wrong side of the second fabric item 420. In some embodiments, the second fabric item 420 is oriented with the right side facing outwards, and the first fabric item 410 and the third fabric item 430 are joined to the right side of the second fabric item 420. In the illustrated example, the first fabric item 410 and the third fabric item 430 are oriented with the wrong sides facing outwards. In some embodiments, the first fabric item 410 and the third fabric item 430 are oriented with the right sides facing outwards.

In the illustrated example, the right sides of the first fabric item 410 and the third fabric item 430 are joined to the wrong side of the second fabric item 420. In some embodiments, the right sides of the first fabric item 410 and the third fabric item 430 are joined to the right side of the second fabric item 420. In some embodiments, the wrong sides of the first fabric item 410 and the third fabric item 430 are joined to the right side of the second fabric item 420. In some embodiments, the wrong sides of the first fabric item 410 and the third fabric item 430 are joined to the wrong side of the second fabric item 420.

In some embodiments, the first and second fabric items 10, 20 are joined together using a joining machine, such as a sewing machine, a seam sealing machine, or the like. In some embodiments, operation of the joining machine is controlled at least in part by the controller 102. FIG. 8A schematically illustrates the integration of rollers of the present disclosure with the fabric feed of a joining machine. The first fabric item 10 is shown attached to a roller 200 that is represented as wheel 210. It is contemplated that the wheel 210 may include a feature of any one or more wheel of the present disclosure. In some embodiments, the first fabric item 10 will have become attached to the wheel 210 by any of the activities or operations described above with respect to the method 300. The second fabric item 20 is traveling over a feed roller 330. The first and second fabric items 10, 20 are brought together, and are sandwiched between, the wheel 210 and the feed roller 330.

The first and second fabric items 10, 20 together are fed into the joining machine. In some embodiments, the feeding of the first and second fabric items 10, 20 into the joining machine is controlled at least in part by the controller 102. In some embodiments, the first and second fabric items 10, 20 are pulled through the joining machine. In some embodiments, a pulling force on the first and second fabric items 10, 20 is exerted by guides 332. In some embodiments, as the wheel 210 rotates, the first fabric item 10 is released from the wheel 210 at least in part by the force pulling the first and second fabric items 10, 20 through the joining machine. In some embodiments, as the wheel 210 rotates, the first fabric item 10 is released from the wheel 210 at least in part by regulating a vacuum applied onto the first fabric item 10 via the wheel 210.

Figure 8B:
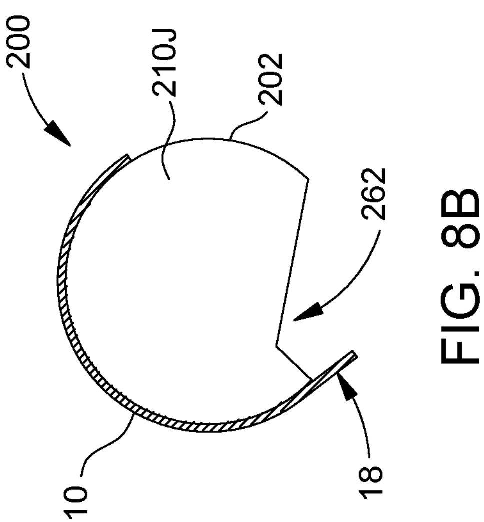
FIGS. 8A-8C schematically illustrate further exemplary applications of the method of FIG. 3.
Figure 8C:
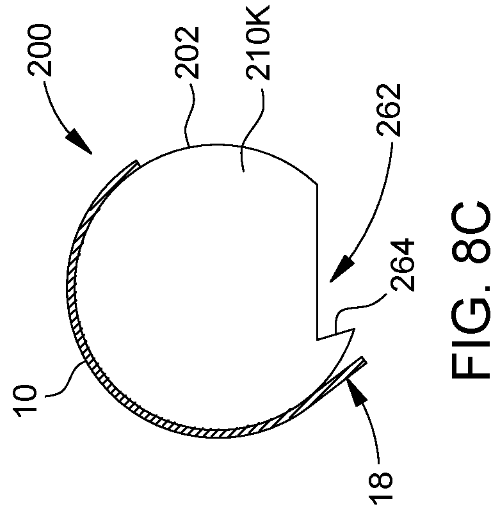
Figure 8A:
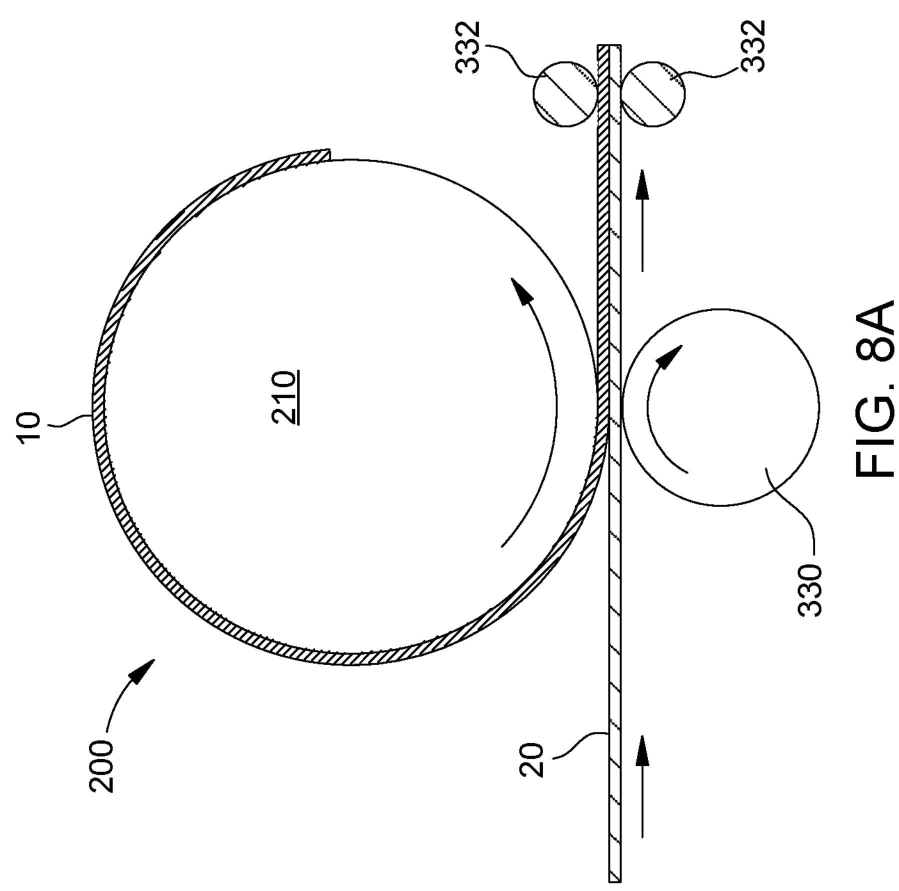

FIGS. 8B and 8C schematically illustrate alternative configurations for the roller when used with a joining machine. In FIG. 8B, the roller 200 is represented by wheel 210J. It is contemplated that the wheel 210J may include a feature of any one or more wheel of the present disclosure. The circumference 202 of the wheel 210J includes a recess 262. The first fabric item 10 is attached to the wheel 210J such that an end portion 18 is juxtaposed with the recess 262. The end portion 18 of the first fabric item 10 is not attached to the wheel 210J but hangs freely. By hanging freely, the end portion 18 can be easily fed into a joining machine. In an example, the end portion 18 is engaged by at least one of the guides 332 (FIG. 8A).

In FIG. 8C, the roller 200 is represented by wheel 210K. It is contemplated that the wheel 210K may include a feature of any one or more wheel of the present disclosure. The circumference 202 of the wheel 210K includes a recess 262 adjacent to a tab 264. The first fabric item 10 is attached to the wheel 210J such that an end portion 18 is juxtaposed with the tab 264. In some embodiments, the end portion 18 is not attached to the tab 264, but hangs freely. By hanging freely, the end portion 18 can be easily fed into a joining machine. In an example, the end portion 18 is engaged by at least one of the guides 332 (FIG. 8A).

In some embodiments, a vacuum applied via the wheel 210J to hold the first fabric item 10 is not applied at the tab 264. In some embodiments, a vacuum applied via the wheel 210J to hold the first fabric item 10 is applied at the tab 264. In some embodiments, the magnitude of the vacuum applied at the tab 264 is weaker than the magnitude of the vacuum applied at other portions of the circumference 202 to hold the first fabric item 10. In some embodiments, the magnitude of the vacuum applied at the tab 264 is selectively reduced with respect to the magnitude of the vacuum applied at other portions of the circumference 202 when the end portion 18 is fed into a joining machine.

Figure 9A:
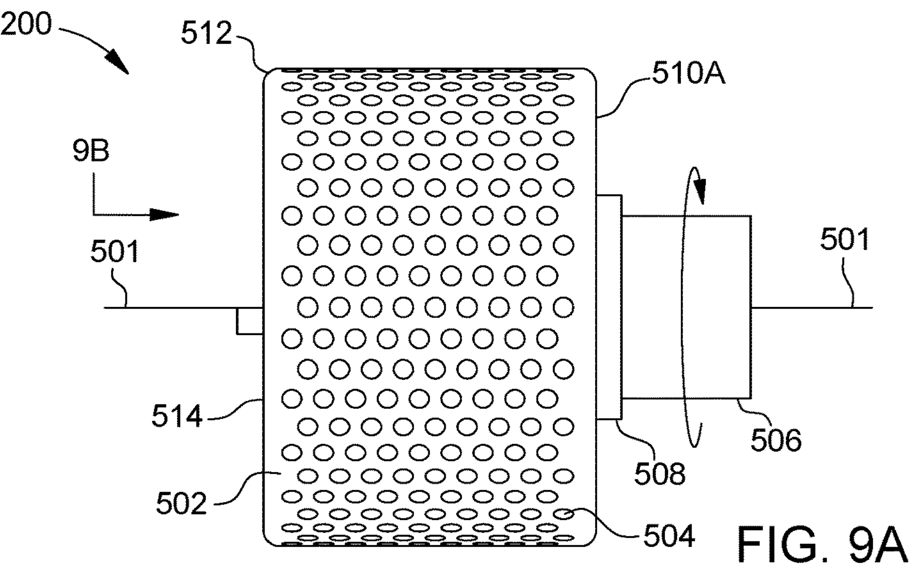
FIGS. 9A-9C schematically illustrate further exemplary features of part of the system of FIG. 1.
Figure 9B:
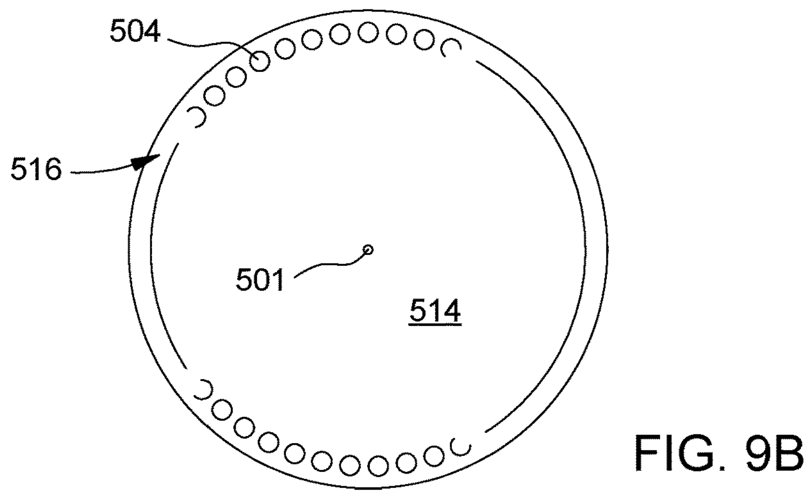
Figure 9C:
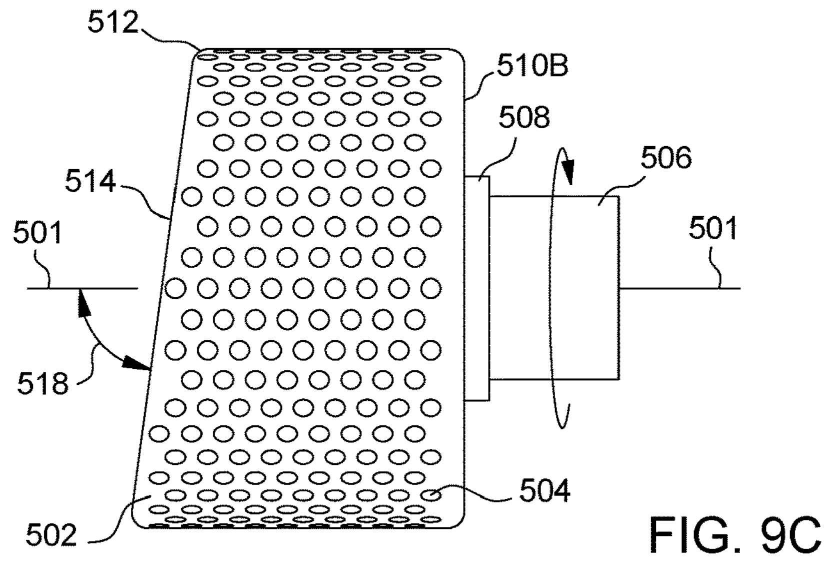

FIGS. 9A-9C schematically illustrate further exemplary features of the roller 200. In FIG. 9A, the roller 200 is represented by roller 510A. It is contemplated that the roller 510A may include any one or more feature of a roller or wheel described and/or illustrated in the present disclosure. The roller 510A includes an axis of rotation 501 and a circumference 502 extending around the axis of rotation 501. As illustrated, in some embodiments, the circumference 502 forms a cylindrical surface. In some embodiments, the circumference 502 does not form a cylindrical surface. For example, the circumference 502 may form an angular surface, such as octagonal, or may form a non-circular curved surface, such as an elliptical surface. In some embodiments, the circumference 502 forms a surface having a complex shape. The complex shape may include multiple curves. The multiple curves may include curves of differing degrees of curvature. The multiple curves may include undulations. The complex shape may be designed to match a specific garment component shape or to match the requirements of the operation to be performed. A vacuum tube (not shown) may be coupled to the roller 510A via a vacuum connector 506. A swivel 508 enables rotation of the roller 510A about the axis of rotation 501 without twisting the vacuum tube coupled to the vacuum connector 506.

Apertures 504 in the circumference 502 allow the passage of fluid, such as air, therethrough, such as when applying a vacuum or when blowing a fluid out of the roller 510A. As illustrated, in some embodiments, at least some of the apertures 504 are in the form of circular holes. In some embodiments, at least some of the apertures 504 are in the form of non-circular holes, such as oval holes. In some embodiments, at least some of the apertures 504 are in the form of slots. In some embodiments, the apertures 504 extend around the entire circumference 502. In some embodiments, the apertures 504 do not extend around the entire circumference 502. For example, in some embodiments, one or more discrete portions of the circumference 502 may include the apertures 504, and one or more other discrete portions may not include the apertures 504.

As illustrated, in some embodiments, an edge 512 between the circumference 502 and an end 514 of the roller 510A is rounded. In some embodiments, the edge 512 may include an angular profile.

FIG. 9B schematically illustrates the end 514 of the roller 510A. The end 514 includes apertures 504 distributed around a peripheral portion 516. The end 514 forms a plane that is perpendicular to the axis of rotation 501. In FIG. 9C, the roller 200 is represented by roller 510B. It is contemplated that the roller 510B may include any one or more features of a roller or wheel described and/or illustrated in the present disclosure. As illustrated, roller 510B is similar to roller 510A, except that the end 514 forms a plane that is skewed at an acute angle 518 to the axis of rotation 501.

Figure 10:
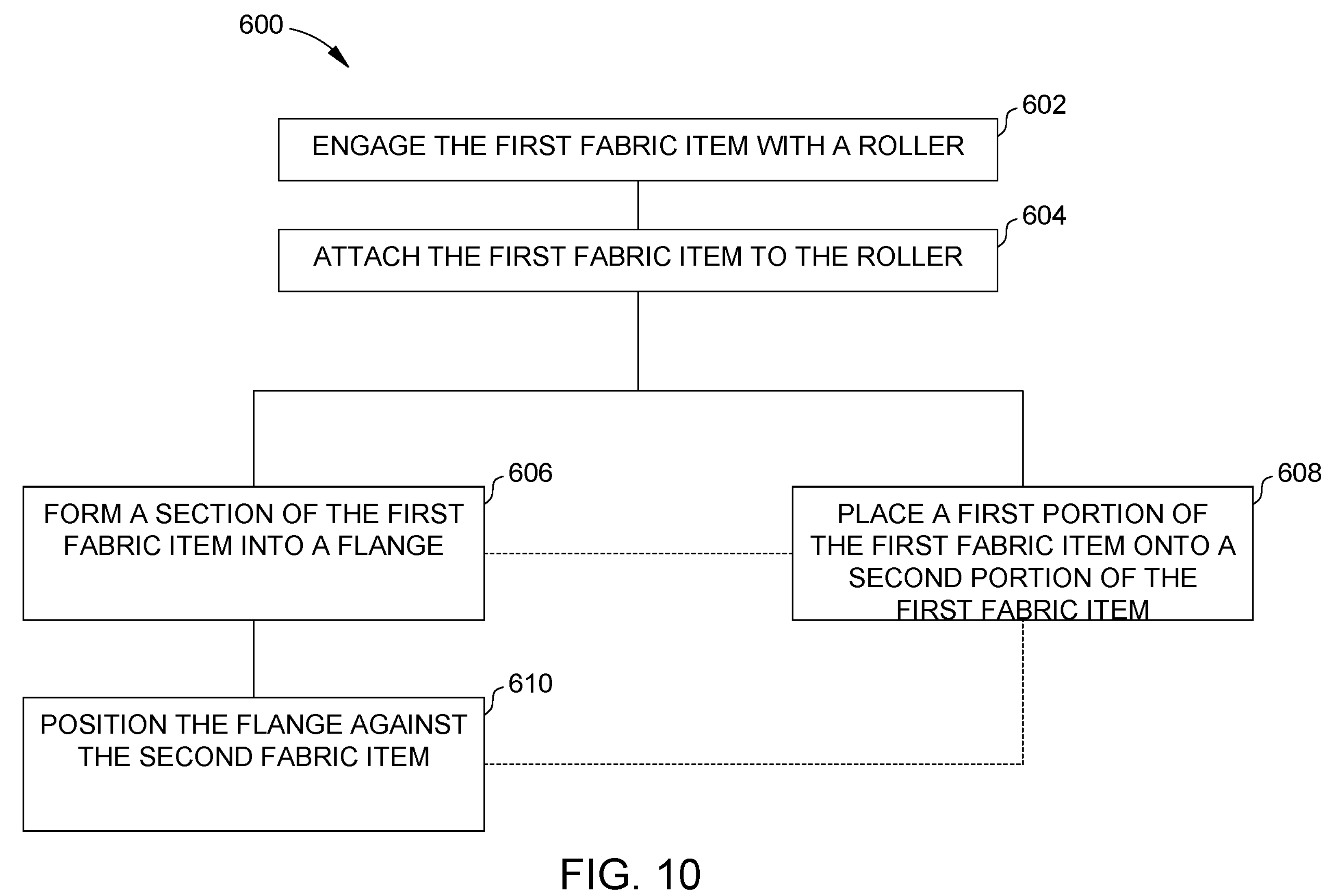
FIG. 10 provides a method of manipulating a fabric item.
Figures 11A, 11B:
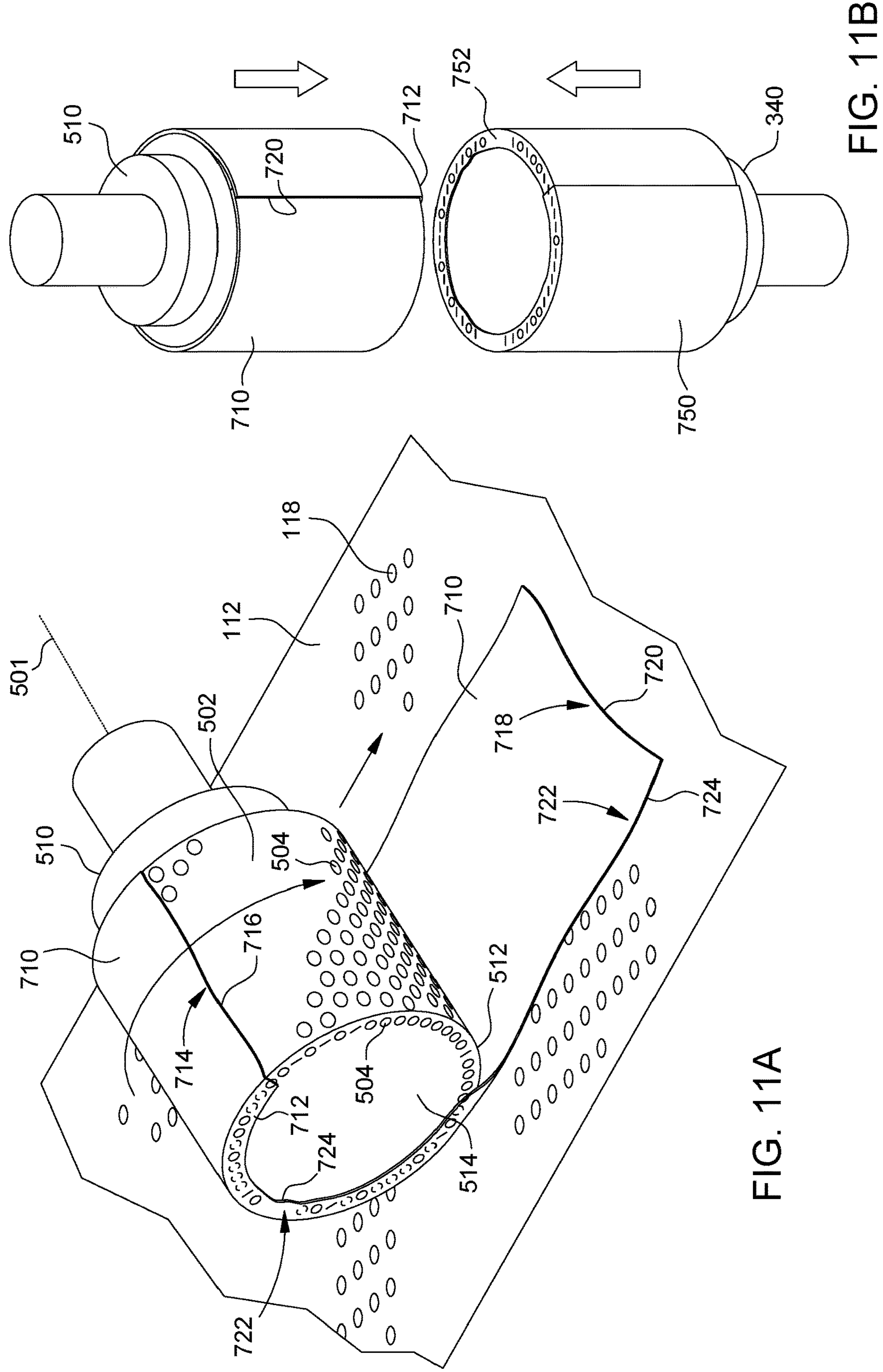
FIGS. 11A-11B schematically illustrate selected aspects of the method of FIG. 10.

FIG. 10 provides a method 600 of manipulating a fabric item. In some embodiments, the method includes joining a first fabric item to a second fabric item. FIGS. 11A-11B schematically illustrate selected aspects of the method 600. It is contemplated that one or more activities of any operation of the method 300 may be incorporated into the method 600. It is contemplated that any activity of any operation of the method 600 may be controlled at least in part by the controller 102.

At operation 602, the first fabric item is engaged by a roller, such as roller 200, roller assembly 200A, or roller assembly 200B. In the example shown in FIG. 11A, the first fabric item is represented by first fabric item 710. The first fabric item 710 includes a first portion 714 proximal to a first edge 716, a second portion 718 proximal to a second edge 720, and a third portion 722 proximal to a third edge 724 extending between the first edge 716 and the second edge 720. As illustrated, in some embodiments, the first edge 716 is opposite to the second edge 720. The first fabric item 710 is laying on the work surface 112. In some embodiments, the first fabric item 710 is held on the work surface 112 by a vacuum applied through the perforations 118.

The roller is represented by the roller 510. It is contemplated that the roller 510 may be configured similarly to roller 510A or roller 510B. Additionally, it is contemplated that the roller 510 may include any one or more features of a roller or wheel described and/or illustrated in the present disclosure.

The first fabric item 710 is shown being contacted by the roller 510. The contact between the roller 510 and the first fabric item 710 is at the circumference 502 of the roller 510. It is contemplated that the roller 510 makes contact with the first fabric item 710 at the first portion 714. It is contemplated that a line of initial contact between the roller 510 and the first fabric item 710 is generally parallel to the first edge 716.

At operation 604, the first fabric item 710 is attached to the roller. FIG. 11A schematically illustrates the attaching of the first fabric item 710 to the roller 510. The roller 510 is traversed across the first fabric item 710 towards the second edge 720 while the circumference 502 of the roller 510 remains in contact with the first fabric item 710. The roller 510 is rotated about the axis of rotation 501 while the roller 510 is traversed across the first fabric item 710 towards the second edge 720. In an example, a vacuum applied through apertures 504 in the circumference 502 of the roller 510 holds the first fabric item 710 onto the roller 510. Rotation of the roller 510 while traversing the roller 510 across the first fabric item 710 progressively lifts the first fabric item 710 off the work surface 112.

At operation 606, a section of the first fabric item 710 is formed into a flange. FIG. 11A schematically illustrates the forming of a flange. As illustrated, a first flange 712 is formed by bending the third portion 722 of the first fabric item 710 over the edge 512 of the roller 510 and onto the end 514 of the roller 510. In some embodiments, the roller 510 is traversed across the first fabric item 710 such that the end 514 of the roller 510 is maintained generally parallel to the third edge 724 of the first fabric item 710.

In some embodiments, the first flange 712 is formed at least in part by stretching at least a section of the first fabric item 710. For example, as described above with respect to FIG. 4B, the stretching may be accomplished by rotating the roller 510 such that the circumference 502 travels at a first speed around the axis of rotation 501 of the roller 510, and traversing the roller 510 across the first fabric item 710 at a second speed less than the first speed. In some embodiments, the stretched section of the first fabric item 710 remains stretched while attached to the circumference of the roller 510.

In some embodiments, the first flange 712 is formed at least in part by applying a vacuum through the apertures 504 in the end 514 of the roller 510. In some embodiments, the first flange 712 is formed by a combination of stretching at least a section of the first fabric item 710 and applying a vacuum through the apertures 504 in the end 514 of the roller 510. It is contemplated that operation 606 is performed at least partially simultaneously with operation 604.

In some embodiments, the method 600 includes operation 608, although in other embodiments, operation 608 is omitted. At operation 608, the first portion 714 of the first fabric item 710 is placed onto the second portion 718 of the first fabric item 710. For example, the roller 510 may be rotated sufficiently such that the first portion 714 which is attached to the roller 510 is brought into contact with the second portion 718. In some embodiments, the first portion 714 is joined to the second portion 718.

In some embodiments, the operation 608 includes the placement of the adhesive 254 (FIGS. 4D, 4E) on at least one of the first portion 714 or the second portion 718, such as by a method described above with respect to the method 300, prior to placing the first portion 714 onto the second portion 718. In some of such embodiments, the operation 608 includes curing the adhesive, such as described above with respect to the method 300. For example, one or more configurations and/or curing operations described above with respect to the wheel 210 may be replicated with the roller 510. Curing the adhesive bonds the first portion 714 to the second portion 718.

At operation 610, the flange of the first fabric item is positioned against the second fabric item. In some embodiments, the operation 610 includes the placement of the adhesive 254 (FIGS. 4D, 4E) on at least one of the second fabric item or the flange of the first fabric item, such as by a method described above with respect to the method 300, prior to positioning the flange of the first fabric item against the second fabric item.

In the example shown in FIG. 11B, the second fabric item is represented by second fabric item 750. The second fabric item 750 is depicted to be attached to a second roller 340 and includes a second flange 752. It is contemplated that the second roller 340 may be similar to the roller 510. It is also contemplated that the second roller 340 picks up and holds the second fabric item 750 in a similar fashion to how the roller 510 picks up and holds the first fabric item 710, described above. Additionally, it is contemplated that the second flange 752 is formed on the second roller 340 in a similar fashion to how the first flange 712 is formed on the roller 510, described above.

In some embodiments, the second fabric item 750 is not held by the second roller 340. For example, the second fabric item 750 may be held on a work surface, such as work surface 112. In some embodiments, the first flange 712 is not joined to a second flange 752 of the second fabric item 750. For example, the first flange 712 may be joined to another portion of the second fabric item 750.

It is contemplated that the first flange 712 lays substantially in a plane. It is further contemplated that the portion of the second fabric item 750 to which the first flange 712 is being joined lays substantially in a plane. For example, it is contemplated that the second flange 752 lays substantially in a plane.

In some embodiments, the operation 610 includes the placement of an adhesive, such as described above with respect to the method 300, on at least one of the first flange 712 or the second fabric item 750 prior to placing the first flange 712 onto the second fabric item 750. For example, where the first flange 712 is being joined to the second flange 752, an adhesive may be placed on at least one of the first flange 712 or the second flange 752.

In some embodiments, the operation 610 includes curing the adhesive, such as described above with respect to the method 300. For example, one or more configurations and/or curing operations described above with respect to the wheel

210 may be replicated with the roller 510 and/or the roller 340. Curing the adhesive bonds the first flange 712 to the second fabric item 750.

In some embodiments, the right side of the first fabric item 710 is joined to the right side of the second fabric item 750. In some embodiments, the right side of the first fabric item 710 is joined to the wrong side of the second fabric item 750. In some embodiments, the wrong side of the first fabric item 710 is joined to the right side of the second fabric item 750. In some embodiments, the wrong side of the first fabric item 710 is joined to the wrong side of the second fabric item 750.

It is contemplated that the method 600 may be adapted to focus on manipulating a fabric item without forming a flange and without joining the fabric item to another fabric item. For example, the method 600 may be adapted to include operations 602, 604, and 608; while omitting operations 606 and 610.

Accordingly, FIGS. 12A-12E, 13A-13F, and 14A-14C schematically illustrate further exemplary applications of the method 600, including further optional variations. It is contemplated that one or more activities of any operation of the method 300 may be incorporated into the adaptations of the method 600, and/or further optional variations. It is contemplated that any activity of any activity or operation of the adaptations of the method 600, and/or further optional variations, and illustrated and/or described with respect to any one Figure of FIG. 12A-12E, 13A-13F, or 14A-14C, may be controlled at least in part by the controller 102.

Figures 12A, 12B, 12C:
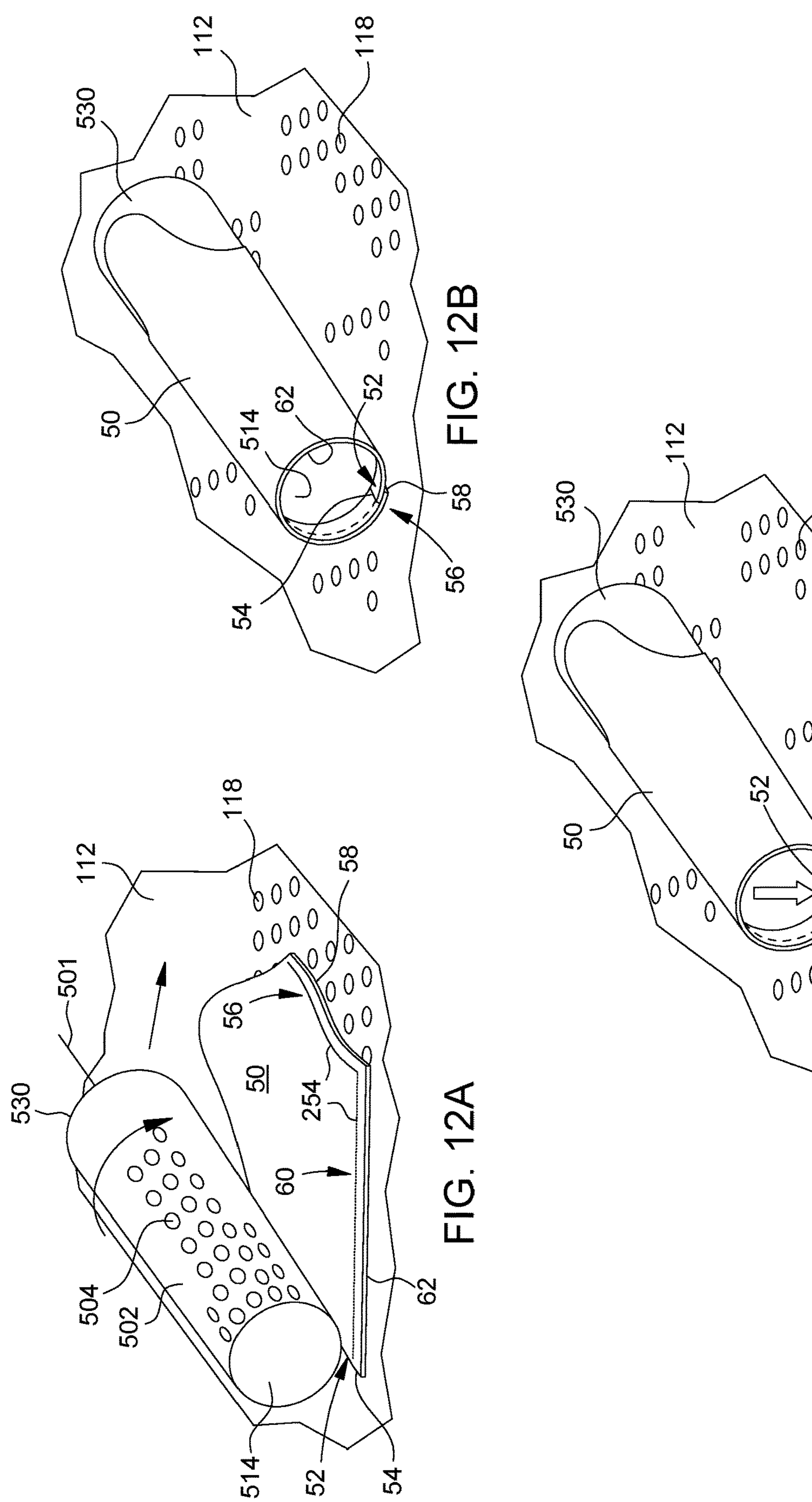
FIGS. 12A-12E schematically illustrate further exemplary applications of the method of FIG. 10.

FIGS. 12A-12E schematically illustrate the joining of first and second portions of a fabric item. In FIG. 12A, the fabric item is represented by fabric item 50. The fabric item 50 includes a first portion 52 proximal to a first edge 54, a second portion 56 proximal to a second edge 58, and a third portion 60 proximal to a third edge 62 extending between the first edge 54 and the second edge 58. As illustrated, in some embodiments, the first edge 54 is opposite to the second edge 58.

The fabric item 50 is laying on the work surface 112. In some embodiments, the fabric item 50 is held on the work surface 112 by a vacuum applied through the perforations 118. As illustrated, in some embodiments, the adhesive 254 has been applied to the second portion 56 and the third portion 60, such as by a method described above with respect to the method 300. In some embodiments, the adhesive is applied to the third portion 60 only prior to engaging the fabric item 50 with a roller.

The roller is represented by roller 530. In some embodiments, the roller 530 is configured similarly to roller 510A or roller 510B. As illustrated, in some embodiments, the end 514 of the roller 530 does not include the apertures 504 of roller 510A or roller 510B. In embodiments in which the first edge 54 of the fabric item 50 is generally parallel to the second edge 58 of the fabric item 50, it is contemplated that the circumference 502 of the roller 530 may be cylindrical. However, as illustrated, in embodiments in which the first edge 54 of the fabric item 50 is generally at an acute angle to the second edge 58 of the fabric item 50, it is contemplated that the circumference 502 of the roller 530 may be frustoconical. Additionally, it is contemplated that the roller 530 may include any one or more feature of a roller or wheel described and/or illustrated in the present disclosure.

The fabric item 50 is shown being contacted by the roller 530. The contact between the roller 530 and the fabric item 50 is at the circumference 502 of the roller 530. It is contemplated that the roller 530 makes contact with the fabric item 50 at the first portion 52. It is contemplated that a line of initial contact between the roller 530 and the fabric item 50 along the first portion 52 is generally parallel to the first edge 54.

The fabric item 50 becomes attached to the roller 530. The roller 530 is traversed across the fabric item 50 towards the second edge 58 while the circumference 502 of the roller 530 remains in contact with the fabric item 50. The roller 530 is rotated about the axis of rotation 501 while the roller 530 is traversed across the fabric item 50 towards the second edge 58. In an example, a vacuum applied through apertures 504 in the circumference 502 of the roller 530 holds the fabric item 50 onto the roller 530. Rotation of the roller 530 while traversing the roller 530 across the fabric item 50 progressively lifts the fabric item 50 off the work surface 112. In some embodiments, the roller 530 is traversed across the fabric item 50 such that the end 514 of the roller 530 is maintained generally parallel to the third edge 62 of the fabric item 50.

In some embodiments, a section of the fabric item 50 is stretched when attached to the roller 530. For example, as described above with respect to FIG. 4B, the stretching may be affected by rotating the roller 530 such that the circumference 502 travels at a first speed around the axis of rotation 501 of the roller 530, and traversing the roller 530 across the fabric item 50 at a second speed less than the first speed. In some embodiments, the stretched section of the fabric item 50 remains stretched while attached to the circumference of the roller 530. In some embodiments, a section of the fabric item 50 is not stretched when attached to the roller 530.

The roller 530 is rotated sufficiently such that the first portion 52 of the fabric item 50, which is attached to the roller 530, is brought into contact with the second portion 56 of the fabric item 50. As illustrated in FIG. 12A, in some embodiments, the adhesive 254 is applied to the second portion 56 prior to contacting the second portion with the first portion 52. However, in some embodiments, the adhesive 254 is not applied to the second portion 56. In some of such embodiments, the adhesive 254 is applied to the first portion 52 (such as after the first portion 52 is lifted off the work surface 112 by the roller 530) prior to contacting the second portion 56 with the first portion 52.

FIG. 12B schematically shows the first portion 52 of the fabric item 50 placed onto the second portion 56 of the fabric item 50. The first and second portions 52, 56 of the fabric item 50 are sandwiched between the roller 530 and the work surface 112. As illustrated, in some embodiments, a flange (such as first flange 712) is not formed. In some embodiments, the fabric item 50 may become deformed such that the third edge 62 is bent towards the end 514 of the roller 530.

Curing the adhesive 254 bonds the first portion 52 to the second portion 56. FIG. 12C schematically illustrates the curing of the adhesive 254 while the first and second portions 52, 56 of the fabric item 50 are sandwiched between the roller 530 and the work surface 112. It is contemplated that curing the adhesive 254 may include one or more activities as described above with respect to the method 300. For example, one or more configurations and/or curing operations described above with respect to the wheel 210 may be replicated with the roller 530. For instance, one or more of pressure, heat, or moisture may be applied via the roller 530 to the first and second portions 52, 56 of the fabric item 50. Additionally, or alternatively, one or more of pressure, heat, or moisture may be applied via the work surface 112 to the overlapping first and second portions 52, 56.

Figures 12D, 12E:
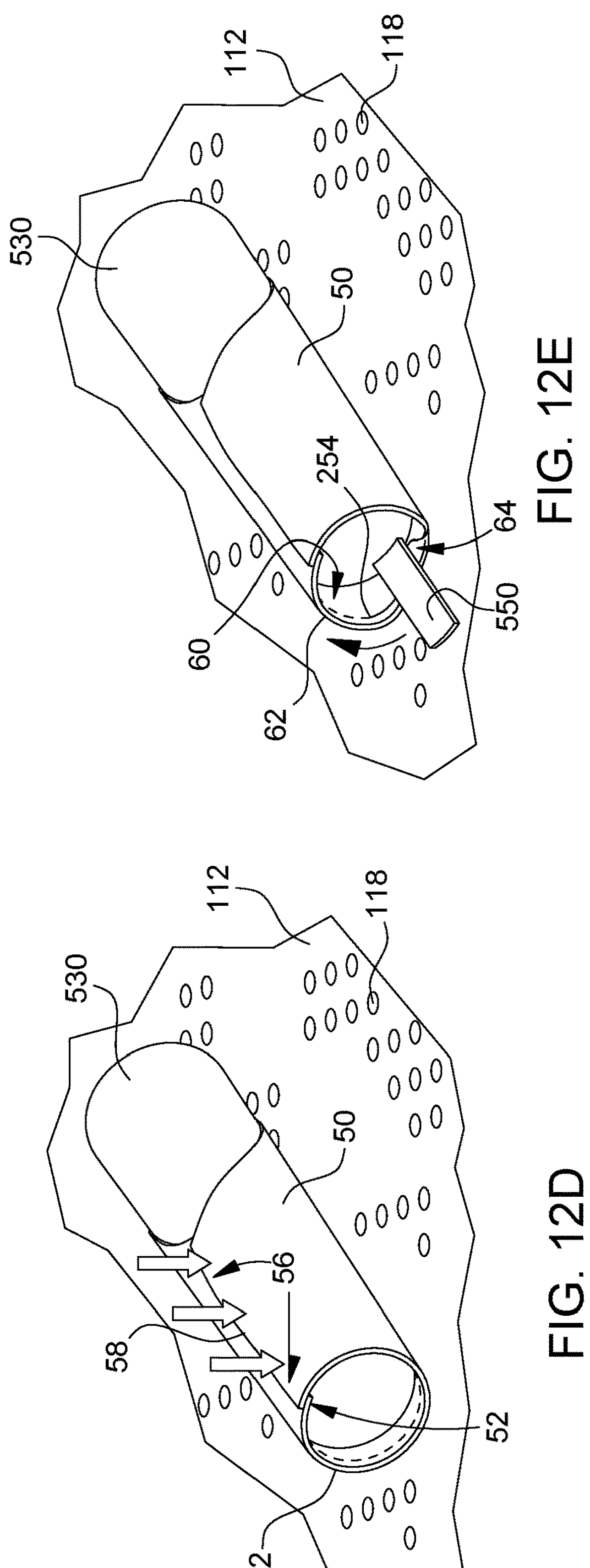

FIG. 12D schematically illustrates an additional or alternative operation to cure the adhesive 254. In the illustrated example, the roller 530 is rotated such that the overlapping first and second portions 52, 56 of the fabric item 50 are positioned generally uppermost on the roller 530. For instance, another tool (such as a plate, perforated plate, heated plate, or the like) may be positioned such that the first and second portions 52, 56 are sandwiched between the roller 530 and the other tool. One or more of pressure, heat, or moisture may be applied via the other tool onto the overlapping first and second portions 52, 56.

FIG. 12E schematically illustrates a hemming tool 550 forming a hem 64 by folding the third edge 62 over onto the third portion 60 of the fabric item 50. The adhesive 254 maintains the hem 64 in position, and may be cured such as described above with respect to the method 300. In some embodiments, the forming of the hem 64 may be omitted.

In some embodiments, the fabric item 50 is joined to another fabric item while being held on the roller 530. In an example, the other fabric item is placed over the fabric item 50 and joined proximal to the edge of the fabric item 50 that is opposite the third edge 62. The joining of the other fabric item to the fabric item 50 may be achieved by adhesive, such as adhesive 254, such as described herein.

Figure 13A:
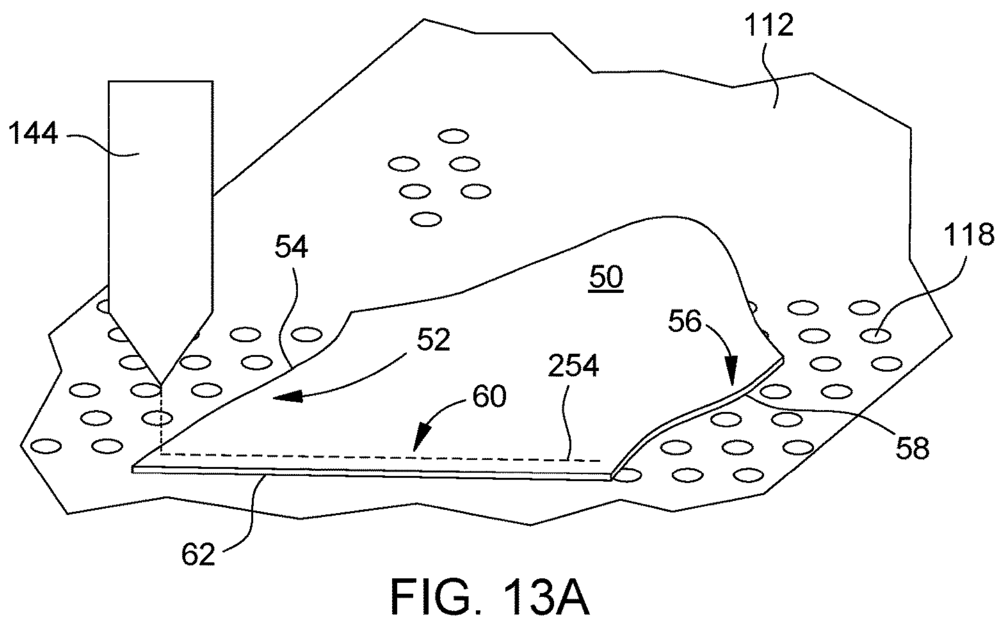
FIGS. 13A-13F schematically illustrate further exemplary applications of the method of FIG. 10.

FIGS. 13A-13F schematically illustrate a variation of the operations of FIGS. 12A-12E. In FIG. 13A, the fabric item 50 is laying on the work surface 112. In some embodiments, the fabric item 50 is held on the work surface 112 by a vacuum applied through the perforations 118. The adhesive applicator 144 applies adhesive 254 to the third portion 60 of the fabric item 50. As illustrated, in some embodiments, the adhesive applicator 144 applies adhesive 254 to the third portion 60, but not (yet) to any other portion of the fabric item 50. In other embodiments, the adhesive applicator 144 may apply adhesive 254 to one or more other portions of the fabric item 50.

Figure 13B:
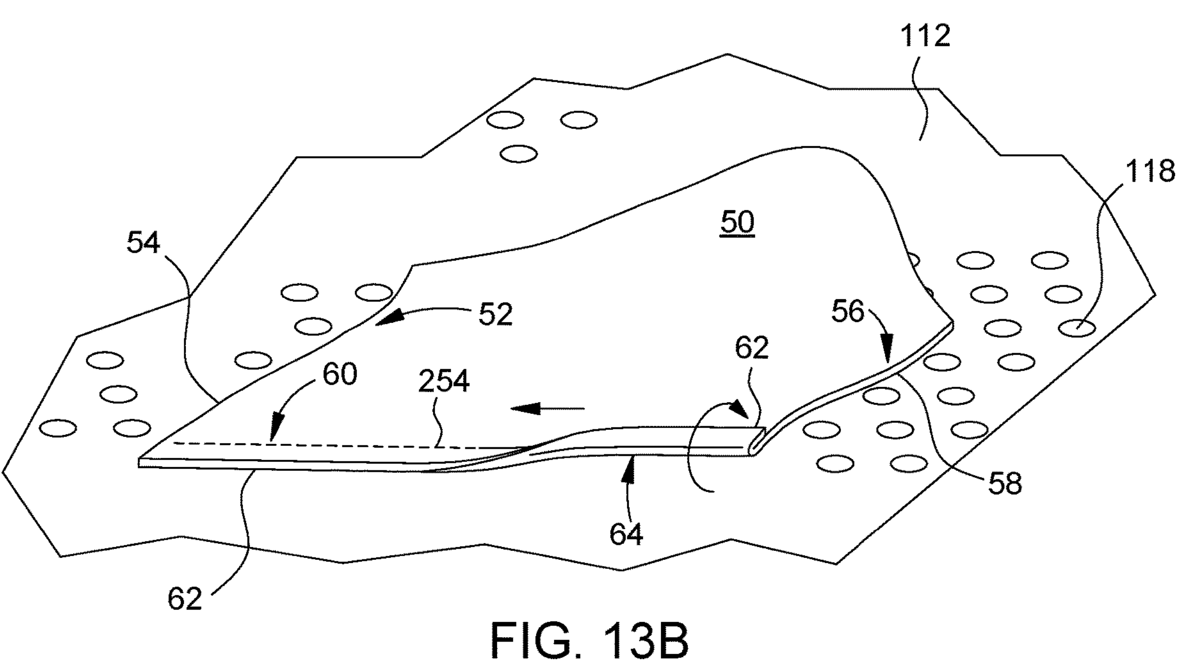

FIG. 13B shows the formation of the hem 64. As described above, the third edge 62 is folded over onto the third portion 60 of the fabric item 50. In some embodiments, the adhesive at the hem 64 is cured, such as described above with respect to the method 300, before proceeding with further operations. In other embodiments, the adhesive at the hem 64 is cured after proceeding with further operations.

Figure 13C:
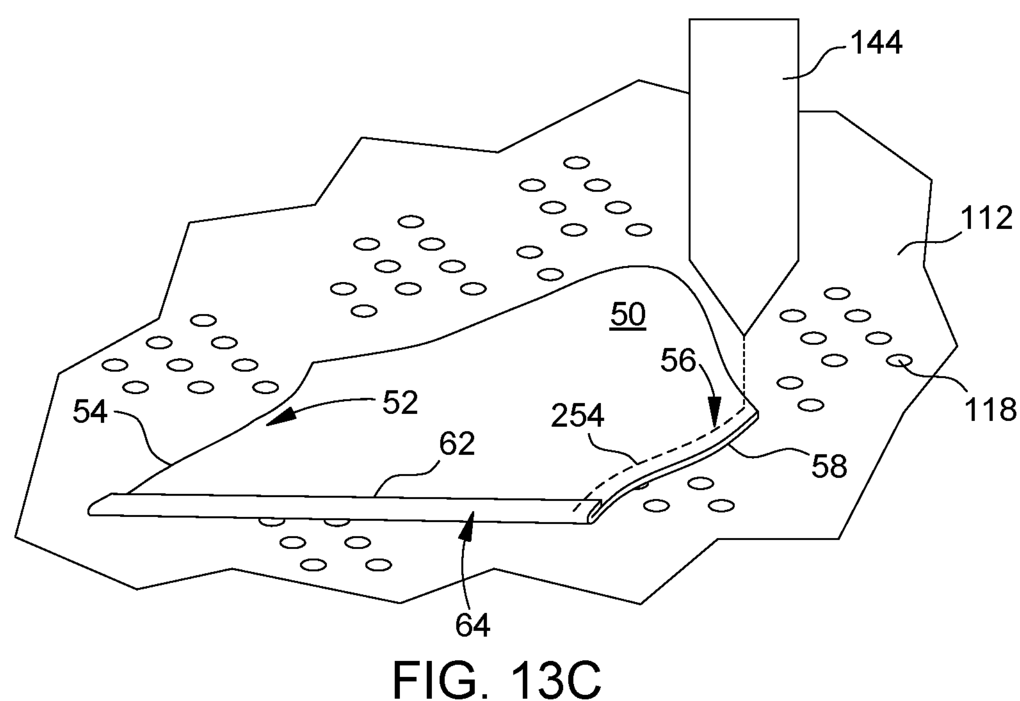

In FIG. 13C, the adhesive applicator 144 applies adhesive 254 to the second portion 56 of the fabric item 50. As illustrated, in some embodiments, the adhesive applicator 144 applies adhesive 254 to the part of the hem 64 that overlaps the second portion 56. In some embodiments, the adhesive applicator 144 does not apply adhesive 254 to the part of the hem 64 that overlaps the second portion 56. As described above with respect to FIG. 13A, in some embodiments, the adhesive applicator 144 applies adhesive 254 to the second portion 56 during the operation in which the adhesive applicator 144 applies adhesive 254 to the third portion 60. In some of such embodiments, no further adhesive is applied to the second portion 56. In others of such embodiments, the adhesive applicator 144 applies adhesive 254 only to the part of the hem 64 that overlaps the second portion 56. In other embodiments, the adhesive applicator 144 does not apply adhesive 254 to the second portion 56.

Figure 13D:
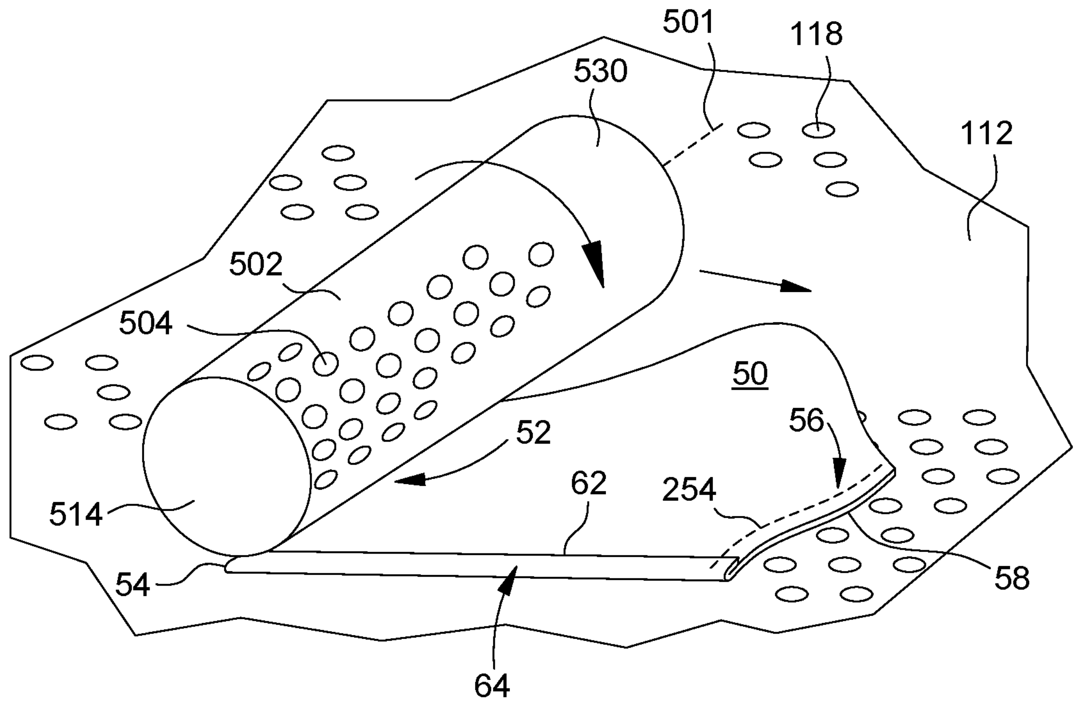

In FIG. 13D, the roller 530 contacts the fabric item 50, and then is rotated and traversed across the fabric item 50. As illustrated, in some embodiments, the roller 530 is positioned to overlap at least a portion of the hem 64. In some embodiments, the roller 530 is positioned to overlap the entire hem 64 at the first portion 52. In some embodiments, the roller 530 is positioned to not overlap at least a portion of the hem 64. The contact between the roller 530 and the fabric item 50 is at the circumference 502 of the roller 530. It is contemplated that the roller 530 makes contact with the fabric item 50 at the first portion 52. It is contemplated that a line of initial contact between the roller 530 and the fabric item 50 is generally parallel to the first edge 54.

The fabric item 50 becomes attached to the roller 530. The roller 530 is traversed across the fabric item 50 towards the second edge 58 while the circumference 502 of the roller 530 remains in contact with the fabric item 50. The roller 530 is rotated about the axis of rotation 501 while the roller 530 is traversed across the fabric item 50 towards the second edge 58. In an example, a vacuum applied through apertures 504 in the circumference 502 of the roller 530 holds the fabric item 50 onto the roller 530. Rotation of the roller 530 while traversing the roller 530 across the fabric item 50 progressively lifts the fabric item 50 off the work surface 112. In some embodiments, the roller 530 is traversed across the fabric item 50 such that the end 514 of the roller 530 is maintained generally parallel to the third edge 62 of the fabric item 50.

In some embodiments, a section of the fabric item 50 is stretched when attached to the roller 530. For example, as described above with respect to FIG. 4B, the stretching may be affected by rotating the roller 530 such that the circumference 502 travels at a first speed around the axis of rotation 501 of the roller 530, and traversing the roller 530 across the fabric item 50 at a second speed less than the first speed. In some embodiments, the stretched section of the fabric item 50 remains stretched while attached to the circumference of the roller 530. In some embodiments, a section of the fabric item 50 is not stretched when attached to the roller 530.

The roller 530 is rotated sufficiently such that the first portion 52 of the fabric item 50, which is attached to the roller 530, is brought into contact with the second portion 56 of the fabric item 50. In embodiments in which the adhesive is not applied to the second portion 56, the adhesive 254 is applied to the first portion 52 (such as after the first portion 52 is lifted off the work surface 112 by the roller 530) prior to contacting the second portion 56 with the first portion 52.

Figure 13E:
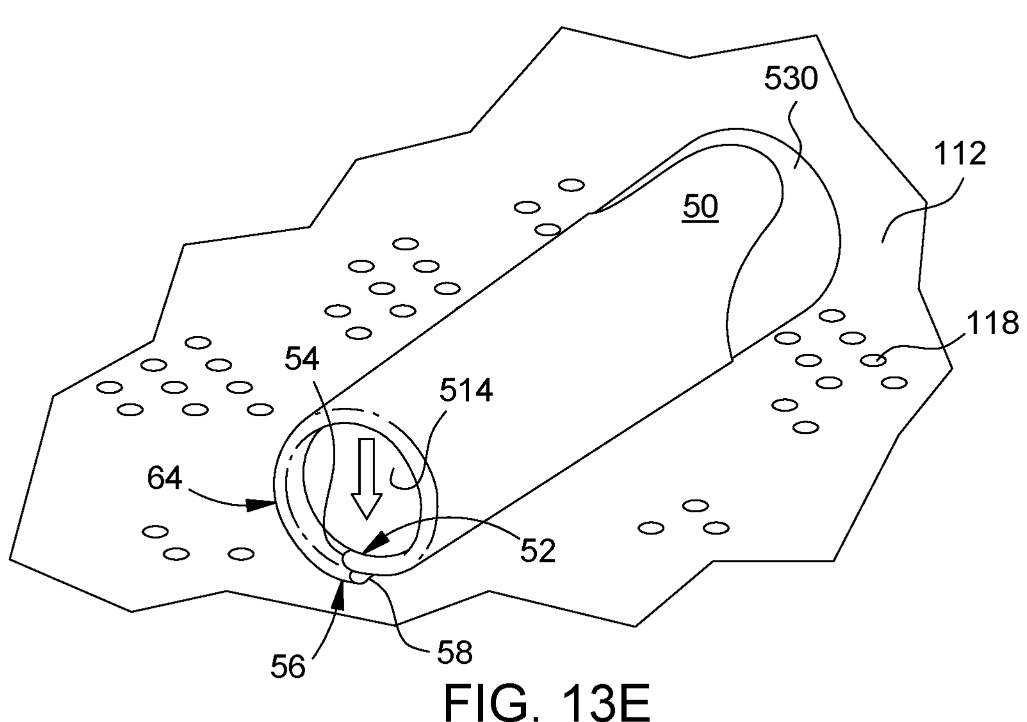

FIG. 13E schematically shows the first portion 52 placed onto the second portion 56. The first and second portions 52, 56 of the fabric item 50 are sandwiched between the roller 530 and the work surface 112.

Curing the adhesive bonds the first portion 52 to the second portion 56. FIG. 13E schematically illustrates the curing of the adhesive 254 while the first and second portions 52, 56 of the fabric item 50 are sandwiched between the roller 530 and the work surface 112. It is contemplated that curing the adhesive 254 may include one or more activities as described above with respect to the method 300. For example, one or more configurations and/or curing operations described above with respect to the wheel 210 may be replicated with the roller 530. For instance, one or more of pressure, heat, or moisture may be applied via the roller 530 to the first and second portions 52, 56 of the fabric item 50. Additionally, or alternatively, one or more of pressure, heat, or moisture may be applied via the work surface 112 to the overlapping first and second portions 52, 56.

Figure 13F:
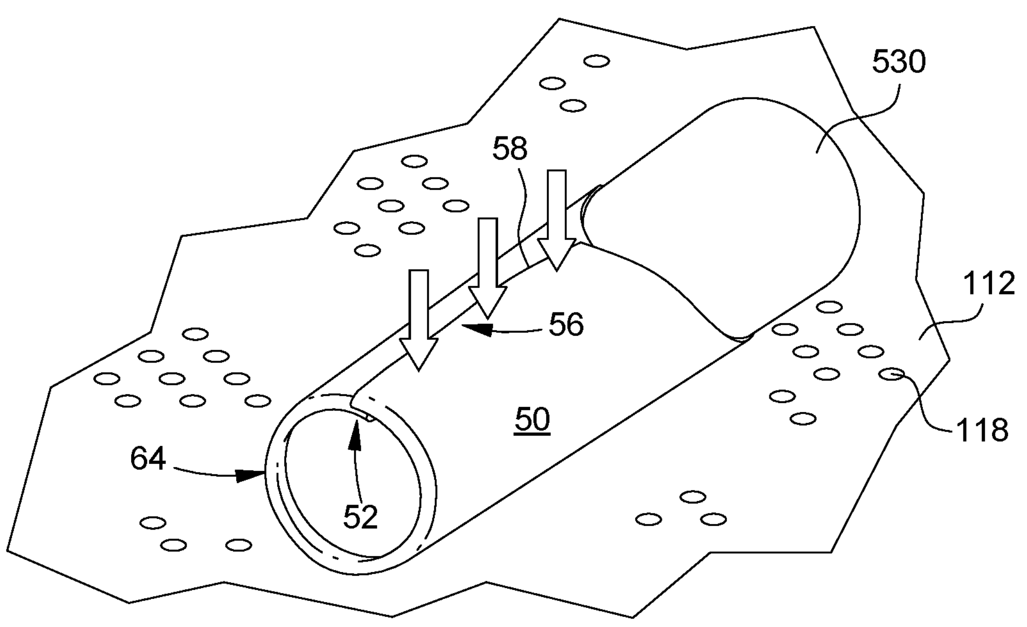

FIG. 13F schematically illustrates an additional or alternative operation to cure the adhesive 254. In the illustrated example, the roller 530 is rotated such that the overlapping first and second portions 52, 56 of the fabric item 50 are positioned generally uppermost on the roller 530. For instance, another tool (such as a plate, perforated plate, heated plate, or the like) may be positioned such that the first and second portions 52, 56 are sandwiched between the roller 530 and the other tool. One or more of pressure, heat, or moisture may be applied via the other tool onto the overlapping first and second portions 52, 56.

In embodiments in which the adhesive 254 at the hem 64 is not cured before the first portion 52 is brought into contact with the second portion 56, curing the adhesive 254 at the hem 64 may be simultaneous with curing the adhesive 254 at the overlapping first and second portions 52, 56.

In some embodiments, the fabric item 50 is joined to another fabric item while being held on the roller 530. In an example, the other fabric item is placed over the fabric item 50, and joined proximal to the edge of the fabric item 50 that is opposite the third edge 62. The joining of the other fabric item to the fabric item 50 may be achieved by adhesive, such as adhesive 254, such as described herein.

In the embodiments depicted in FIGS. 12A-12E and 13A-13F, the seam 66 created by joining the first portion 52 to the second portion 56 is an overlap seam. Additionally, as illustrated, in some embodiments, the hem 64 is created on the wrong side of the fabric item 50. However, in other embodiments, the hem 64 is created on the right side of the fabric item 50. Furthermore, as illustrated, in some embodiments, the right side of the first portion 52 is joined to the wrong side of the second portion 56. However, in other embodiments, the wrong side of the first portion 52 is joined to the right side of the second portion 56.

Figure 14A:
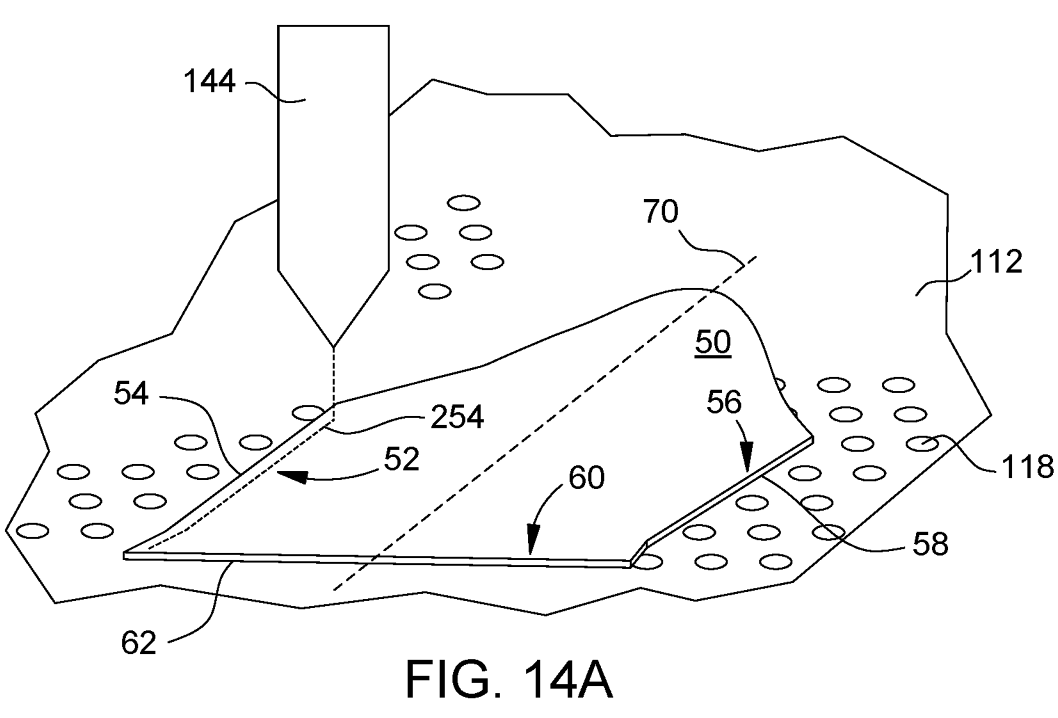
FIGS. 14A-14C schematically illustrate further exemplary applications of the method of FIG. 10.
Figure 14B:
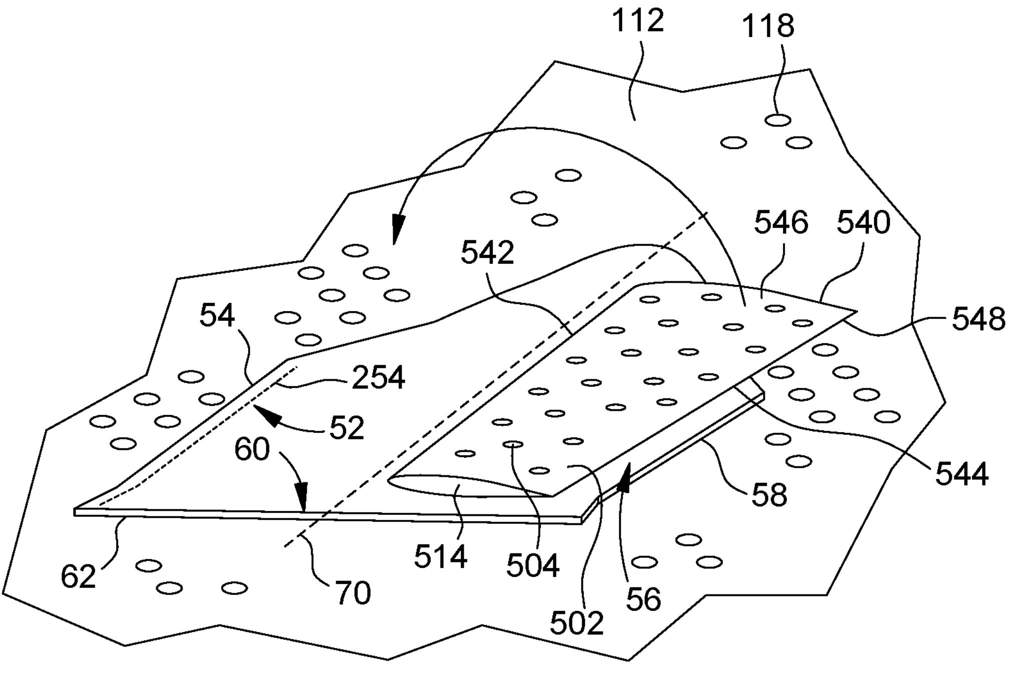
Figure 14C:
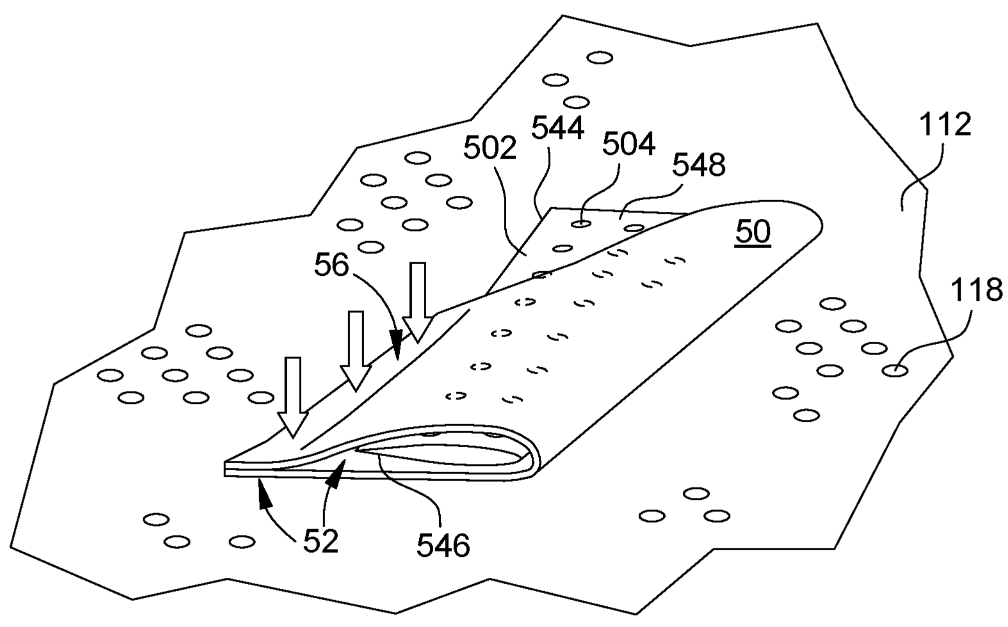

FIGS. 14A-14C schematically illustrate another variation of the operations of FIGS. 12A-12E. In FIG. 14A, the fabric item 50 is laying on the work surface 112. In some embodiments, the fabric item 50 is held on the work surface 112 by a vacuum applied through the perforations 118. As illustrated, in some embodiments, the first edge 54 and the second edge 58 of the fabric item 50 are generally symmetrical about a center axis, such as center line 70. As illustrated, in some embodiments, the adhesive applicator 144 applies adhesive 254 to the first portion 52 of the fabric item 50. In some embodiments, the adhesive applicator 144 applies adhesive 254 to the second portion 56 of the fabric item 50.

In some embodiments, the adhesive applicator 144 applies adhesive 254 also to the third portion 60 of the fabric item 50. In some of such embodiments, the third edge 62 is then folded over onto the third portion 60 of the fabric item 50 to form the hem (64, FIG. 13B). Furthermore, in some embodiments, the adhesive at the hem 64 is cured, such as described above with respect to the method 300, before proceeding with further operations. In other embodiments, the adhesive at the hem 64 is cured after proceeding with further operations.

In FIG. 14B, a roller is placed onto the fabric item 50. In an example, the roller is placed onto the fabric item 50 after creating the hem 64. The roller is represented by roller 540. It is contemplated that the roller 540 may include any one or more feature of a roller or wheel described and/or illustrated in the present disclosure. As illustrated, in some embodiments, the roller 540 includes a profile akin to an airfoil. In some embodiments, the roller 540 may include another profile, such as an ellipse, a wedge, or the like.

The roller 540 makes contact with the fabric item 50 at the circumference 502 of the roller 540, and is placed onto the fabric item 50 such that a leading edge 542 of the roller 540 is positioned proximal to the center line 70 between the first and second edges 54, 58 of the fabric item 50, and a trailing edge 544 of the roller 540 is positioned proximal to the second edge 58 of the fabric item 50. As illustrated, in some embodiments, the leading edge 542 of the roller 540 is positioned generally parallel to the center line 70. In other embodiments, the leading edge 542 of the roller 540 is not positioned generally parallel to the center line 70.

The circumference 502 of the roller 540 is configured such that a first side 546 faces away from the fabric item 50, and a second side 548 faces toward the fabric item 50. Apertures 504 in the circumference 502 allow the passage of fluid, such as air, therethrough, such as when applying a vacuum or when blowing a fluid out of the roller 540. As illustrated, in some embodiments, at least some of the apertures 504 are in the form of circular holes. In some embodiments, at least some of the apertures 504 are in the form of non-circular holes, such as oval holes. In some embodiments, at least some of the apertures 504 are in the form of slots. In some embodiments, the apertures 504 extend around the entire circumference 502. In some embodiments, the apertures 504 do not extend around the entire circumference 502. For example, in some embodiments, one or more discrete portions of the circumference 502 may include the apertures 504, and one or more other discrete portions may not include the apertures 504.

The fabric item 50 becomes attached to the roller 540. The roller 540 is traversed across the fabric item 50 towards the first edge 54 while the circumference 502 of the roller 540 remains in contact with the fabric item 50. The roller 540 is rotated about the leading edge 542 while the roller 540 is traversed across the fabric item 50 towards the first edge 54. In an example, a vacuum applied through apertures 504 in the circumference 502 of the roller 540 holds the fabric item 50 onto the roller 540. Rotation of the roller 540 while traversing the roller 540 across the fabric item 50 progressively lifts the fabric item 50 off the work surface 112. In some embodiments, the roller 540 is traversed across the fabric item 50 such that the end 514 of the roller 540 is maintained generally parallel to the third edge 62 of the fabric item 50.

In some embodiments, a section of the fabric item 50 is stretched when attached to the roller 540. For example, a section of the fabric item 50 between the first edge 54 and the center line 70 may be stretched while rotating the roller 540 about the leading edge 542 of the roller 540. The roller 540 may be rotated such that after the roller 540 has rotated through 90 degrees, the leading edge 542 of the roller 540 moves away from the first edge 54 of the fabric item 50 while the roller 540 continues to rotate towards the first edge 54 to place the first side 546 of the circumference 502 onto the first portion 52 of the fabric item 50. In some embodiments, a section of the fabric item 50 is not stretched when attached to the roller 540.

The roller 540 is rotated sufficiently such that the second portion 56 of the fabric item 50, which is attached to the roller 540 is brought into contact with the first portion 52 of the fabric item 50. FIG. 14C schematically shows the second portion 56 placed onto the first portion 52. FIG. 14C also schematically illustrates the curing of the adhesive 254, which bonds the first portion 52 to the second portion 56. It is contemplated that curing the adhesive 254 may include one or more activities as described above with respect to the method 300. For instance, another tool (such as a plate, perforated plate, heated plate, or the like) may be positioned such that the first and second portions 52, 56 are sandwiched between the work surface 112 and the other tool. One or more of pressure, heat, or moisture may be applied via the other tool onto the overlapping first and second portions 52, 56. Additionally, or alternatively, one or more of pressure, heat, or moisture may be applied via the work surface 112 to the overlapping first and second portions 52, 56.

In some embodiments, the fabric item 50 is joined to another fabric item while being held on the roller 540. In an example, the other fabric item is placed over the fabric item 50, and joined proximal to the edge of the fabric item 50 that is opposite the third edge 62. The joining of the other fabric item to the fabric item 50 may be achieved by adhesive, such as adhesive 254, such as described herein.

In the embodiments depicted in FIGS. 14A-14C, the seam 66 created by joining the first portion 52 to the second portion 56 is a butterfly seam. In some embodiments, the right side of the first portion 52 is joined to the right side of the second portion 56. However, in other embodiments, the wrong side of the first portion 52 is joined to the wrong side of the second portion 56.

Particular aspects of the disclosure are described below in sets of interrelated Examples:

According to Example 1, a method of joining a first fabric item to a second fabric item, includes engaging the first fabric item with a roller, the first fabric item located on a work surface; attaching a portion of the first fabric item to a circumference of the roller by rotating the roller while traversing the roller across the first fabric item; using the roller to position the first fabric item against the second fabric item; and placing the portion of the first fabric item onto the second fabric item by rotating the roller while traversing the roller across the second fabric item.

Example 2 includes the method of Example 1, and further includes applying adhesive to the portion of the first fabric item after attaching the portion to the circumference of the roller; and contacting the second fabric item with the adhesive while traversing the roller across the second fabric item.

Example 3 includes the method of Example 1 or Example 2, and further includes applying adhesive to the second fabric item; and contacting the portion of the first fabric item with the adhesive while traversing the roller across the second fabric item.

Example 4 includes the method of any of Examples 1 to 3, wherein rotating the roller while traversing the roller across the first fabric item comprises: rotating the roller such that the circumference travels at a first speed around an axis of rotation of the roller; and traversing the roller across the first fabric item at a second speed less than the first speed, thereby stretching the portion of the first fabric item.

Example 5 includes the method of Example 4, wherein the portion of the first fabric item remains stretched while attached to the circumference of the roller.

Example 6 includes the method of Example 5, wherein the portion of the first fabric item becomes relaxed when placed on the second fabric item and released from the roller.

Example 7 includes the method of any of Examples 1 to 6, wherein traversing the roller across the first fabric item comprises traversing the roller along a first path proximal to a first edge of the first fabric item.

Example 8 includes the method of Example 7, wherein: the path includes a curved section; and the method further comprises tilting an axis of rotation of the roller at an acute angle with respect to the work surface while traversing the roller along the curved section.

Example 9 includes the method of Example 7 or Example 8, wherein traversing the roller across the second fabric item comprises traversing the roller along a second path proximal to a second edge of the second fabric item.

Example 10 includes the method of Example 9, and further includes creating one of a butterfly seam or an overlap seam where the portion of the first fabric item is placed onto the second fabric item.

Example 11 includes the method of any of Examples 1 to 11, wherein attaching the portion of the first fabric item to the circumference of the roller comprises applying a vacuum through apertures in the circumference of the roller.

According to Example 12, a roller for picking up a fabric item, includes a wheel including an axis of rotation and a circumference extending around the axis of rotation; a plurality of apertures in the circumference; a plurality of compartments within the wheel, each compartment adjacent to another compartment of the plurality of compartments in a direction about the axis of rotation, each compartment associated with a corresponding portion of the circumference; and a vacuum connector coupled to the wheel via a swivel, and fluidically coupled to each compartment.

Example 13 includes the roller of Example 12, wherein: the circumference includes a section that is rounded in a plane parallel to the axis of rotation; and the section includes at least one aperture of the plurality of apertures.

Example 14 includes the roller of Example 12 or Example 13, wherein: a first portion of the circumference corresponding to a first compartment includes a first number of apertures of the plurality of apertures; and a second portion of the circumference corresponding to a second compartment includes a second number of apertures of the plurality of apertures, the second number different from the first number.

Example 15 includes the roller of any of Examples 12 to 14, wherein: a first portion of the circumference corresponding to a first compartment includes first apertures of the plurality of apertures; a second portion of the circumference corresponding to a second compartment includes second apertures of the plurality of apertures; and the first and second apertures are differently sized.

Example 16 includes the roller of any of Examples 12 to 15, wherein: a first compartment of the plurality of compartments contains a first insert, the first insert configured to constrain air flow through the first compartment to one or more first passages of a first size; and a second compartment of the plurality of compartments contains a second insert, the second insert configured to constrain air flow through the second compartment to one or more second passages of a second size; wherein the second size is different from the first size.

Example 17 includes the roller of any of Examples 12 to 16, wherein: a compartment of the plurality of compartments contains a valve, the valve configured to regulate air flow through the compartment.

According to Example 18, a system for joining fabric items, includes a table including a work surface, the work surface including perforations; a robot including a roller, the roller including: a wheel including an axis of rotation and a circumference extending around the axis of rotation; a plurality of apertures in the circumference; a plurality of compartments within the wheel, each compartment adjacent to another compartment of the plurality of compartments in a direction about the axis of rotation, each compartment associated with a corresponding portion of the circumference; and a vacuum connector coupled to the wheel via a swivel, and fluidically coupled to each compartment; a vacuum system coupled to the perforations of the work surface and coupled to the apertures of the roller via the vacuum connector such that a vacuum applied to the perforations is controlled independently of a vacuum applied to the apertures; and a controller configured to control the vacuum system and the robot.

Example 19 includes the system of Example 18, and further includes an adhesive applicator configured to apply adhesive to a fabric item.

Example 20 includes the system of Example 19, wherein the adhesive applicator is controlled by the controller.

According to Example 21, a method of manipulating a fabric item, includes providing a fabric item on a work surface, the fabric item including a first portion proximal to a first edge and a second portion proximal to a second edge; engaging the first portion of the fabric item with a roller; attaching the fabric item to a circumference of the roller by rotating the roller while traversing the roller across the fabric item; and further rotating the roller to place the first portion onto the second portion, thereby joining the first portion to the second portion.

Example 22 includes the method of Example 21, and further includes applying adhesive to the second portion prior to placing the first portion onto the second portion; and curing the adhesive after placing the first portion onto the second portion.

Example 23 includes the method of Example 22, wherein curing the adhesive includes applying a treatment to the adhesive, the treatment including at least one of pressure, heat, moisture, exposure to ambient conditions, waiting for a predetermined duration of time, or any combination thereof.

Example 24 includes the method of Example 23, wherein: the treatment includes at least one of pressure, heat, or moisture; and the treatment is applied by the roller.

Example 25 includes the method of any of Examples 21 to 24, and further includes applying adhesive to a third portion of the fabric item, the third portion proximal to a third edge of the fabric item extending between the first edge and the second edge; and folding the third edge over the third portion, thereby creating a hem.

Example 26 includes the method of Examples 25, wherein folding the third edge over the third portion occurs prior to traversing the roller across the fabric item.

Example 27 includes the method of Examples 25 or Example 26, wherein folding the third edge over the third portion occurs after placing the first portion onto the second portion.

Example 28 includes the method of any of Examples 21 to 27, wherein rotating the roller while traversing the roller across the fabric item comprises: rotating the roller such that the circumference travels at a first speed around an axis of rotation of the roller; and traversing the roller across the fabric item at a second speed less than the first speed, thereby stretching at least a section of the fabric item.

Example 29 includes the method of Examples 28, wherein the section of the fabric item remains stretched while attached to the circumference of the roller.

Example 30 includes the method of any of Examples 21 to 29, wherein attaching the fabric item to the circumference of the roller comprises applying a vacuum through apertures in the circumference of the roller.

According to Example 31, a method of manipulating a fabric item, includes providing a fabric item on a work surface, the fabric item including a first portion proximal to a first edge and a second portion proximal to a second edge; applying adhesive to the second portion; placing a roller onto the first portion; applying a vacuum through apertures in a circumference of the roller to hold the first portion against the roller; picking up the first portion from the work surface by rotating the roller while holding the first portion against the roller and while traversing the roller across the fabric item towards the second edge, wherein the second edge remains on the work surface; further rotating the roller, thereby placing the first portion onto the second portion; and bonding the first portion to the second portion by curing the adhesive.

Example 32 includes the method of Example 31, and further includes applying adhesive to a third portion of the fabric item, the third portion proximal to a third edge of the fabric item extending between the first edge and the second edge; and folding the third edge over the third portion, thereby creating a hem.

Example 33 includes the method of Example 32, wherein folding the third edge over the third portion occurs prior to traversing the roller across the fabric item.

Example 34 includes the method of Example 32 or Example 33, wherein folding the third edge over the third portion occurs after placing the first portion onto the second portion.

Example 35 includes the method of any of Examples 31 to 34, wherein curing the adhesive includes applying a treatment to the adhesive, the treatment including at least one of pressure, heat, moisture, exposure to ambient conditions, waiting for a predetermined duration of time, or any combination thereof.

Example 36 includes the method of Examples 35, wherein: the treatment includes at least one of pressure, heat, or moisture; and the treatment is applied by the roller.

According to Example 37, a method of manipulating a fabric item, includes providing a fabric item on a work surface, the fabric item including a first portion proximal to a first edge and a second portion proximal to a second edge; applying adhesive to one of the first portion or the second portion; placing a roller onto the fabric item such that a leading edge of the roller is positioned proximal to a center line between the first and second edges, and a trailing edge of the roller is positioned proximal to the second edge; applying a vacuum through apertures in a circumference of the roller to hold the fabric item against the roller; picking up the second portion from the work surface while the first edge of the fabric item remains on the work surface by rotating the roller about the leading edge; further rotating the roller about the leading edge, thereby placing the second portion onto the first portion; and bonding the first portion to the second portion by curing the adhesive.

Example 38 includes the method of Example 37, and further includes applying adhesive to a third portion of the fabric item, the third portion proximal to a third edge of the fabric item extending between the first edge and the second edge; and folding the third edge over the third portion, thereby creating a hem.

Example 39 includes the method of Example 38, wherein folding the third edge over the third portion occurs prior to traversing the roller across the fabric item.

Example 40 includes the method of any of Examples 37 to 39 and further includes using the roller to stretch the fabric item between the first edge and the center line while rotating the roller about the leading edge.

According to Example 41, a method of joining a first fabric item to a second fabric item, includes providing the first fabric item on a work surface, the first fabric item including a first portion proximal to a first edge, a second portion proximal to a second edge, and a third portion proximal to a third edge extending between the first edge and the second edge; engaging the first portion of the first fabric item with a roller; attaching the first fabric item to a circumference of the roller by rotating the roller while traversing the roller across the first fabric item towards the second edge; forming the third portion of the first fabric item into a first flange by bending the third portion over an edge of the roller and onto an end of the roller; applying adhesive to at least one of the first flange or the second fabric item; positioning the first flange against the second fabric item; and bonding the first flange to the second fabric item by curing the adhesive.

Example 42 includes the method of Example 41, wherein the first flange is positioned against a second flange of the second fabric item.

Example 43 includes the method of Example 41 or Example 42, and further includes placing the first portion of the first fabric item onto the second portion of the first fabric item while rotating the roller, thereby joining the first portion to the second portion.

Example 44 includes the method of Example 43, and further includes applying adhesive to at least one of the first portion or the second portion prior to placing the first portion onto the second portion; and curing the adhesive after placing the first portion onto the second portion.

Example 45 includes the method of any of Examples 41 to 44, wherein curing the adhesive includes applying a treatment to the adhesive, the treatment including at least one of pressure, heat, moisture, exposure to ambient conditions, waiting for a predetermined duration of time, or any combination thereof.

Example 46 includes the method of Examples 45, wherein: the treatment includes at least one of pressure, heat, or moisture; and the treatment is applied by the roller.

Example 47 includes the method of any of Examples 41 to 46, wherein rotating the roller while traversing the roller across the first fabric item comprises: rotating the roller such that the circumference travels at a first speed around an axis of rotation of the roller; and traversing the roller across the first fabric item at a second speed less than the first speed, thereby stretching at least a section of the first fabric item.

Example 48 includes the method of Example 47, wherein the section of the first fabric item remains stretched while attached to the circumference of the roller.

Example 49 includes the method of Examples 47 or Example 48, wherein the stretching of at least the section of the first fabric item causes at least in part the bending of the third portion of the first fabric item over the edge of the roller to form the first flange.

Example 50 includes the method of any of Examples 41 to 49, wherein attaching the first fabric item to the circumference of the roller comprises applying a vacuum through apertures in the circumference of the roller.

Example 51 includes the method of Example 50, wherein applying a vacuum through apertures in the end of the roller causes at least in part the bending of the third portion of the first fabric item onto the end of the roller to form the first flange.

According to Example 52, a method of joining a first fabric item to a second fabric item, includes attaching the first fabric item to a circumference of a first roller by rotating the first roller while traversing the first roller across the first fabric item; forming a portion of the first fabric item into a first flange by bending the portion over an edge of the first roller and onto an end of the first roller; attaching the second fabric item to a circumference of a second roller by rotating the second roller while traversing the second roller across the second fabric item; forming a portion of the second fabric item into a second flange by bending the portion over an edge of the second roller and onto an end of the second roller; applying adhesive to at least one of the first flange or the second flange; positioning the first flange against the second flange; and bonding the first flange to the second flange by curing the adhesive.

Example 53 includes the method of Example 52, wherein curing the adhesive includes applying a treatment to the adhesive, the treatment including at least one of pressure, heat, moisture, exposure to ambient conditions, waiting for a predetermined duration of time, or any combination thereof.

Example 54 includes the method of Example 53, wherein: the treatment includes at least one of pressure, heat, or moisture; and the treatment is applied by one of the first roller or the second roller.

Example 55 includes the method of any of Examples 52 to 54, wherein rotating the first roller while traversing the first roller across the first fabric item comprises: rotating the first roller such that the circumference travels at a first speed around an axis of rotation of the first roller; and traversing the first roller across the first fabric item at a second speed less than the first speed, thereby stretching at least a section of the first fabric item.

Example 56 includes the method of Example 55, wherein the section of the first fabric item remains stretched while attached to the circumference of the first roller.

Example 57 includes the method of Example 55 or Example 56, wherein the stretching of at least the section of the first fabric item causes at least in part the bending of the portion of the first fabric item over the edge of the first roller to form the first flange.

Example 58 includes the method of any of Examples 52 to 57, wherein attaching the first fabric item to the circumference of the first roller comprises applying a vacuum through apertures in the circumference of the first roller.

Example 59 includes the method of Example 58, wherein applying a vacuum through apertures in the end of the first roller causes at least in part the bending of the portion of the first fabric item onto the end of the first roller to form the first flange.

Example 60 includes the method of any of Examples 52 to 59, wherein a surface of the end of the first roller forms a plane tilted at an acute angle with respect to an axis of rotation of the first roller.

Embodiments of the present disclosure provide for the automated manipulation of fabric items. Embodiments of the present disclosure provide for the automated joining of fabric items. Some non-limiting examples of fabric items that can be joined according to at least one embodiment of the present disclosure include: sections of a garment (such as body pieces, sleeves, collars, pant legs, cuffs, pockets, decorative pieces, hemming pieces, labels, and the like); sections of personal accessories (such as body pieces, flaps, pockets, decorative pieces, hemming pieces, labels, and the like); and sections of homewares (such as body pieces, flaps, pockets, decorative pieces, hemming pieces, labels, and the like).

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

It is contemplated that elements and features of any one disclosed embodiment may be beneficially incorporated in one or more other embodiments. While the foregoing is directed to embodiments of the present disclosure, other and further embodiments of the disclosure may be devised without departing from the basic scope thereof, and the scope thereof is determined by the claims that follow.

What is claimed is:

1. A method of joining a first fabric item to a second fabric item, comprising:

engaging the first fabric item with a roller, the first fabric item located on a work surface;

attaching a portion of the first fabric item to a circumference of the roller by rotating the roller while traversing the roller across the first fabric item;

using the roller to position the first fabric item against the second fabric item; and placing the portion of the first fabric item onto the second fabric item by rotating the roller while traversing the roller across the second fabric item, thereby creating a seam between the first fabric item and the second fabric item.

2. The method of claim 1, further comprising:

applying adhesive to the portion of the first fabric item after attaching the portion to the circumference of the roller; and contacting the second fabric item with the adhesive while traversing the roller across the second fabric item.

3. The method of claim 1, further comprising:

applying adhesive to the second fabric item; and contacting the portion of the first fabric item with the adhesive while traversing the roller across the second fabric item.

4. The method of claim 1, wherein rotating the roller while traversing the roller across the first fabric item comprises:

rotating the roller such that the circumference travels at a first speed around an axis of rotation of the roller; and traversing the roller across the first fabric item at a second speed less than the first speed, thereby stretching the portion of the first fabric item.

5. The method of claim 4, wherein the portion of the first fabric item remains stretched while attached to the circumference of the roller.

6. The method of claim 5, wherein the portion of the first fabric item becomes relaxed when placed on the second fabric item and released from the roller.

7. The method of claim 1, wherein traversing the roller across the first fabric item comprises traversing the roller along a first path proximal to a first edge of the first fabric item, and wherein the seam is created proximal to the first edge of the first fabric item and a second edge of the second fabric item.

8. The method of claim 7, wherein:

the first path includes a curved section; and the method further comprises tilting an axis of rotation of the roller at an acute angle with respect to the work surface while traversing the roller along the curved section.

9. The method of claim 7, wherein traversing the roller across the second fabric item comprises traversing the roller along a second path proximal to the second edge of the second fabric item.

10. The method of claim 9, wherein creating the seam comprises one of a butterfly seam or an overlap seam where the portion of the first fabric item is placed onto the second fabric item.

11. The method of claim 1, wherein attaching the portion of the first fabric item to the circumference of the roller comprises applying a vacuum through apertures in the circumference of the roller.

12. A method of joining fabric items comprising:

engaging a first fabric item with a rotating roller while the first fabric item is positioned on a work surface;

applying a vacuum through apertures in a circumference of the roller to attach a portion of the first fabric item to the circumference;

traversing the roller across the first fabric item while rotating the roller, thereby lifting a lifted portion of the first fabric item off the work surface;

positioning the lifted portion of the first fabric item in contact with a second fabric item; and depositing the portion of the first fabric item onto the second fabric item by rotating the roller while traversing the roller across the second fabric item, thereby creating a seam between the first fabric item and the second fabric item.

13. The method of claim 12, wherein the work surface comprises perforations coupled to a vacuum system, and wherein a vacuum applied through the perforations is controlled independently of the vacuum applied through the apertures in the circumference of the roller.

14. The method of claim 12, further comprising:

rotating the roller such that the circumference travels at a first linear speed around an axis of rotation of the roller;

traversing the roller across the first fabric item at a second linear speed that is less than the first linear speed; and thereby stretching the portion of the first fabric item as it is attached to the circumference of the roller.

15. The method of claim 14, wherein the portion of the first fabric item remains stretched while attached to the circumference of the roller and becomes relaxed when deposited onto the second fabric item.

16. The method of claim 12, further comprising:

traversing the roller along a path that includes a curved section proximal to an edge of the first fabric item; and tilting an axis of rotation of the roller at an acute angle with respect to the work surface while traversing the roller along the curved section, thereby reducing wrinkling of the portion of the first fabric item.

17. The method of claim 12, further comprising:

applying an adhesive to at least one of:

the portion of the first fabric item after attaching the portion to the circumference of the roller, or the second fabric item prior to positioning the lifted portion in contact with the second fabric item; and curing the adhesive to bond the first fabric item to the second fabric item, wherein curing comprises applying at least one of pressure, heat, or moisture.

18. The method of claim 17, wherein curing the adhesive comprises:

applying heat via a heating element embedded in the circumference of the roller; or emitting a heating medium through the apertures in the circumference of the roller, wherein the heating medium comprises hot air or steam.

19. A method of automated fabric joining, comprising:

providing a work surface including perforations, the work surface configured to support fabric items;

applying a first vacuum through the perforations to selectively hold a first fabric item on the work surface;

engaging the first fabric item with a roller comprising apertures distributed across a circumference of the roller;

applying a second vacuum through the apertures of the roller independently of the first vacuum applied through the perforations;

attaching a portion of the first fabric item to the circumference by rotating the roller while traversing the roller across the first fabric item;

lifting the portion of the first fabric item off the work surface while maintaining the first fabric item attached to the circumference;

positioning the portion of the first fabric item in contact with a second fabric item; and depositing the portion onto the second fabric item by rotating the roller while traversing the roller across the second fabric item, thereby creating a seam between the first fabric item and the second fabric item.

20. The method of claim 19, further comprising:

controlling the first vacuum and the second vacuum using a controller configured to:

independently regulate vacuum pressure applied through the perforations; and independently regulate vacuum pressure applied through the apertures of the roller.

21. The method of claim 20, further comprising coordinating, via the controller, a traversal speed of the roller across the first fabric item with a rotational speed of the roller to control stretching of the portion of the first fabric item.

22. The method of claim 21, wherein coordinating the traversal speed and the rotational speed comprises:

rotating the roller such that the circumference travels at a first linear speed around an axis of rotation of the roller;

traversing the roller across the first fabric item at a second linear speed that is less than the first linear speed; and thereby stretching the portion of the first fabric item as it is attached to the circumference.

23. The method of claim 19, further comprising:

moving the roller using a robotic manipulator coupled to the roller, wherein moving comprises:

positioning the roller at a first location on the work surface to engage the first fabric item;

traversing the roller along a path across the first fabric item; and repositioning the roller to a second location to deposit the portion onto the second fabric item.

24. The method of claim 23, wherein the path includes a curved section, and the method further comprises tilting an axis of rotation of the roller at an acute angle with respect to the work surface while traversing the roller along the curved section to reduce wrinkling of the portion of the first fabric item.

25. The method of claim 19, further comprising:

applying an adhesive to at least one of the first fabric item or the second fabric item using an adhesive applicator;

wherein the adhesive applicator is controlled to apply the adhesive in a pattern selected from: a continuous line, a non-continuous line, one or more droplets, or multiple lines; and curing the adhesive to bond the first fabric item to the second fabric item.

26. The method of claim 25, wherein curing the adhesive comprises applying at least one of pressure, heat, or moisture using the roller while depositing the portion onto the second fabric item.

27. The method of claim 19, wherein:

the roller comprises a plurality of compartments within a wheel of the roller, each compartment associated with a corresponding portion of the circumference; and the method further comprises regulating vacuum flow through different compartments to provide differential vacuum holding force along different portions of the circumference.

28. The method of claim 27, wherein regulating vacuum flow comprises:

applying a first vacuum pressure through apertures in a first portion of the circumference corresponding to a first compartment; and applying a second vacuum pressure through apertures in a second portion of the circumference corresponding to a second compartment, wherein the second vacuum pressure is different from the first vacuum pressure.

* * * * *